United States Patent [19]
Sarring

[11] 3,892,319
[45] July 1, 1975

[54] FEED, TRANSPORT AND DELIVERY MECHANISM FOR BOOK TRIMMERS AND THE LIKE

[75] Inventor: Ernest J. Sarring, Western Springs, Ill.

[73] Assignee: Rockwell International Corporation, Pittsburgh, Pa.

[22] Filed: Oct. 16, 1972

[21] Appl. No.: 298,131

Related U.S. Application Data

[62] Division of Ser. No. 114,225, Feb. 10, 1971, Pat. No. 3,722,336.

[52] U.S. Cl. ............ 214/8.5 F; 214/8.5 SS; 221/270
[51] Int. Cl. ........................................... B65g 59/06
[58] Field of Search .................... 214/8.5 F, 8.5 SS; 221/270, 238

[56] References Cited
UNITED STATES PATENTS

| | | | |
|---|---|---|---|
| 2,324,523 | 7/1943 | Lund | 214/8.5 F |
| 2,779,592 | 1/1957 | Hartman | 214/8.5 F |
| 2,966,279 | 12/1960 | Grenier | 221/270 X |

FOREIGN PATENTS OR APPLICATIONS

| 464,213 | 4/1937 | United Kingdom | 214/8.5 F |
|---|---|---|---|

*Primary Examiner*—Albert J. Makay
*Assistant Examiner*—George F. Abraham

[57] ABSTRACT

Apparatus for feeding objects to a transport mechanism and transport and delivery mechanisms for the objects, and, in particular, apparatus for feeding books to, transporting them through the cutting stations of and delivering them from a two-station, three-knife book trimmer. The feed mechanism includes a hopper for holding books, a prestripper for stripping a book from the hopper and moving it part way to the front knife cutting station and pushers, which continue to feed the book to the first cutting station, with means coordinating the prestrippers and pushers. The transport mechanism includes a plurality of displaceable, e.g. upper transport belts and a plurality of belts in opposition to the displaceable ones, e.g. lower transport belts, which clamp the book, respectively, from above and below. While clamping the book, the transport belts travel with it to the side knife cutting station, halt for side knife trimming, and then move the book beyond the second station to the delivery mechanism. The transport belts travel intermittently so as to be stationary when the book is delivered to the first station and to halt the object at the first and second stations. Displacement means, e.g. for the upper belts, separate the transport belts at the first station to permit a book to be fed between the upper and lower belts, and return means bring the belts together again to clamp the book. The delivery mechanism includes speeder belts for engaging the book from below and speeding it away from the transport belts.

11 Claims, 39 Drawing Figures

Fig. I.

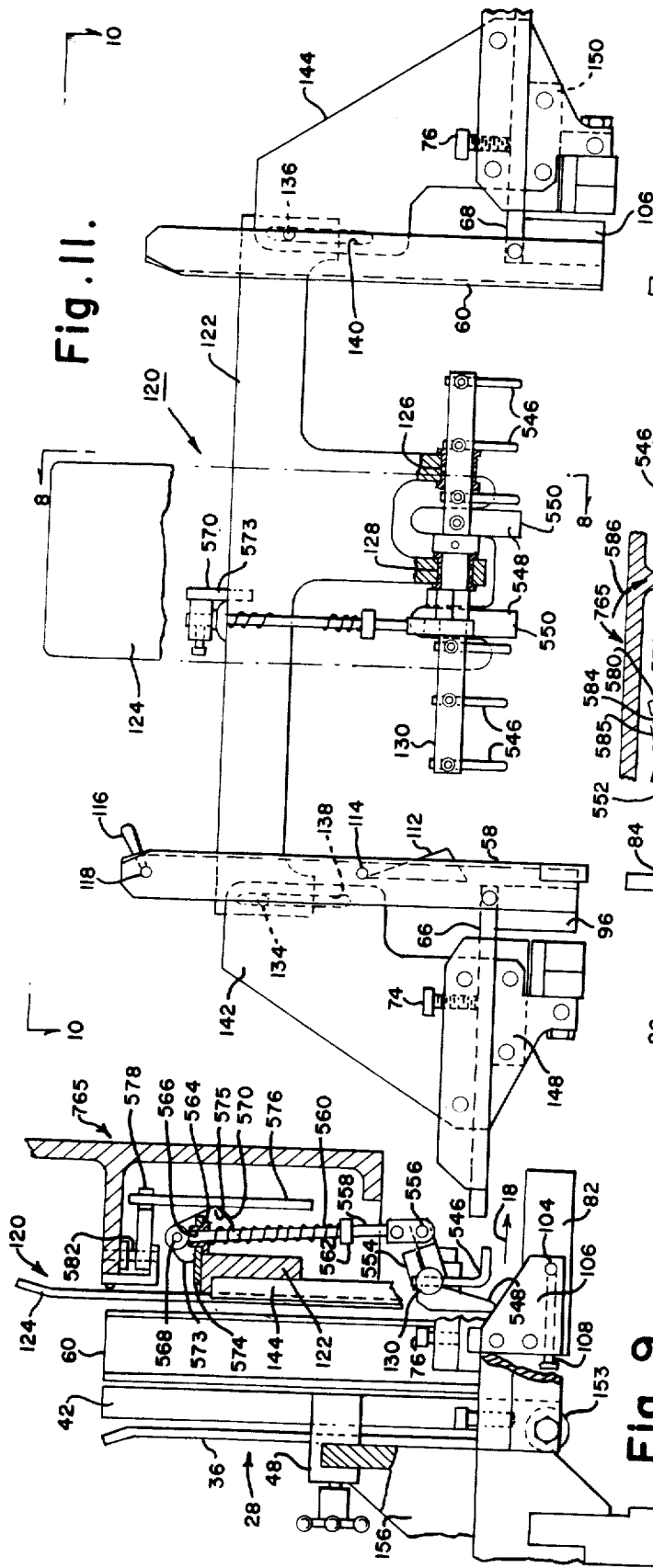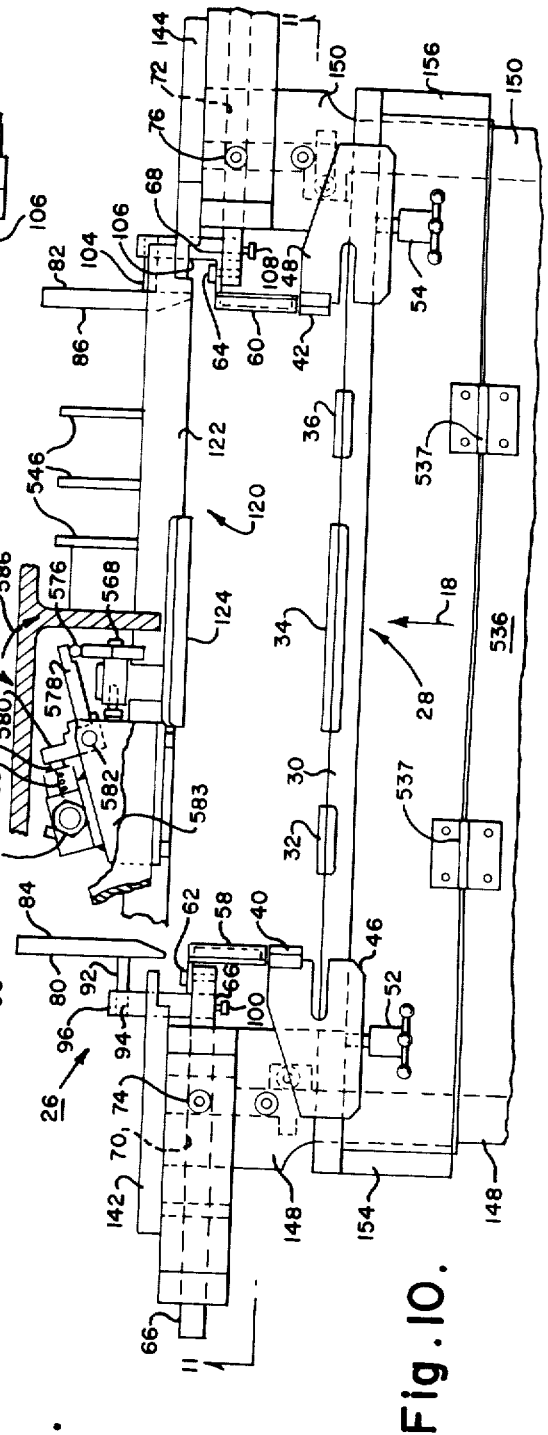

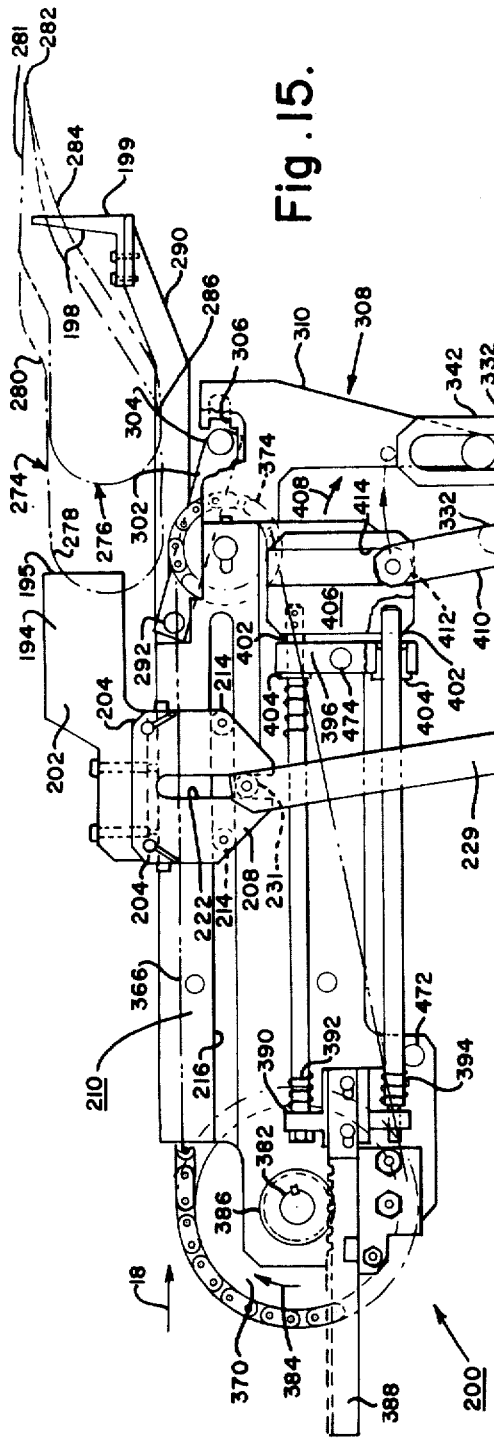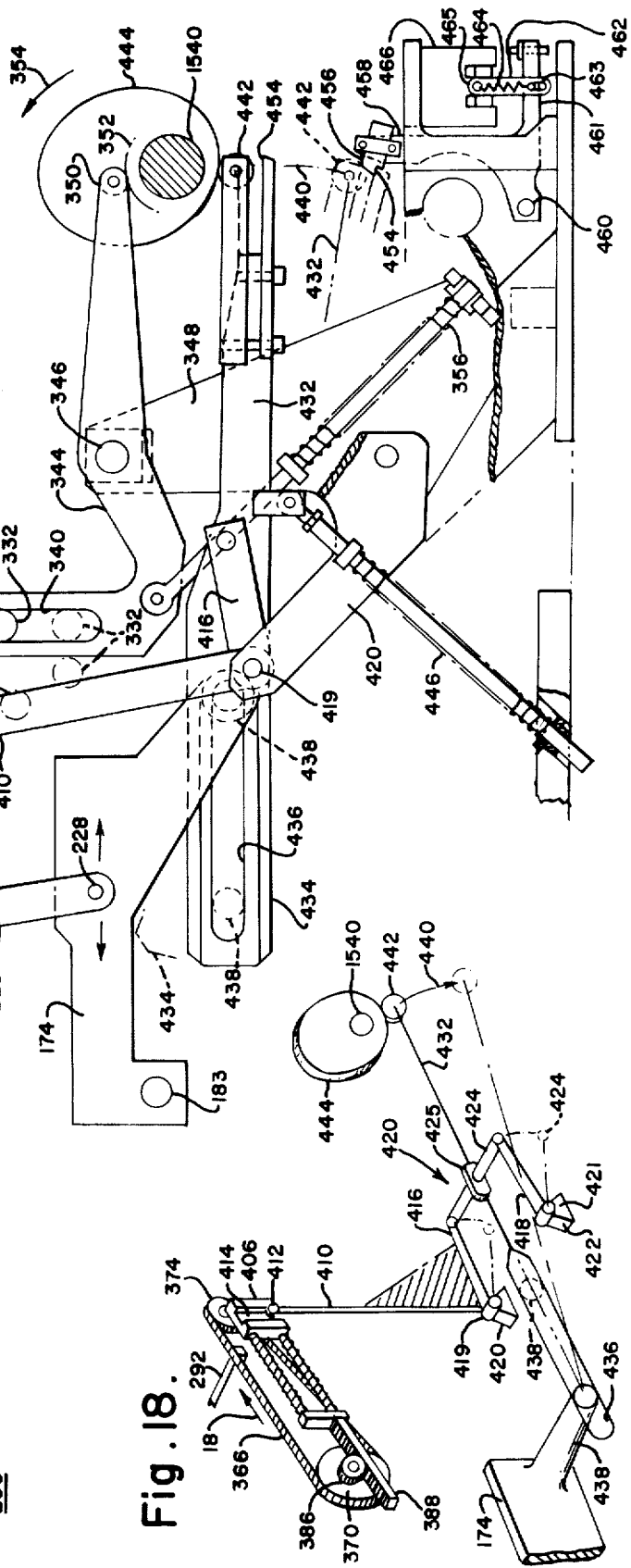

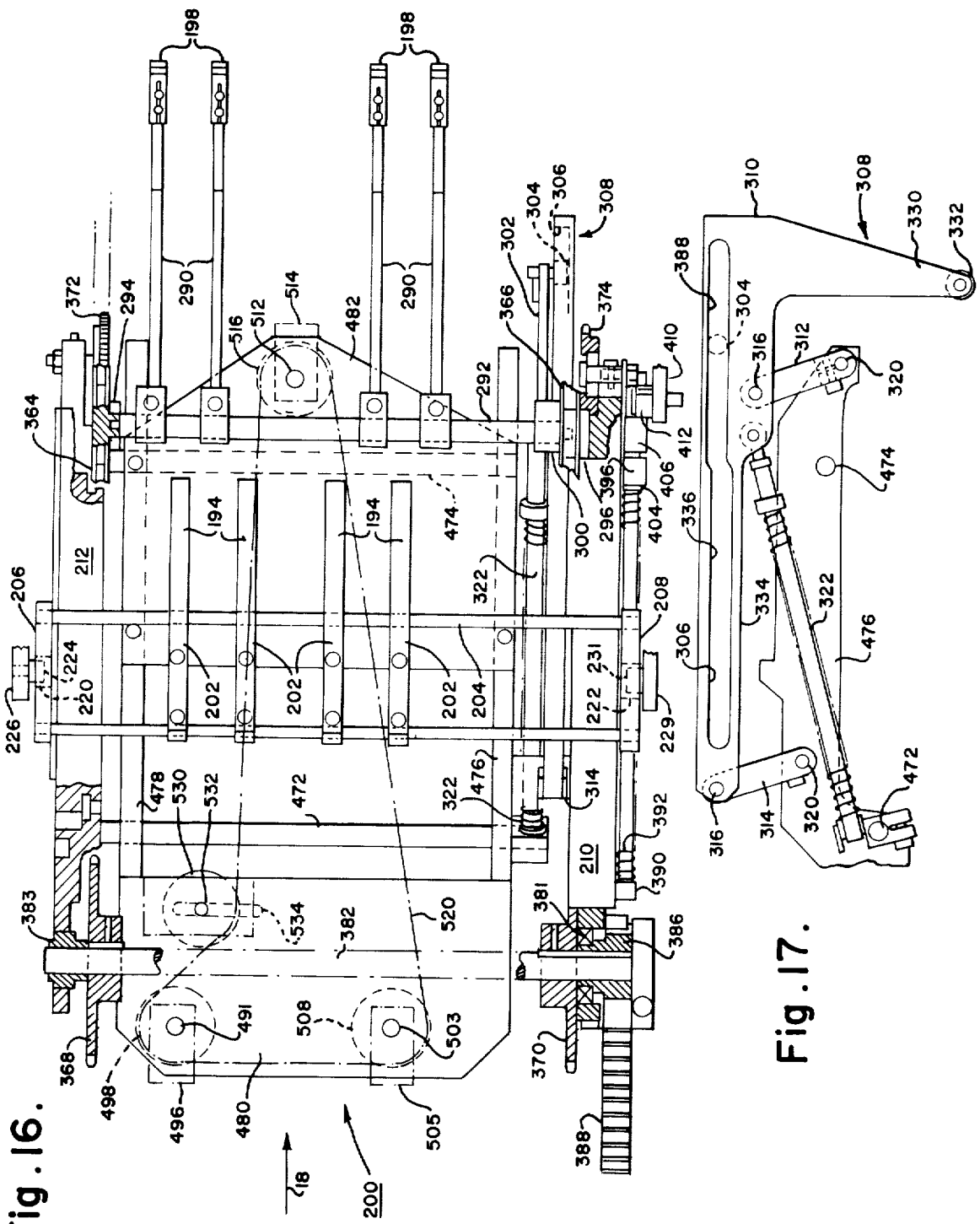

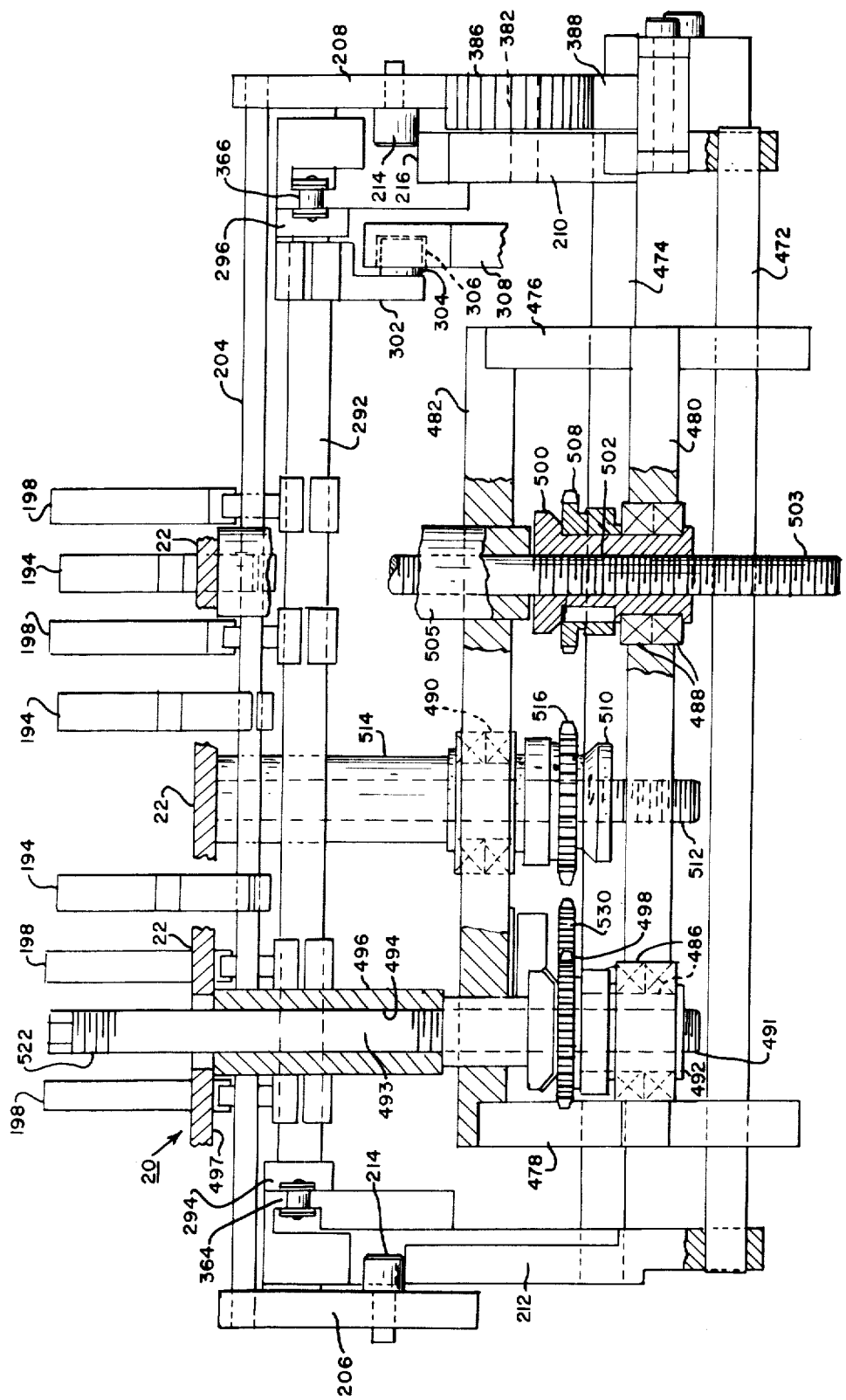

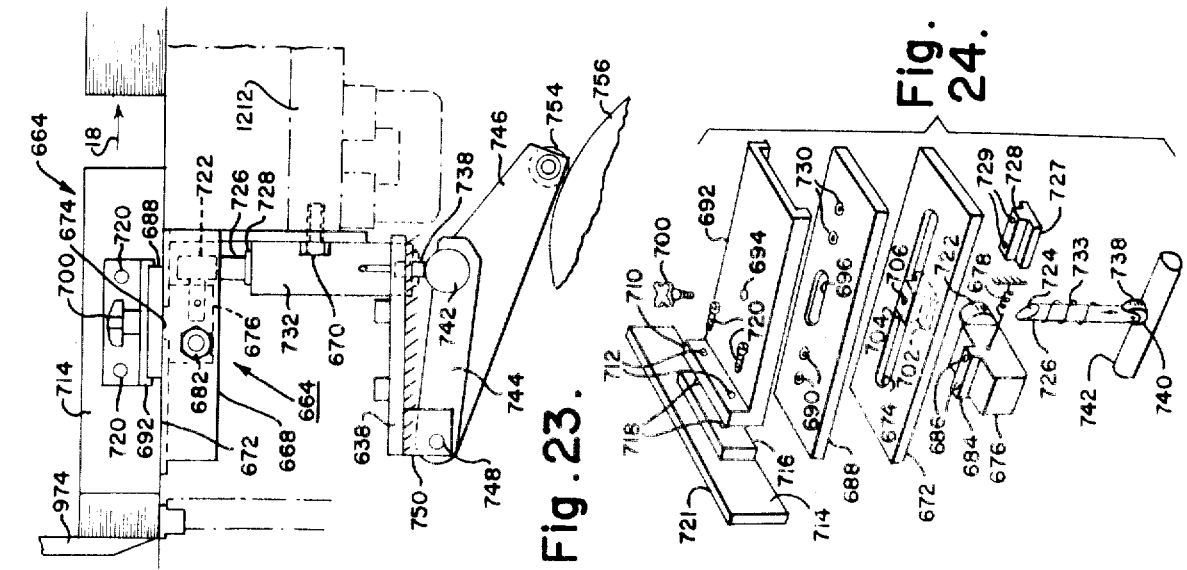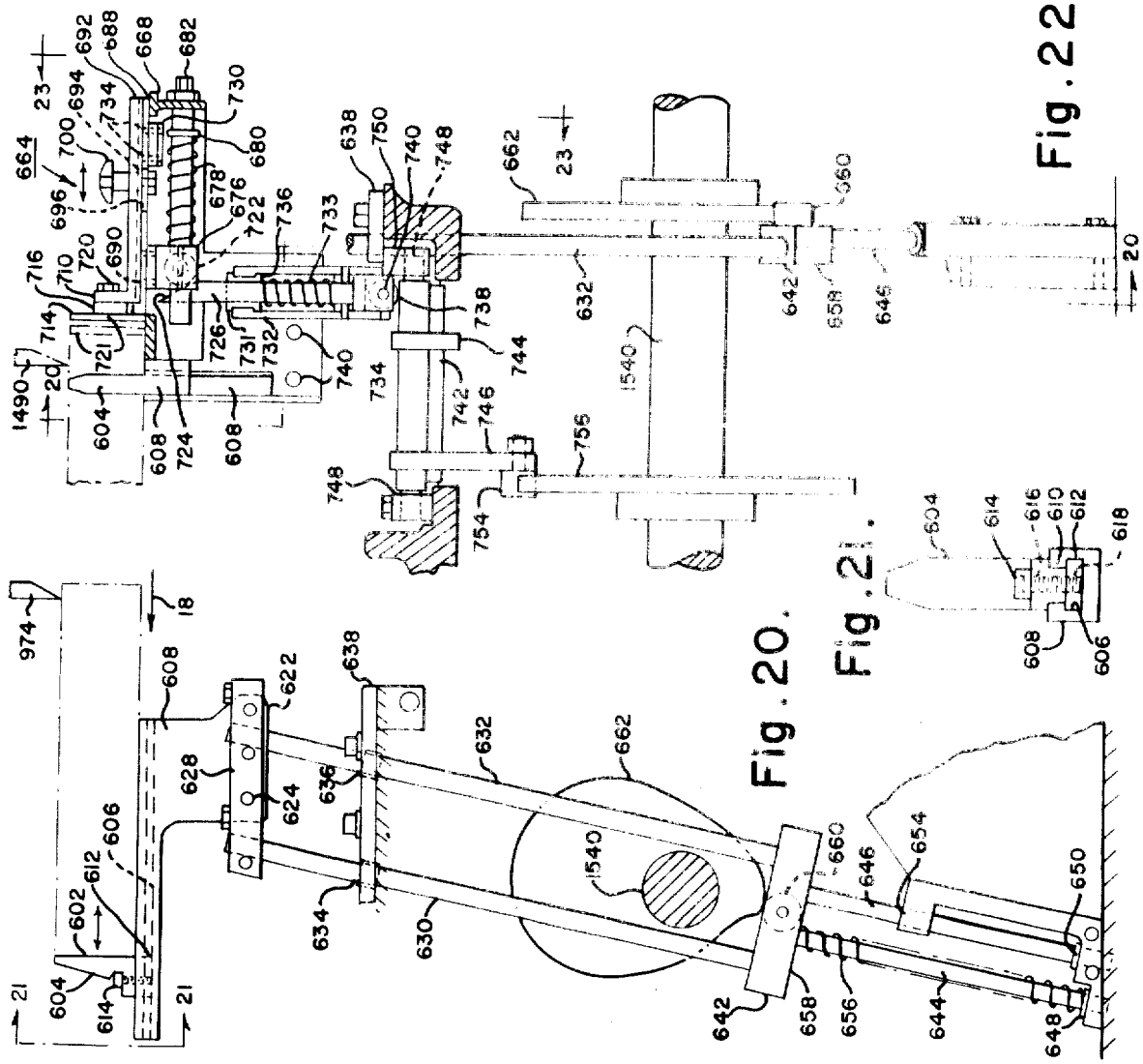

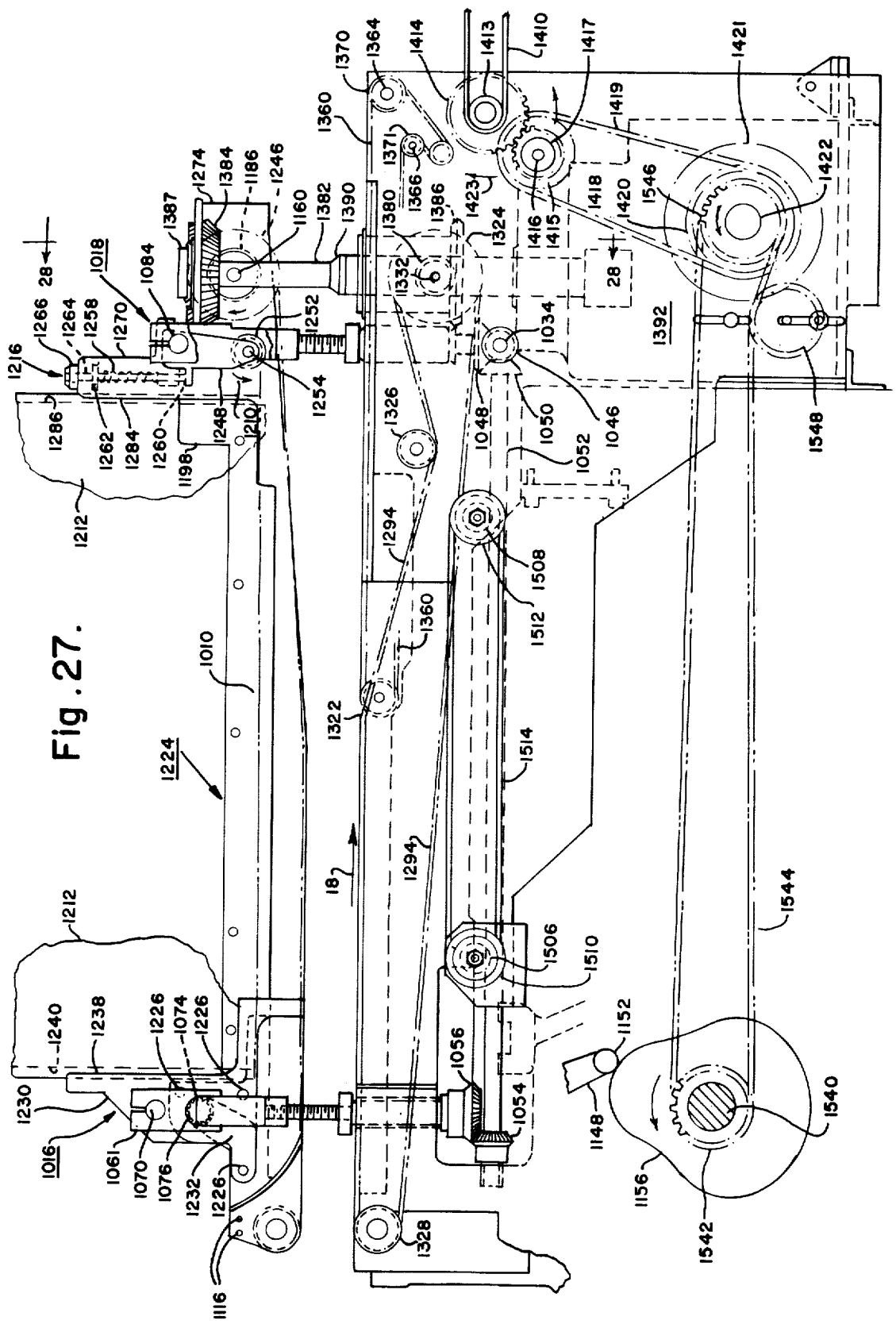

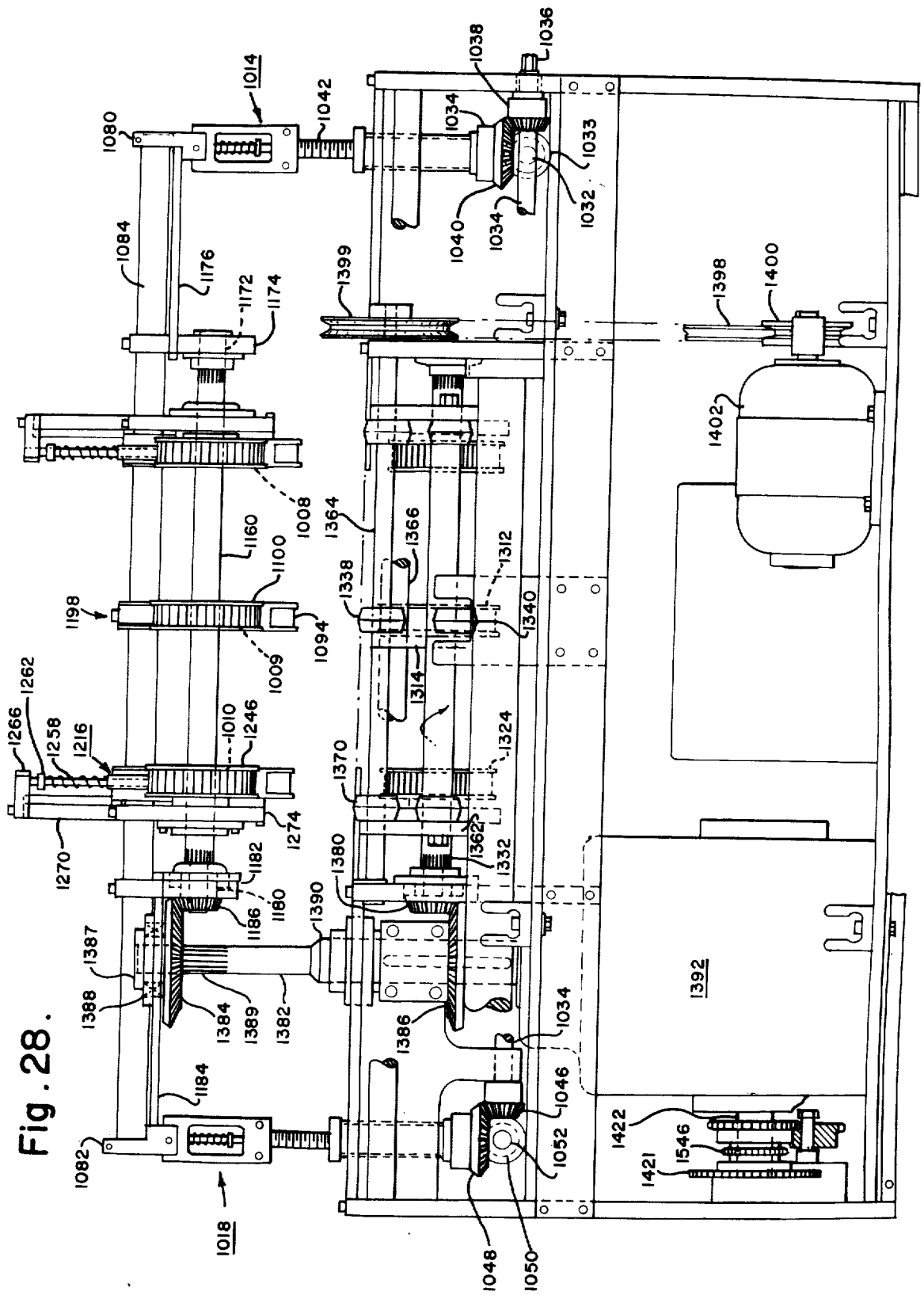

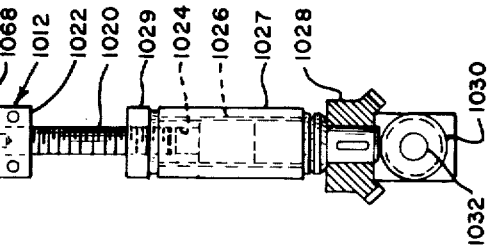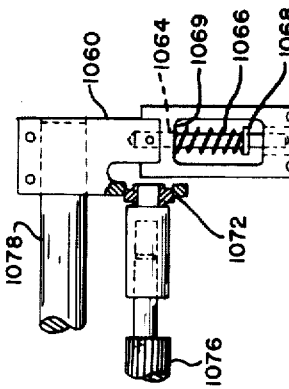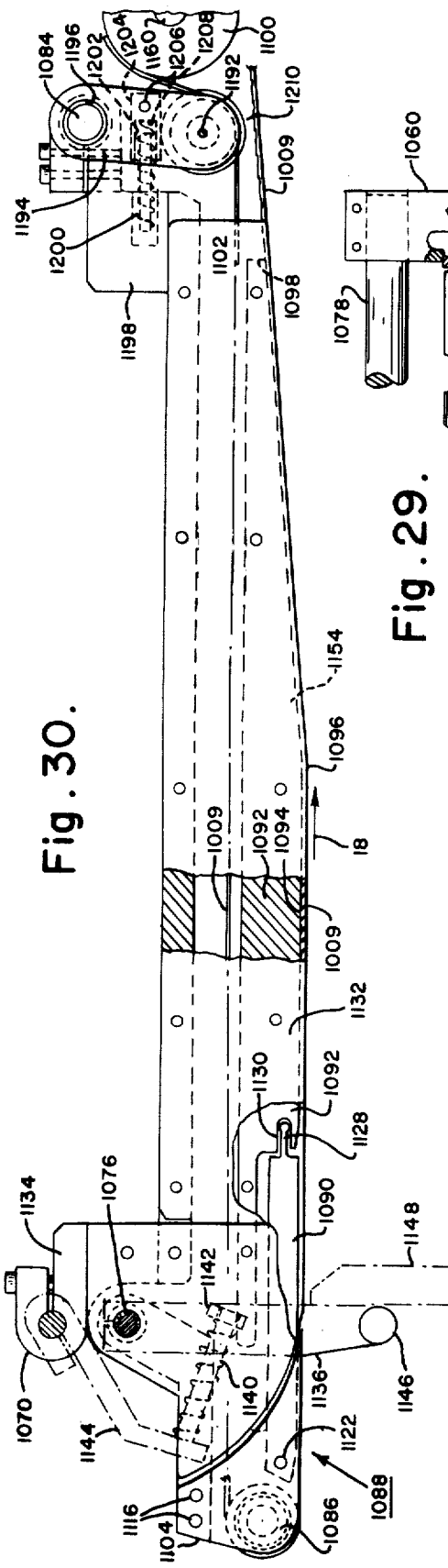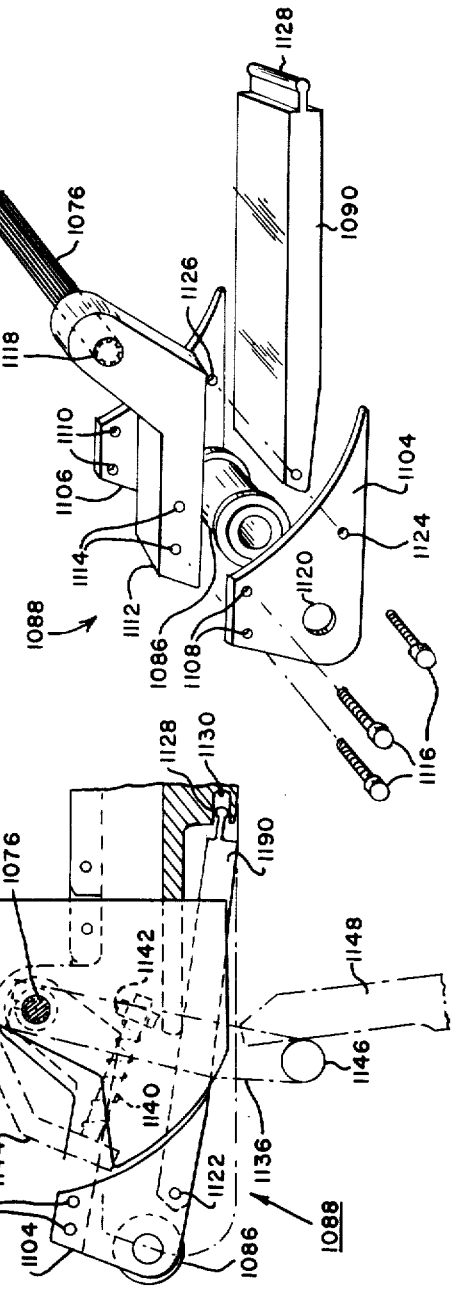

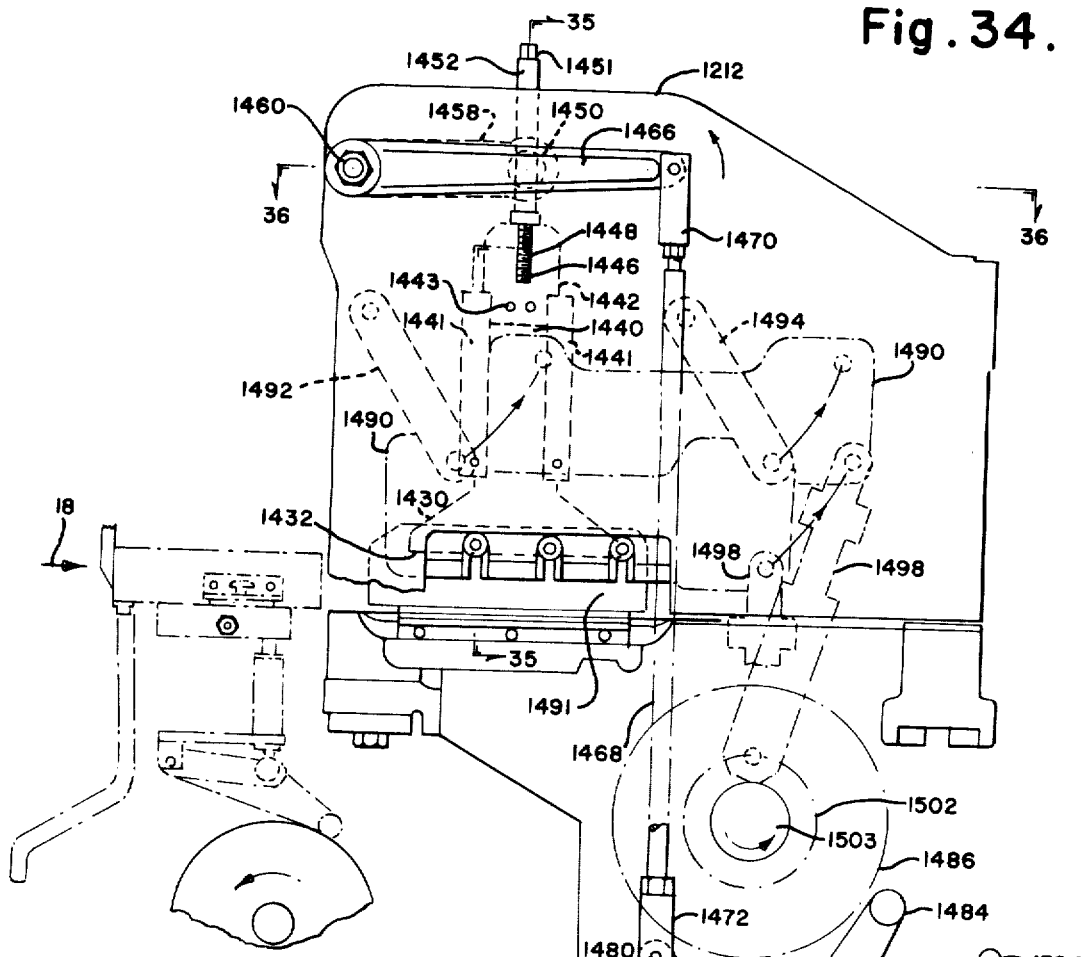
Fig. 34.
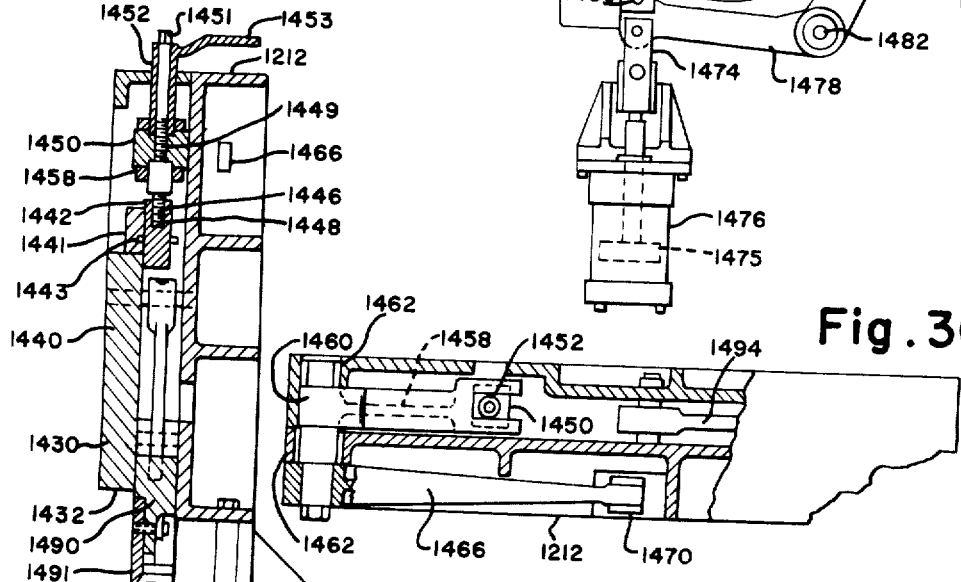
Fig. 35.
Fig. 36.

FEED, TRANSPORT AND DELIVERY MECHANISM FOR BOOK TRIMMERS AND THE LIKE

This application is a division of application Ser. No. 114,225 filed Feb. 10, 1971 which has matured into U.S. Pat. No. 3,722,336.

This invention relates to a means for feeding an object to a transport mechanism and relates to a transport and a delivery mechanism and more particularly relates to feed, transport and delivery mechanisms for a two-station, three-knife book trimmer.

A book has three significant dimensions. The first is its width, which is the dimension between the backbone or spine and the front of the book. As a book is positioned in a book trimmer, its width is the dimension aligned with the path, along which the book is moved. The second dimension is the height, which is the distance between the top and bottom edges of the book. These edges face toward the sides of a trimmer and are trimmed by the side knives. The third dimension is the thickness of the book, which is its height above the surface of the trimmer over which the book passes.

An automatic book trimmer includes means for holding a stack of books to be trimmed, means for feeding one or more books at a time from the stack to a first cutting station where a front knife operates to cut the trailing edge of the book, means for transporting the book to a second cutting station where the book halts and the side knives trim its head and foot, means for transporting the trimmed book to a delivery mechanism, and a delivery mechanism for receiving the trimmed book.

The trimmer disclosed herein includes a novel book feed mechanism for feeding books to the first cutting station, a novel transport mechanism for moving a book from the first to the second cutting station and then for moving it beyond the second cutting station to a novel delivery mechanism.

Turning to the feed mechanism, the books to be trimmed are stacked in a hopper. Prestrippers contact a book and move it part way from beneath the stack in the hopper. Pushers move up behind the book and push it to the first cutting station. The prestrippers now return to their start position. At the first cutting station, the book is halted by backstops. The pushers now return to their start position, and while doing so, they dip beneath the books in the stack and the next book being stripped. The movements of the prestrippers and pushers are coordinated. Employing both prestrippers and pushers speeds book feed.

The means for adjusting the width of the hopper for differing width books also adjusts the length of the horizontal strokes of the prestrippers and pushers, which also must be varied for varying width books, thereby simplifying the adjustments for various book widths.

The transport mechanism uses cooperating first and second pluralities of moving belts. The pluralities of belts are in opposition to each other and clamp the book between them. The belts hold the book pages together and in alignment, transport the book from the first to the second cutting station, hold the book stationary at the second cutting station, and then carrying the book beyond the second cutting station to release it. The transport belts operate intermittently so as to permit the first and second station cutting operations on the book to be performed. Displacement means cause the belts to separate at the first station, so that the book can move to the first station, and return means move the belts back to clamp the book for transporting. The displacement and return means preferably operate on only one of the pluralities of belts. In a preferred embodiment, the first plurality of belts are upper belts above the books and the second plurality are lower belts, and the displacement means is means for elevating the upper belts.

The delivery mechanism includes continuously moving speeder belts, which carry the released book away from the transport mechanism.

While the present invention is specifically described in connection with the feeding, transporting, delivering and trimming of books, the feed, transport and delivery mechanism is adaptable for use in connection with other objects and is, therefore, not to be limited to use in connection with books.

Accordingly, it is an object of the present invention to provide an improved means for feeding objects to an apparatus.

It is a further object of the present invention to increase the speed of operation of a means which feeds objects to another apparatus.

It is another object of the present invention to provide a means for transporting objects.

It is a further object of the present invention to provide a novel belt mechanism for transporting objects.

It is a further object of the invention to provide a delivery mechanism.

It is another object of the present invention to provide an improved two-station, three-knife trimmer.

It is yet another object of the present invention to provide improved subassemblies for feeding, transporting and delivering an object.

These and other objects of the present invention will become apparent from the following description of the accompanying drawings, in which:

FIG. 9 is a side view, partially in cross-section, showing the hopper in which the objects to be fed and transported are stacked;

FIG. 10 is a top view of the hopper shown in FIG. 9;

FIG. 11 is an elevation view of the stripper gate and downstream wall of the hopper shown in FIG. 10, viewed along the line and in the direction of arrows 11 in FIG. 10;

Figure 12:
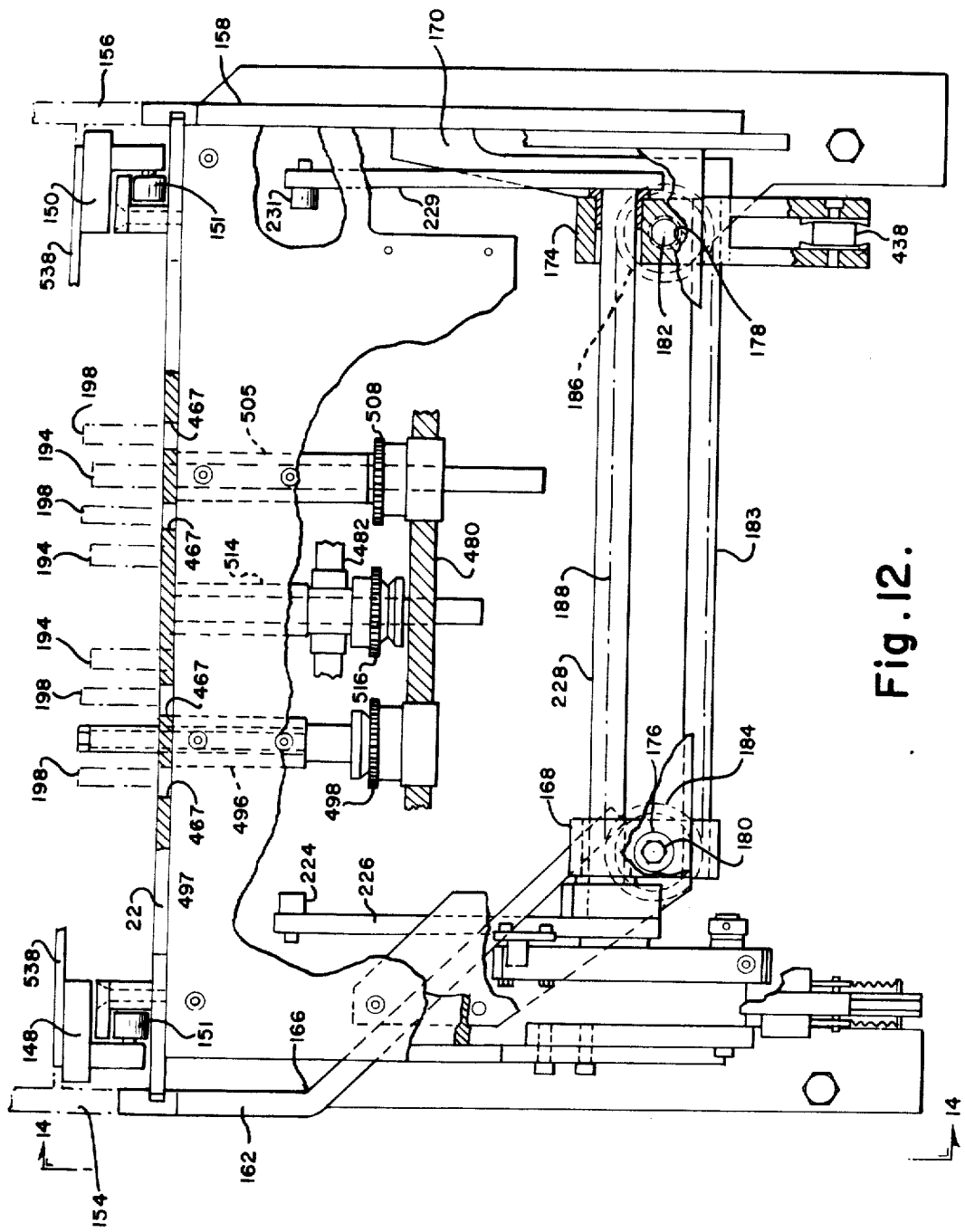
FIG. 12 is an end view of the trimmer looking from the upstream end thereof in the direction of arrows 12 in FIG. 14 and showing aspects of the object feed mechanism.
Figure 26:
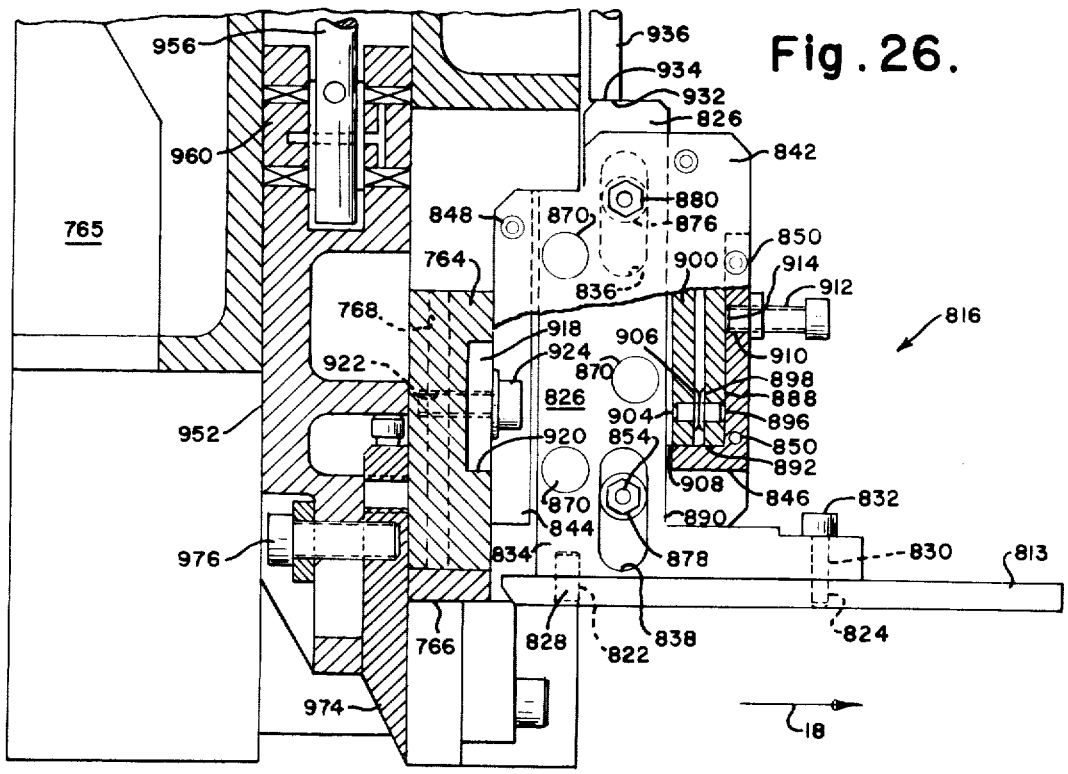
Figure 13:
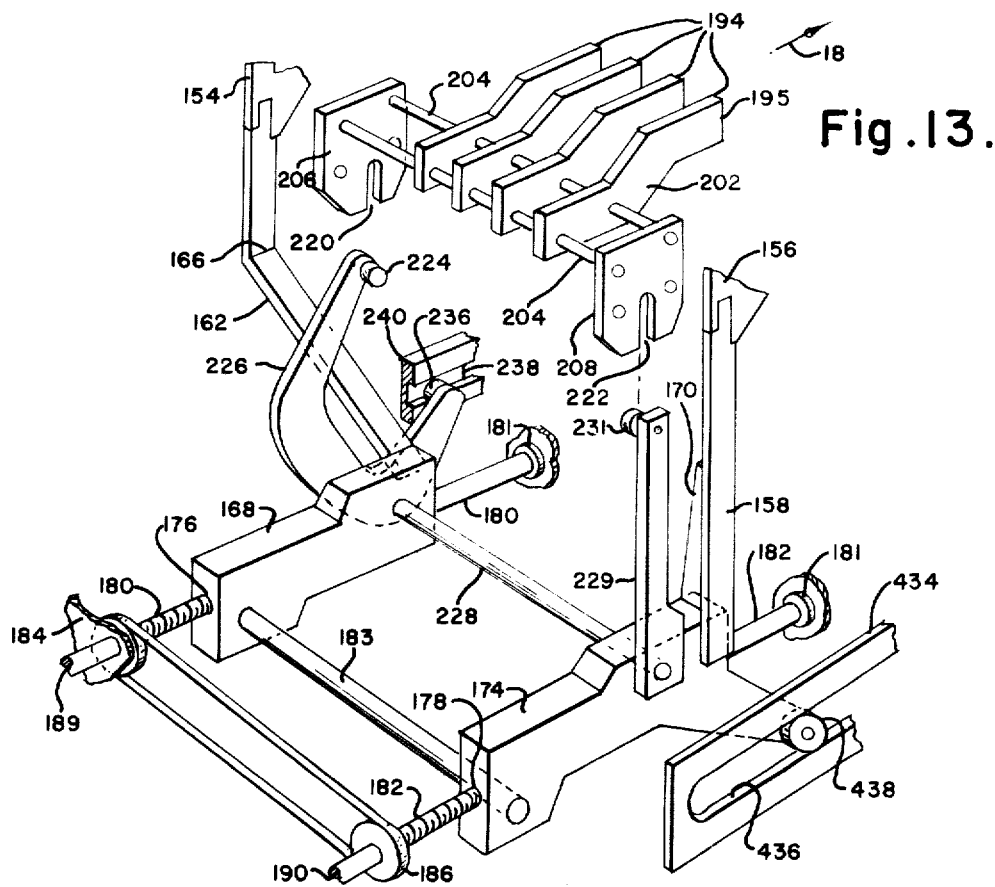
Figure 14:
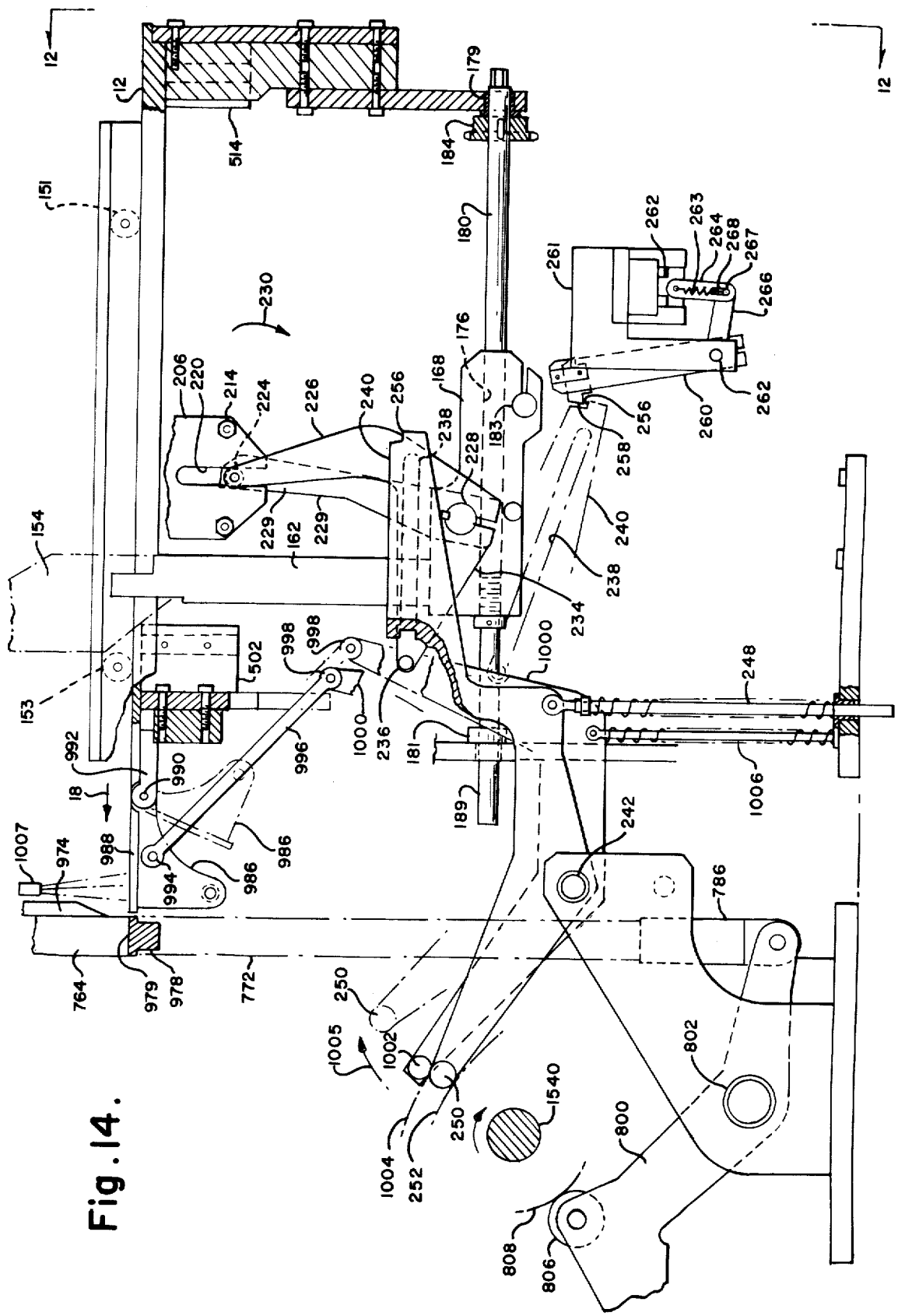
Figures 25, 37:
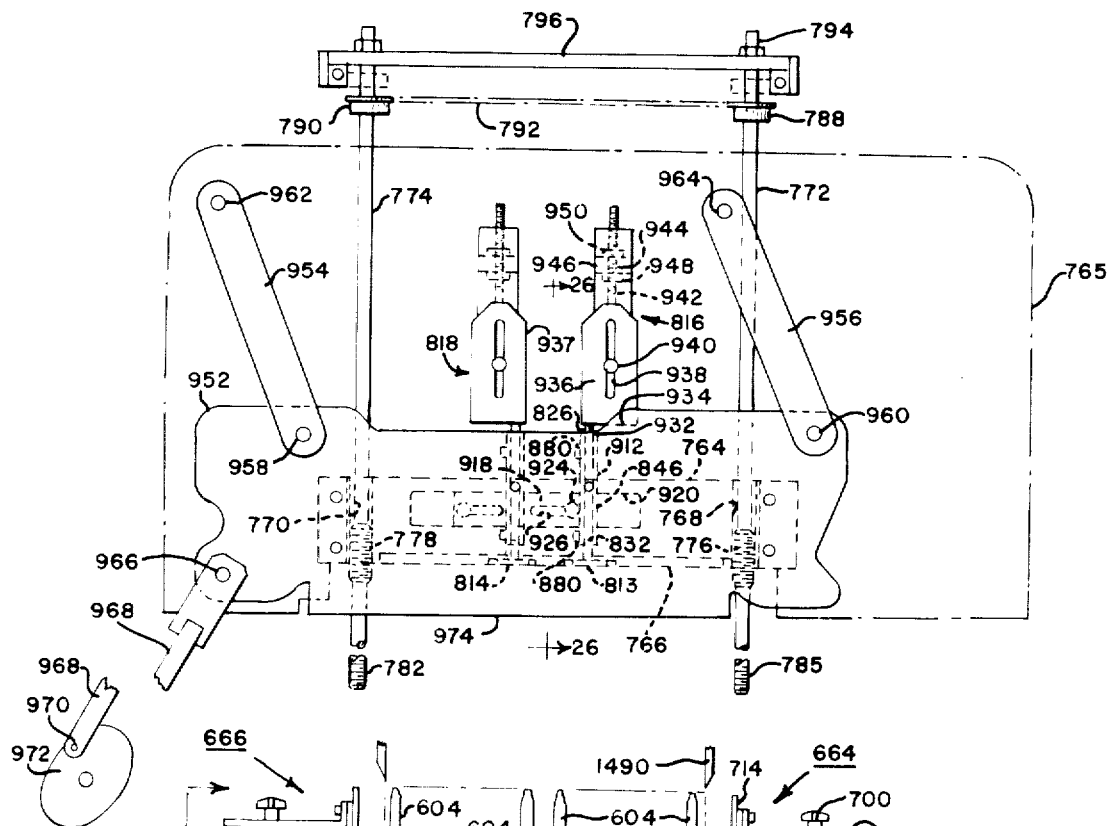
Figure 33:
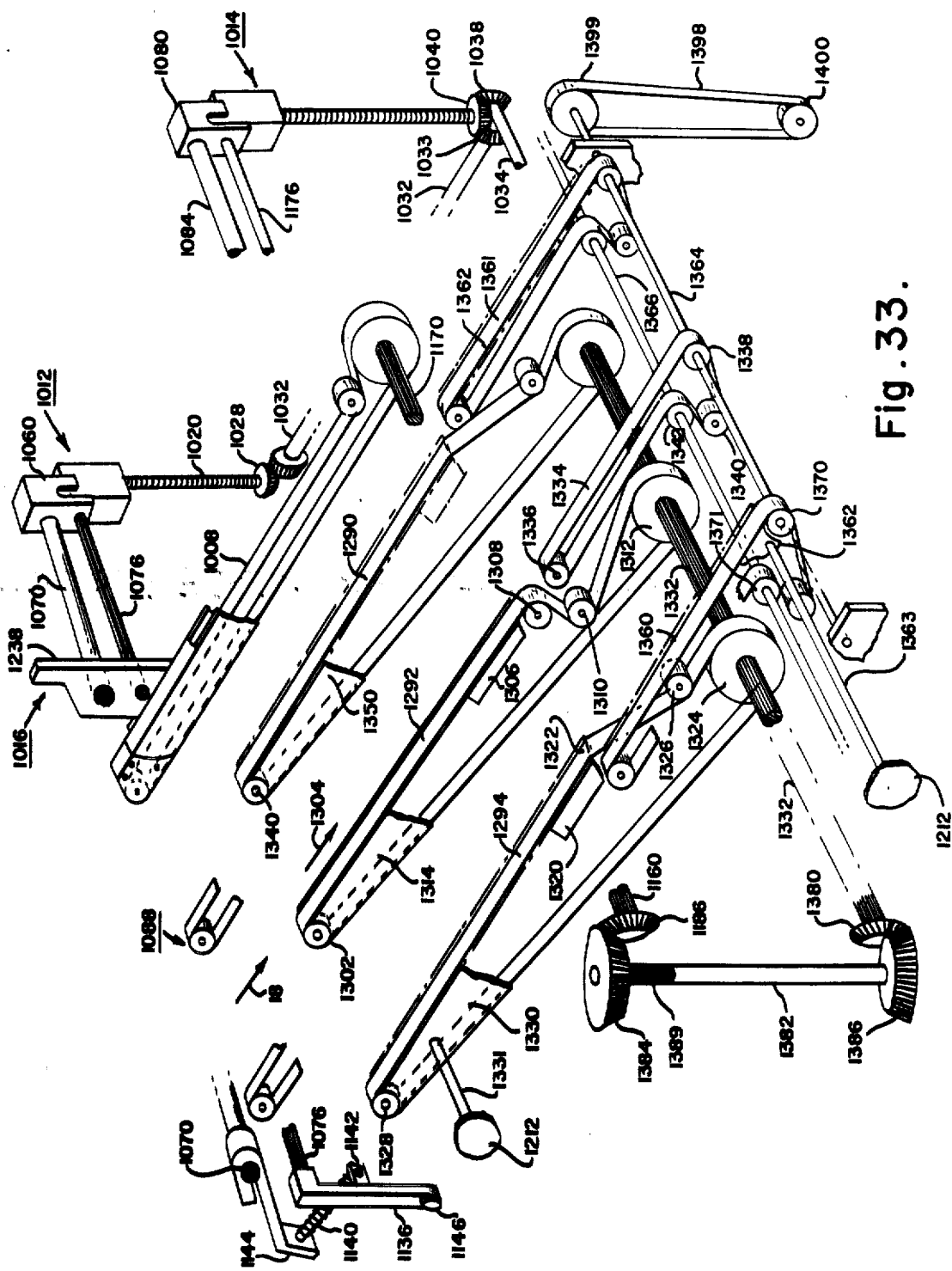
Figure 38:
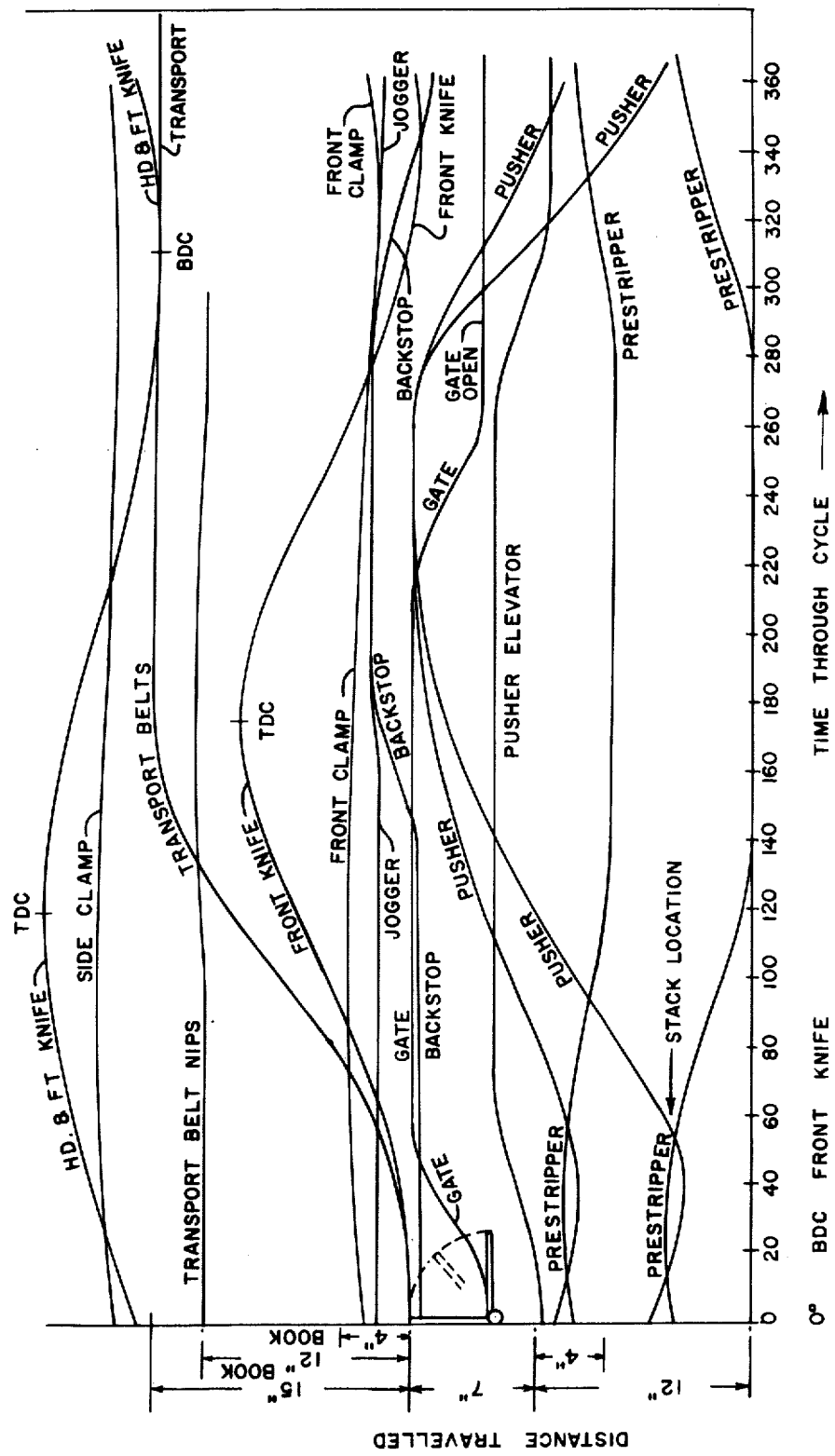
Figure 39:
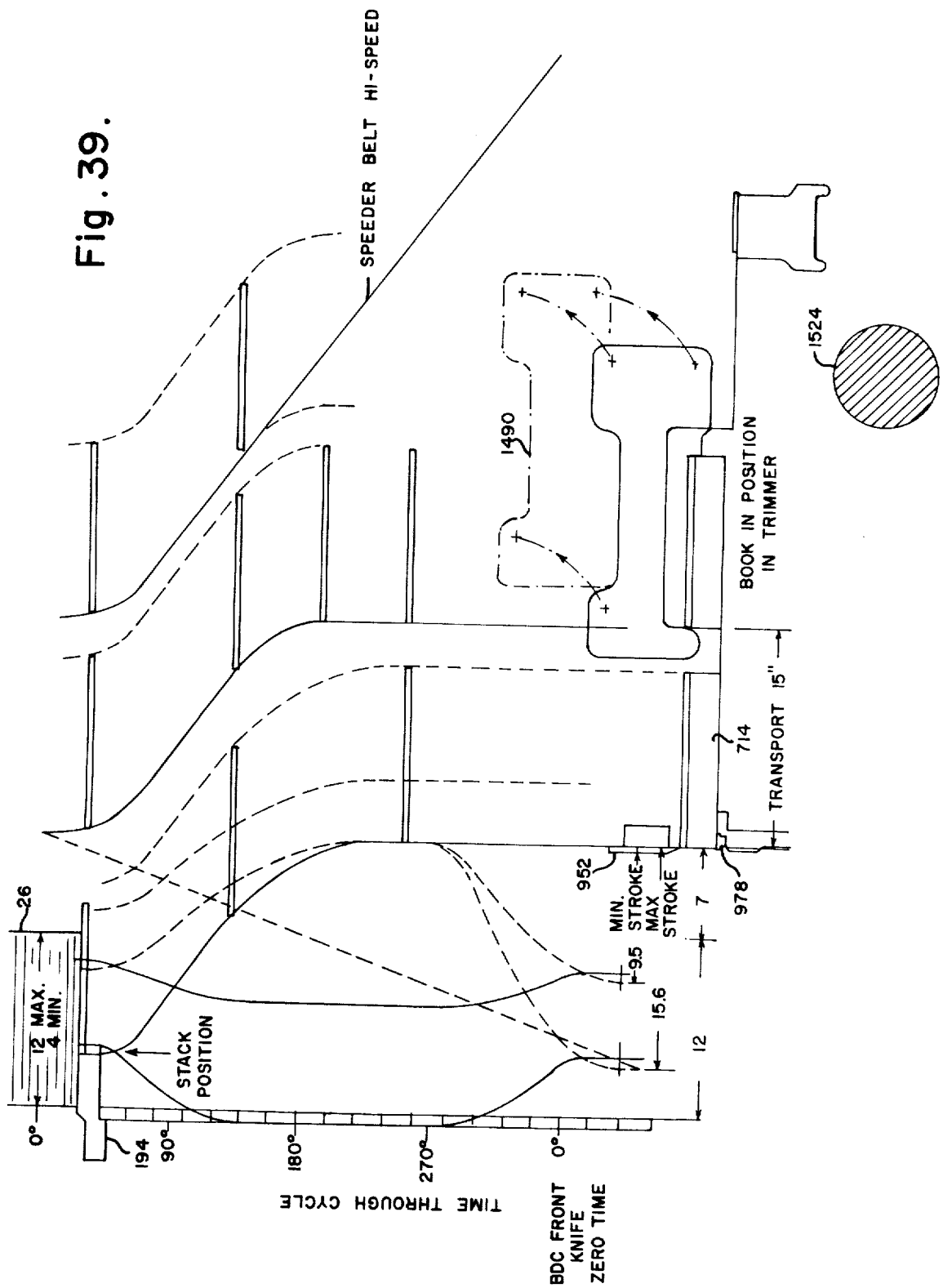

FIG. 13 is a partially exploded perspective view of a fragment of the feed mechanism of the invention;

FIG. 14 is a side elevational view of a portion of the feed mechanism of the invention, particularly showing the means for operating the prestrippers;

FIG. 15 is a view of the opposite side of the trimmer from FIG. 14, also showing a portion of the feed mechanism of the invention, with particular emphasis on the pushers;

FIG. 16 is a top plan view of the feed mechanism of the present invention, without the hopper;

FIG. 17 is an elevational view of the means for elevating the pushers;

FIG. 18 schematically illustrates the means for causing horizontal traverse of the pushers;

FIG. 19 is a view in the same direction as FIG. 12, showing the means for displacing or elevating the feed mechanism;

FIG. 20 is a side view of the backstop for halting books at the first cutting station;

FIG. 21 is a detailed view of a backstop element in the direction of arrows 21 in FIG. 20;

FIG. 22 is a cross-sectional view, looking downstream, of a jogger for aligning a book at the first cutting station;

FIG. 23 is a view in the direction of arrows 23 in FIG. 22 showing the jogger;

FIG. 24 is an exploded perspective view of the jogger of FIGS. 22 and 23;

FIG. 25 is an elevational view of the front knife and clamp assembly;

FIG. 26 is a partial cross-sectional view of an auxiliary clamping means operated in conjunction with the front clamp of FIG. 25;

FIG. 27 is a side elevational view of the transport mechanism of the present invention;

FIG. 28 is an end view in the direction and along the line of arrows 28 of FIG. 27 showing the downstream end of the transport mechanism;

FIG. 29 is an elevational view of one of the support elements for the upper transport belt;

FIG. 30 is a side elevational view of the central upper transport belt;

FIG. 31 is a view of the upstream portion of FIG. 30, showing the transport belt in its elevated condition;

FIG. 32 is an exploded perspective view of the nip, which is lifted to elevate the upper transport belt;

FIG. 33 is a schematic perspective view of the lower trawnsport and speeder belts in relation to the upper transport belts;

FIG. 34 is an elevational view of the second cutting station;

FIG. 35 is a cross-sectional view along the line and in the direction of arrows 35 of FIG. 34;

FIG. 36 is a top view of the second station along the line and in the direction of arrows 36 of FIG. 34;

FIG. 37 is a view of the main cam shaft and the cams and other devices thereto connected for showing how the operation of the apparatus is coordinated;

FIG. 38 is a timing chart for one complete cycle of operation of the trimmer showing how the various subassemblies of the trimmer are coordinated, where each of the subassemblies is positioned at any one point during the cycle of operation and the speeds of the subassemblies; and FIG. 39 is a location chart for tracing the positions of the books in the trimmer at any time during a cycle.

Turning to the drawings, the cycle of operation of the trimmer will be briefly sketched. Thereafter appears a detailed description of all of the elements of the trimmer. Books to be trimmed are stacked in hopper 26 and on surface 22 of infeed table 20. Prestrippers 194, extending up through slots in table 20, move to abut and then strip a book from beneath the stack. Pushers 198, also extending through table slots, move up behind the book that has now been partially stripped from beneath the stack, engage the book and push it to the first cutting station. The prestripper then returns to its start position. After the book has been fed to the first cutting station, the pusher also returns to a starting position, and in doing so, moves down to avoid contacting the books in the hopper. The height of the prestrippers and pushers above the surface of table 20 is adjusted by a raising and lowering carriage 200 on which they are carried, thereby adjusting for various thickness books.

The width of books, which is their dimension facing upstream and downstream in the trimmer, varies. All of prestrippers 194, pushers 198 and hopper front wall 28 are connected to carriages 168, 174, whereby adjustment in the upstream-downstream position of these carriages adjusts the horizontal stroke of the prestrippers and pushers and the position of hopper wall 28.

At the first cutting station, the book is halted by backstops 604. The book has passed between joggers 664, 666, which squeeze the top and bottom edges of the book, to align it after the book has halted. The book has also moved out over and is now supported from beneath by lower transport belts 1290, 1292, 1294 and table fillers 1425, 1426. The upper transport belts 1008, 1009, 1010, which are to clamp the book against the lower belts, to transport it from the first to the second cutting station, are elevated at their upstream ends by means of their respective nips, like 1088.

While lower and elevatable upper belts are specifically disclosed, it is only necessary that there be two pluralities of belts at any orientation, so long as they are in opposition to each other, to engage the book and so long as one of the pluralities is displaceable away from the other to permit feeding of a book to the first station.

Front knife clamp bar 764 descends to clamp the book from above. Mounted on clamp bar 764 are auxiliary clamps 816, 818, which normally depend beneath clamping surface 766 of clamp bar 764, and, therefore, are the first to contact and clamp the surface of the book. There is a friction connection between the auxiliary clamps and main clamp bar 764, whereby clamp bar 764 continues to descend after the auxiliary clamp pads contact the book and thus causes pads 816, 818 to clamp the book. Upon the subsequent ascent of clamp bar 764, the auxiliary clamps move up at the same time. Near the top of this stroke, the auxiliary clamps contact indexing means 936, which causes the auxiliary clamp pads to reassume their initial positions, depending beneath the clamping surface 766.

When clamp bar 764 has descended and clamped a book, front knife 974 descends and, cooperating with bottom knife 978, trims the trailing edge of the book. Gate 986 opens to permit the trimmings to drop out of the path of subsequent books.

The upper belt nips descend, thereby securely clamping the book between the upper and lower belts. Indexing units 1392 causes the transport belts to operate intermittently to carry the book to the second cutting station beneath the side knives, like 1490. The transport belts are then indexed to stop, but remain securely clamped against the book.

Side knife clamps 1430 securely hold the book. Thereafter, the side knives trim the top and bottom edges of the book. Upon the ascent of side knife 1490 and clamp 1430, the transport belts, which remain in clamping engagement with the book, move further downstream until the book is picked up from beneath by speeder belts 1360, 1334, 1361. As soon as the book is picked up by the speeder belts, the upper and lower transport belts incline apart so as to release their grip on the book. The speeder belts operate continuously, rather than intermittently, and at about the speed of the transport belts at the point where they release the book. The speeder belts deliver the book to the slow moving belt delivery table 1410, where the books are stacked in shingled fashion.

The foregoing merely highlights some of the significant features of the trimmer of the invention and of the operations performed upon a book by the trimmer. The following detailed description of the various elements of the trimmer should be referred to for a fuller understanding of the structure and function of the trimmer and its elements and subassemblies.

Turning to the drawings, throughout, arrow 18 indicates the direction of travel of books through the trimmer. As shown in schematic FIGS. 5–8, books 24 requiring trimming are stacked on surface 22 of infeed table 20 and within hopper 26. Both the infeed table and the hopper will be described below.

BOOK FEED MECHANISM

Hopper

Figure 1:
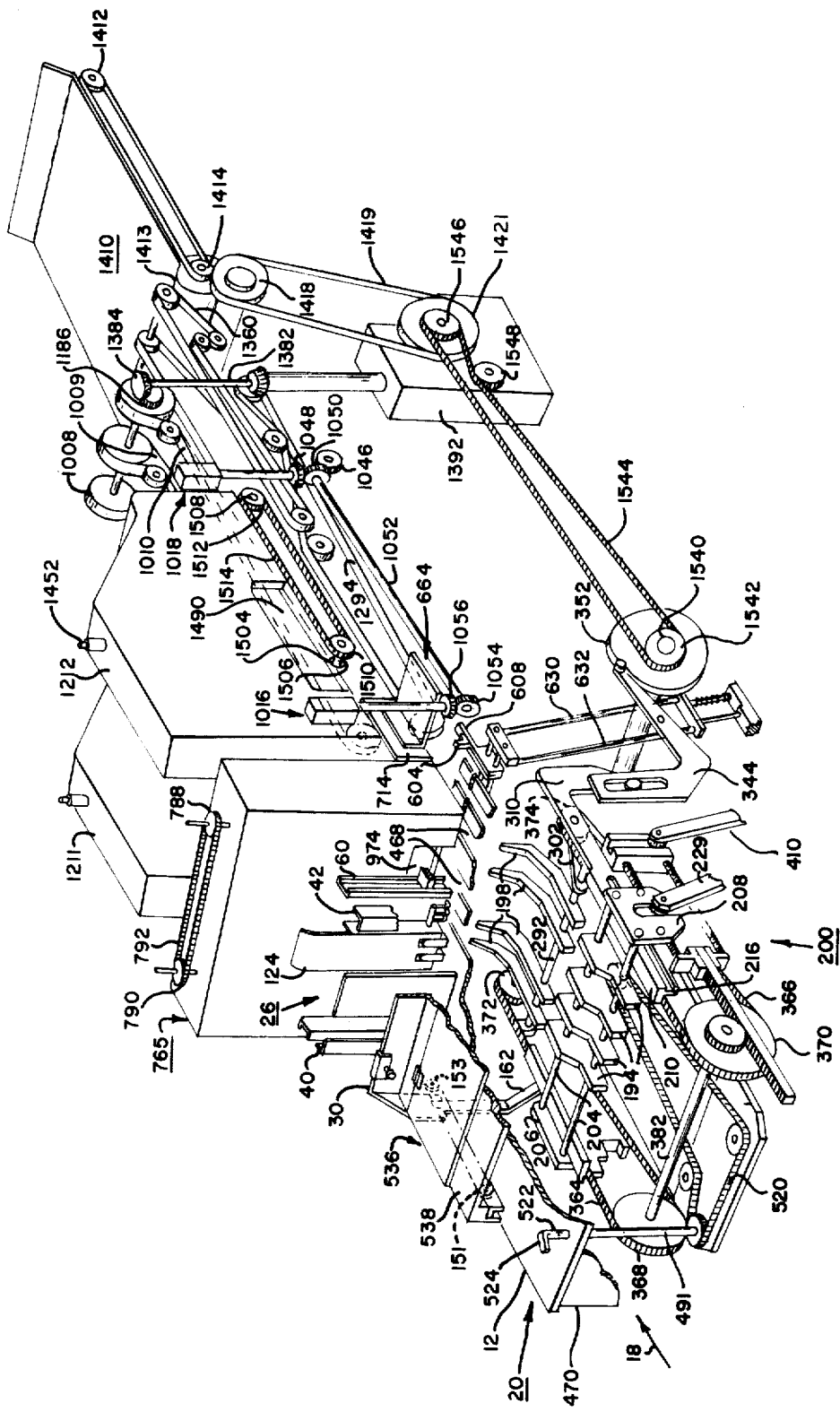
FIG. 1 is a perspective view, partially broken away, showing the main features of a two-station, three-knife trimmer incorporating the features of the present invention.

Turning to FIGS. 1, 3, 5–11, hopper 26, which supports books 24 (FIG. 5) located above table surface 22, includes front wall 28 (FIGS. 9, 10), which faces toward the infeed end of the trimmer. Wall 28 includes main support 30, to which are attached upstanding wall panels, 32, 34, 36 (FIGS. 1, 9, 10). These wall panels may extend down to surface 22.

The spaces between these panels (FIG. 10) and between the lower edge of front wall 28 and table surface 22 (FIG. 5) permits prestrippers 194, described below, to pass beneath wall 28 and strip a book 24 from beneath the stack in hopper 26. By means to be described below, front wall 28 is adjustable toward and away from hopper rear wall 120 (FIGS. 10, 11) to compensate for varying book widths, so that the books will be securely engaged by all walls of the hopper.

The sides of the hopper, which contact the top and bottom edges of the book, are defined by adjustable hopper side guides 40, 42 and by side walls 58, 60 (FIG. 10). Vertically elongated side guides 40, 42 (FIGS. 9, 10) are fixedly connected to respective, independently adjustable side guide support brackets 46, 48. These brackets may be shifted toward and away from each other until the desired positions of guides 40, 42 are obtained. The brackets are then secured on front wall panel 30 by respective tightening handles 52, 54.

The book is also oriented by hopper side walls 58, 60, (FIGS. 9–11) which are shiftable toward and away from each other independently of their respective side guides 40, 42. Securing means 62, 64 join side walls 58, 60 to respective side wall movement guides 66, 68.

These movement guides are axially reciprocable in their respective guide slots 70, 72. When the desired side wall initial positions have been established, respective tightening means 74, 76 are tightened to hold respective movement guides 66, 68 stationary. Normally, the initial positions of side walls 58, 60 would be aligned with respective side guides 40, 42. However, for particular book orientation purposes, these guiding means may be slightly misaligned.

While stripping of books from the stack in the hopper and their movement into the trimmer will be described further below, side guides 80, 82 (FIGS. 9, 10), which guide a book immediately after it is stripped, are associated with their respective side walls 58, 60 of the hopper and will, therefore, be described now. Side guides 80, 82 include respective book engaging surfaces 84, 86 past which a book is moved.

Guide 80 is attached to positioning post 92, which passes freely through opening 94 in panel 96. Guide 80 may be repositioned with respect to hopper side wall 58. Thereafter, securing means 100 is tightened against positioning post 92 to fix that post with respect to panel 96. Now, shifting of movement guide 66 shifts both side wall 58 and guide 80 correspondingly.

Side guide 82 is similarly supported with respect to hopper side wall 60 and is similarly movable together with and with respect to that wall. Guide 82 is connected through support post 104 to panel 106. Panel 106 is fixedly held by side movement guide 68. Securing means 108 fixes post 104 with guide 68.

Located within hopper side wall 58 (FIG. 11) and extending out therefrom is hopper underfill switch operator 112, which operates switch 114, the contacts of which are normally closed when operator 112 is normally pressed into wall 58 by books stacked in the hopper. When the books in the hopper fall below the level of operator 112, there are too few books in the hopper for proper operation of the book feed mechanism, to be described. The weight of the stack of books squeezes the pages of the lowermost book together, so that each time a book is stripped from the stack, precisely the correct number of pages will be stripped. When the stack becomes too short, the weight pressing against the pages of the lowermost book is insufficient and this book will develop sponge, i.e. the pages may wrinkle or develop air pockets between them.

Switch 114, 112 is carried in an elongated vertical slot in wall 58 and its height is adjusted for book thickness. For instance, if it were set high and thick books were being fed, after only a few feeding cycles, the books would fall below operator 112. This would be undesirable and could be avoided by moving switch 114, 112 lower. On the other hand, setting switch 114, 112 too low might permit the stack to become too short before operation of switch 114, 112.

Underfill switch 114 is connected with means, described below, for halting feeding of books from the hopper.

Hopper side wall 58 is also provided with a hopper overfill switch operator 116 (FIG. 11), which extends into the hopper and is operated upward when the hopper is overfilled with books. Operator 116 is connected with switch 118, and when switch 118 is operated, it causes the entire trimmer to shut down, rather than just the book feed mechanism.

The rear or downstream wall 120 of hopper 26 (FIGS. 9–11) includes support panel 122 and rear wall panel 124. Panel 124 includes bearings 126, 128 (FIGS. 9, 11), which support and permit rotation of support bar 130 for hold down guides 546 and stripper gates 548, as described below.

The height of panel 122 must be adjusted to compensate for different book thicknesses. Rear panel 122 includes securing means 134, 136 (FIG. 11), which pass through respective receiving slots 138, 140 in respective rear wall support elements 142, 144. These support elements are fixedly connected with respective elongated support rods 148, 150 (FIGS. 3, 10, 11), which are secured to cross panel 538 (FIGS. 3, 5, 12), which holds rods 148, 150 in position with respect to each other. Beneath rods 148, 150 are disposed support rollers 151, 153 (FIGS. 1-3, 5, 9, 12, 14) which are rollable over infeed table surface 22 to shift the hopper away from front knife housing 765 for gaining access to the contents of the front knife housing.

To compensate for different width books, hopper front wall 28 is movable toward and away from hopper rear wall 120. The means for moving wall 28 comprises side panels 154, 156 (FIGS. 9, 10), which are secured at opposite ends of front wall main panel 30. As shown in FIG. 9, panel 156 is fixedly connected to drive arm 158. As shown in FIG. 14, there is a corresponding drive arm 162, which is fixedly joined to front wall panel 154. Movement of drive arms 158, 162 shifts hopper front wall 30.

Book Width Adjustment Carriage

Turning to FIGS. 1, 3, 12-14, hopper front wall drive arm 162 bends at 166 (FIGS. 12, 13) and then extends into engagement with the periphery of book width adjustment carriage 168. Arm 158 (FIGS. 12, 13) is affixed, through linking element 170, to the periphery of book width adjustment carriage 174.

Passing through carriages 168, 174 are respective threaded openings 176, 178 (FIGS. 12-14), and through these openings pass respective cooperatingly threaded shafts 180, 182 (FIGS. 3, 12-14). Shaft 180 rides in bearings 179, 181 (FIG. 14), which support it from the frame of the trimmer. There is a similar bearing arrangement for shaft 182. To shafts 180, 182 are secured respective equal size sprockets 184, 186 (FIGS. 12-14), which are joined by roller chain 188. Therefore, rotation of either of shafts 180, 182 correspondingly rotates the other shaft to the same extent. Shafts 180, 182 include respective integral extensions 189, 190 (FIGS. 3, 13, 14), which are rotated for rotating shafts 182, 180. Rotation of the shafts in one direction moves carriages 168, 174 toward hopper rear wall 120 (FIGS. 3, 10), and rotation in the opposite direction moves the carriages away from the hopper rear wall.

Rigid shaft 183 (FIGS. 12-14) joins carriages 168, 174, holds them in a proper orientation with respect to shafts 180, 182, upon which they ride, and ensures their proper alignment with respect to each other.

Prestrippers 194 and pushers 198, shown in many of the drawings and described in detail below, strip books from the bottom of the stack in hopper 26 and feed them to the transport mechanism, described below. The prestrippers and pushers should also be adjustable so that the horizontal strokes of these elements are coordinated to begin at predictable positions relative to each other and so that the prestripper drive stroke begins immediately upstream of the stack of books. If the stroke of the prestrippers begins too far forward in the drive direction, the prestrippers will not be upstream sufficiently to be able to strip books from the stack. If the prestrippers start too far upstream from the book stack, upon moving forward, the prestrippers may jolt the books and cause them to separate or become misaligned or may cause an incorrect number of books or book pages to be stripped from the stack. Furthermore, as book width decreases, the horizontal strokes of the prestrippers and pushers may be shortened. This reduction in stroke length permits the trimmer to run more rapidly, as described further below.

Adjustment of the starting locations for the strokes of the prestrippers and pushers is provided by connecting these elements to carriages 168, 174. Because the initial positions of these carriages are adjusted to vary the position of hopper front wall 28 in accordance with book width, the starting positions of the strokes of the prestrippers and pushers will similarly be adjusted for book width.

Although the length of the horizontal strokes of the prestrippers and pushers are adjusted by movement of carriages 168, 174, the mechanisms for causing the prestrippers and pushers to move along their horizontal pathways are arranged, as described below, so that the stroke of the pushers, which deliver the books to the transport mechanism, terminate at the same predetermined delivery location so that the trailing edge of the book is in position to be trimmed.

Feeding From the Hopper

Figure 5:
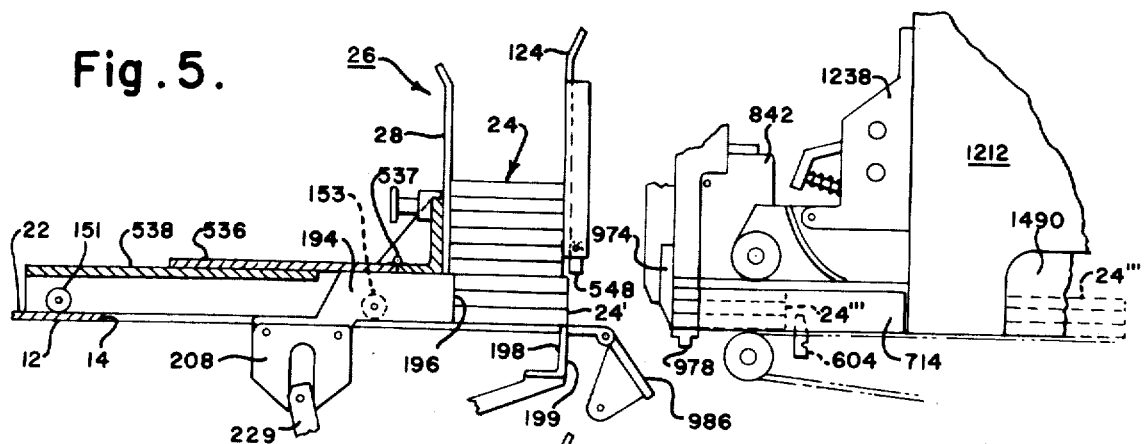
FIGS. 5-8 are sequential schematic drawings showing the sequence of operations of the feed and transport mechanisms of the trimmer of the present invention.
Figure 6:
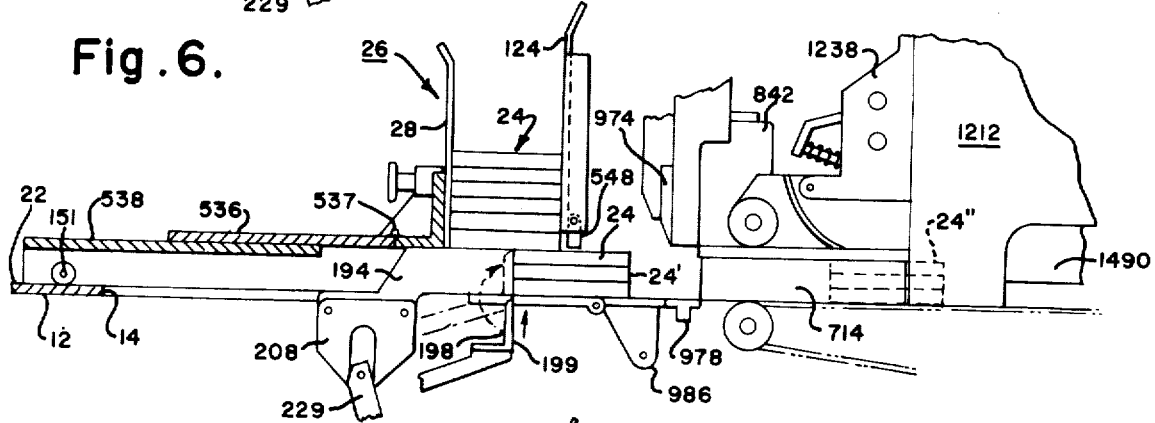

FIGS. 5-8 illustrate the operation of the means, which feeds a book from hopper 26 to the first cutting station, at which front knife 974, described below, is located. Prestrippers 194, as illustrated in FIG. 5, start upstream of books 24. Leading edges 196 of the prestrippers are moved into engagement with the stack of books and strip the lowest book from the stack, as illustrated in FIG. 6. With thinner books, i.e. books which extend a shorter distance above surface 22, a number of books may be simultaneously stripped, fed and trimmed. Each book or group of books stripped in a single motion or prestripper 194 is the object being fed and transported and will hereafter be called a book.

Figure 7:
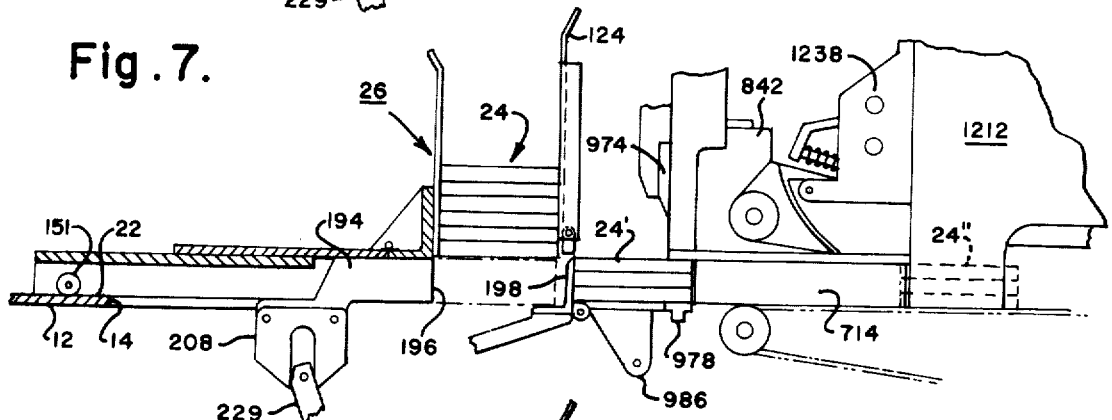
Figure 8:
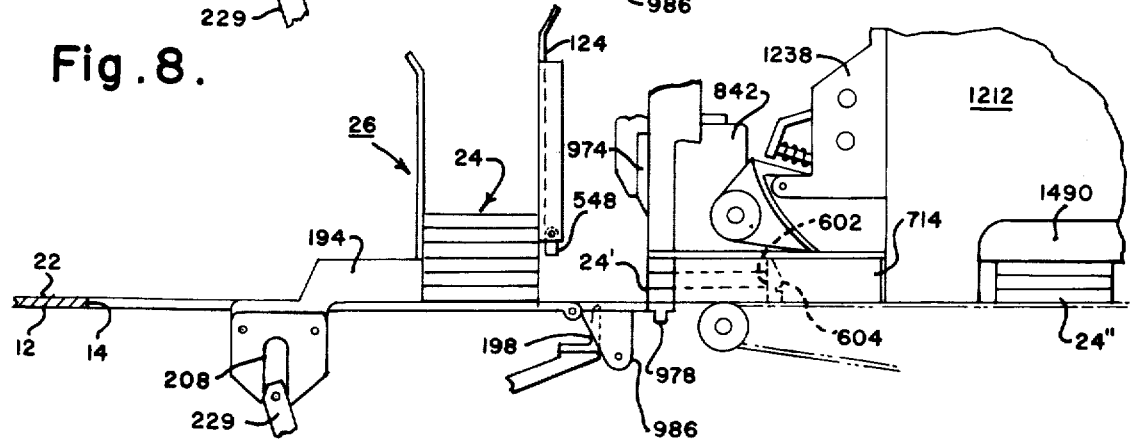

After prestrippers 194 have carried the book part way out from under the hopper to a stack location, at which pushers 198 are rising up from their solid line positions of FIG. 6 to their dotted line positions, pushers 198 move behind the stripped book and their abutment surfaces 199 move the book beneath front knife 974 (FIG. 7) to the first cutting station in FIG. 8. After pushers 198 engage the book, prestrippers 194 return to their start positions for the next stripping operation, as illustrated in FIGS. 7 and 8. Similarly, after completion of their drive stroke, pushers 198 descend and return to their start positions, as illustrated in FIGS. 8, 5 and 6.

Through the use of the combination of both prestrippers 194 and pushers 198, it is possible to efficiently operate the trimmer, because while the pushers are completing the delivery of books to the first station, the prestrippers are returning to their initial positions to be ready to strip the next book. It is not necessary to wait for the full recovery stroke of the pushers before the next book can be stripped.

Both prestrippers 194 and pushers 198 are carried on a guide and support carriage 200, which is disposed beneath surface 22 of infeed table 20, and which is described further in connection with the elements it supports.

Prestrippers

Turning to FIGS. 13, 12–16 and 19, there are a plurality of prestrippers 194, sufficient in number to properly strip a book from the hopper and to move it at a predetermined orientation downstream through the trimmer. Each prestripper (FIGS. 13, 15, 16) includes an abutment surface 195 and is connected, through support arm 202, to supporting crossbars 204. Crossbars 204 are affixed to prestripper side support and receiving panels 206, 208 (FIGS. 13, 15, 16, 19).

Guide and support carriage 200 (FIGS. 15, 16, 19) includes side panels 210, 212, which support and guide prestripper side support panels 206, 208. Panels 206, 208 include guide posts 214 (FIGS. 14, 15, 19), which ride in horizontal pathway guide slots 216 formed in each of side panels 210, 212. Slots 216 guide prestrippers 194 along a flat, horizontal path. The path of prestrippers 194 is horizontal and its height is closely controlled by carriage 200 because the number of pages stripped is determined by the height of the prestrippers, and even a minor height variation would cause the wrong number of pages to be stripped. The prestrippers can be programmed to a precise number of pages. When the prestrippers to be vertically adjustable, as are pushers 198, described below, it would be more difficult to program book height precisely. Also, vertical vibration of the prestrippers, as with the pushers, would rub the trailing edge of the book in the hopper, and raise and lower the pages, so that the number of pages being stripped would be unpredictable.

Prestripper support panel 206 (FIGS. 13, 14, 16) includes a vertically elongated receiving means slot 220 for receiving the drive mechanism, to be described, for the prestrippers. Similarly, panel 208 (FIGS. 13, 15, 16) includes elongated slot 222 for this drive mechanism.

Riding in slot 220 is camming roller 224 (FIGS. 13, 14, 16), which is affixed to pivot link 226. Link 226 is pivotally mounted at pivot mount 228 (FIGS. 13, 14) to carriage 168. Pivot mount 228 comprises a shaft, which extends between carriages 168, 174, and supports prestripper drive link 229, (FIGS. 13, 15, 16), which is rigidly connected to pivot shaft 228. Link 229 includes its own camming roller 231, which rides in slot 222 of panel 208. Therefore, as link 226 pivots, drive element 229 correspondingly pivots, and both cooperate to move the prestrippers in the drive and recovery directions.

Adjustment of the positions of carriages 168, 174 repositions pivot mount shaft 228, which readjusts the initial positions of prestrippers 194.

When link 226 pivots clockwise in the direction of arrow 230 in FIG. 14, prestrippers 194 are returned to the right of their start positions. When link 226 pivots counterclockwise, prestrippers 194 move downstream and strip books from hopper 26. As link 226 pivots, camming roller 224 shifts vertically with respect to panel 206. Slot 220 absorbs the vertical movement of roller 224 and only transmits the horizontal movement of this roller to the prestrippers.

Prestripper drive link 226 has arm 234 (FIG. 14) integral with it. Cam roller 236 is secured to arm 234 and is spaced away from pivot mount 228. When cam roller 236 is moved, this pivots link 226 and moves the prestrippers. Cam roller 236 rides in an elongated receiving means, slot 238, (FIGS. 13, 14), in prestripper drive link 240 (FIG. 14). Slot 238 is elongated so that as pivot mount 228 is repositioned, which readjusts the horizontal position of cam roller 236, slot 238 can still receive roller 236. Link 240 is pivotable about fixed pivot 242. Compression spring 248 normally biases link 240 counterclockwise in FIG. 14 in the direction opposite arrow 230, around pivot 242, which elevates roller 236 and sends prestrippers 194 upstream, to the right in FIG. 14, back to their initial positions. In FIG. 14, the prestrippers would be at their start position, ready to move downstream.

Cam follower 250 is secured to link 240. Spring 248 also drives cam follower 250 into continuous engagement with surface 252 of the prestripper drive cam. Cam surface 252 causes link 240 to pivot clockwise in FIG. 14, which moves slot 238 and roller 236 down, pivots link 226 counterclockwise and moves the prestrippers downstream to the left. When cam surface 252 permits, under the influence of spring 248, link 240 is pivoted counterclockwise, roller 236 moves up and link 226 pivots clockwise, returning the prestrippers to their start position.

Upon clockwise pivoting of link 240, all of roller 250, link 240, slot 238 and roller 236 move from their solid line to their dotted line positions of FIG. 14. Upon counterclockwise pivoting of link 240, all return to their solid line positions.

It is significant that the movement of the prestrippers in the downstream direction is under the positive drive force exerted by cam surface 252. The prestrippers are spring loaded off the book, i.e. they are biased to move away from the book, and are positively cam driven onto the book. The prestrippers are rammed off the cam drive because this pushes the book into stripper gate 548, to be described below, which gate determines if a book is of the proper thickness for the trimmer to accept it, and also determines if the books are jammed up or otherwise misaligned. Every other element of the trimmer is spring loaded onto the book, as shown below, so that in the event of a malfunction, each element can be readily pressed back from the book to minimize damage to the trimmer and to the book being trimmed.

Slot 238 extends in a direction having a component, which is radially away from fixed pivot 242 of link 240. The greater is the width of the book being stripped, the further to the right in FIG. 14 and the further away from pivot 242 are prestripper pivot link 226 and camming roller 236. As link 240 sweeps through its arc, the total distance traversed by roller 236 increases, thereby causing pivot link 226 to pivot through a progressively greater arc and increasing the total horizontal distance traversed by the prestrippers. Thus, a simple adjustment of carriages 168, 174 adjusts not only the initial positions of the prestrippers for the width of the book, but also the length of their strokes from the starting point.

The prestripper downstream stroke ends at a stack location beneath the stack in hopper 26 (FIG. 6), which location also varies with the positions of carriages 168, 174. However, the adjustment in the stack location will not be as great as that in the starting positions of the prestrippers, because the stack location is determined by the positions of carriages 168, 174 while the start positions of the prestrippers are determined both by the positions of carriages 168, 174 and the extent to which link 240 pivots.

In the event that the level of books in hopper 26 drops below a level which affords sufficient compression on the lowermost book in the stack in the hopper to obtain effective stripping of that book, it is desirable to halt further movement of the prestrippers, so as to prevent feeding of books.

The prestripper latching device and the later described pusher latching device operate only to stop the flow of books through the trimmer, but not actually to stop the trimmer. This is to be contrasted with the later described stripper gates, which sense a jam up of books in the hopper and stop the entire trimmer operation.

In FIG. 14, link 240 includes latching shelf 256 for being engaged by latch element 258. Latch element 258 is part of arm 260, which pivots about fixed pivot 262. The means for operating pivot arm 260 is now described. Normally deenergized solenoid device 261 includes a downwardly facing plunger 262, which is connected by spring 263 and connecting link 264 with link 266. Link 266 is rigidly connected with pivot arm 260 and pivots therewith about pivot 262. The weight of link 266 and solenoid plunger 262 pivots links 266, 260, and, therefore, latch element 258 clockwise out of engagement with shelf 256 of link 240.

A reduced level of books in hopper 26 operates above described hopper underfill switch 114, which completes a normally open circuit to solenoid device 261. Plunger 262 is drawn upward. Through link 264, links 266, 260 are pivoted counterclockwise in FIG. 14 and latch element 258 is moved into position where, on the next clockwise pivoting stroke of line section 240, its right hand end contacts and then shifts latch element 258 slightly to the right, stretching spring 263 and moving connection stud 267 on link 266 through slot 268 on link 264. When shelf 256 moves beneath latch element 258, spring 263 snaps element 258 over shelf 256 and thereby latches link 240 in its phantom line position. Spring 263 and slotted connection 268 are required because the signal to energize solenoid device 261 occurs at random, not at a predetermined time, such as after shelf 256 has pivoted clockwise downward past latch element 258. Although the restart signal to solenoid device 261 also occurs at random, unlatching of shelf 256, as described above, occurs at a predetermined time due to the lifting action of cam surface 252, whereby recurrence of book feeding by the prestrippers occurs at a predictable time.

When link 240 is latched by element 258, camming roller 256 is held down, and the prestrippers are held at the stack location.

Upon refilling of hopper 26 above hopper underfill switch operator 112, switch 114 is operated to deenergize solenoid device 261. Switch 114 deactivates solenoid 261 through a time delay relay, which permits loading of the hopper. Each time an additional book is stacked in the hopper, it necessarily presses against switch 112. Were it not for the time delay relay, the momentary pressure on operator 112 would deenergize solenoid 261. The adjustable time delay permits sufficient books to be stacked in hopper 26 to ensure that the lowermost book in the hopper will be adequately compressed for proper stripping.

The manner in which prestripper link 240 is released for subsequent operation is important to the sequence of operation of the elements of the apparatus because immediately upon being released, the prestrippers, under the influence of spring 248, return from the stack location to their start position. The timing of the release of link 240 and of the prestrippers must be coordinated with movement of below described pushers 198 so that prestrippers 194 on their return stroke will leave the hopper area at the same time as the trailing edge of the stripped book is pushed out of the hopper area by pushers 198.

Even after solenoid device 261 is deenergized, spring 248 normally biases the link 240 counterclockwise in FIG. 14 so as to maintain positive frictional engagement between shelf 256 and latching element 258. Therefore, even though gravity is seeking to pivot connecting link 260, as described above, which would separate latch element 258 from latching shelf 256, such movement is precluded until cam surface 252 moves to lift cam follower roller 250 up, thereby pivoting link 240 slightly clockwise and separating latching shelf 256 slightly from latch element 258. This separation permits link 260 to be pivoted clockwise and removes the latching element 258 from its blocking position with respect to link 240. Prestripper link 240 is released only when cam surface 252 has moved to pivot prestripper link 240 so as to move the prestrippers into the stack location, thereby ensures release of the prestrippers during that portion of their cycle when they would normally be at the stack location. This ensures that the cycle of operation of the prestrippers begins at the appropriate point.

Pushers

Pushers 198 and the means for operating them are illustrated in FIGS. 1–3, 12, 13 and 15–18. As shown in sequential FIGS. 5–8, pushers 198 cannot follow the simple horizontal pathway of prestrippers 194. They must travel downstream in the drive direction in an elevated condition to be able to push the book to the first cutting station and must move in the recovery direction below surface 22 of table 20, so as to avoid engaging the books in the hopper and the further books being stripped by prestrippers 194. Means are provided for causing pushers 198 to traverse a horizontal pathway and for causing pusher elevation and descent.

As shown in FIG. 15, when the book is wide, pushers 198 follow a path schematically illustrated by pathway 274. When the book is narrow, the width of the path of pushers 198 narrows to path 276. How the pathway is narrowed is described below. Pathway 274 has a number of significant characteristics. In its main book drive section 278, the pushers are still within the hopper. Once the pushers have passed stripper gates 548 and leave the hopper, the pushers move upward slightly at 280 and then move along course section 281, so that the upper tips of pusher abutment surfaces 199 are above the topmost pages of the book being moved. In this way, no pages separate from the top of the book. After completion, at 282, of the drive stroke of the pushers, they return along course section 284 and gradually descend to the lowermost course section, at 286, where the pushers are passing beneath the hopper to return to the start position. Shorter width path 276 has substantially the same characteristics as path 274, but they are condensed in a shorter width.

Pushers 198 contact a book at the stack location immediately after the book is released by the prestrippers. Each pusher 198 is secured to a respective pivotable support arm 290 (FIGS. 15, 16). All arms 290 are rigidly secured to pivotable support bar 292 (FIGS. 15, 16, 19). Bar 292 is carried at its end by bearings 294, 296 (FIGS. 16, 19), in which the bar is freely pivotable. Bearings 294, 296 are, respectively, secured to pusher drive chain means 364, 366, described below.

For elevation and descent of pushers 198, their support arm 290 must reciprocatingly pivot about support bar 292. Bar 292 is rigidly connected by securing means 300 to pusher connecting link 302 (FIGS. 15, 16, 19). Camming roller 304 attached on link 302 rides in elongated receiving means, slot 306 of pusher elevator 308 (FIGS. 1, 2, 15, 16, 17, 19).

Elevator 308 (FIGS. 17) includes main parallel linkage 310, which is supported for parallel movement by pivoting equal length support arms 312, 314. These arms are pivotally connected to linkage 310 at pivot connections 316 and to the frame of the trimmer at pivot connections 320. Compression spring 322 normally continuously biases linkage 310 to the right thereby biasing linkage 310 to elevate and causing pushers 198 to be spring biases onto the book being pushed. Linkage 310 includes depending arm 330 having driving cam follower roller 332 secured thereto.

Linkage 310 also includes elongated arm 334, which has above noted slot 306 running substantially its entire length. Slot 306 is elongated for a number of reasons. First, as linkage 310 ascends and descends, because it is a parallel linkage, it also shifts sideways. Elongation is required to permit roller 304 of connecting link 302 to remain stationary as compared with arm 334 and to not move sideways as linkage 310 so moves. Second, during operation, pushers 198 follow a horizontal pathway, which means that roller 304 in slot 306 also traverses a horizontal path. The elongation of slot 306 provides the necessary clearance for travel along this path. Third, the initial positions of pushers 198 and, therefore, of roller 304 can be adjusted for various width books. Slot 306 permits these initial adjustments.

Slot 306 includes two sections, forward section 336, which is nearer the infeed end of the trimmer and which is at first elevation, and rearward section 338, which is at a slightly higher elevation. After pushers 198 move downstream, by means to be described, and leave hopper 26, the pushers elevate slightly (280 in FIG. 15). The slight elevation is accomplished by the slight elevation in slot 306, through which slot roller 304 travels as the pushers move downstream.

Turning to FIG. 15, cam follower roller 332 rides in cam slot 340 of arm 342 of rigid pusher elevator drive linkage 344. Linkage 344 is pivotally mounted at 346 to an immovable trimmer frame element 348.

Cam slot 340 is elongated because the entire infeed carriage 200 and, therefore, roller 332 can be vertically shifted to adjust for book thickness, in the manner described below, while arm 342 may not be similarly vertically adjusted. Thus, roller 332 has freedom to move with respect to arm 342 during the height adjustments of carriage 200.

As is illustrated by a comparison between the upper phantom path of roller 332, which path is followed when the book is thick, and the lower phantom path, which is followed when the book is thin, the maximum elevation attained by the pushers with respect to carriage 200 is always the same. However, as the book becomes thinner, elevator linkage 310 descends a smaller distance, thereby drawing pushers 198 down a smaller distance. This occurs because as roller 332 moves downward through slot 340, the roller approaches pivot 346 of pivotable link 344, whereby the angular displacement of roller 332 is correspondingly decreased. When the book to be trimmed is thinner, the highest part of the upper course of pushers 198 is lower with respect to surface 22 of infeed table 20 because carriage 200, described below, which carries the pushers and the pusher elevator, descends. The maximum elevation of the pushers with respect to carriage 200 never varies. Since the pushers are lower with respect to infeed table surface 22, the pushers must descent only a smaller distance before they move beneath surface 22. The pushers always will be moved down sufficiently to be beneath surface 22 of table 20. The shorter descent of the pushers for a thin book permits operation of the trim to be speeded up as the book becomes thinner.

Slot 340 is elongated vertically so that book thickness adjustments are made perpendicular to the horizontal drive and recovery directions of the pathway for the pushers. Therefore, horizontal movement of the pushers is unaffected by the thickness of the book.

Furthermore, the path of movement followed by pusher elevator linkage 310 is not concentric with the pivoting path followed by arm 342. The elongation of slot 340 permits the relative movement between roller 332 and arm 342, which will necessarily result as linkage 310 operates.

At its end away from arm 342, linkage 344 carries cam following roller 350, which rides along cam surface 352 of the pusher elevator drive cam. Cam surface 352 drives linkage 344 to pivot counterclockwise in the direction of arrow 354 in FIG. 15. Compression spring 356 continuously biases linkage 344 clockwise.

When linkage 344 is pivoted counterclockwise under the influence of cam surface 352, the pivoting of slot 340 moves cam follower roller 332 and linkage 310 to the left, which causes elevator linkage 310 and linkage roller 304 in slot 306 to descend. Pusher connecting link 302 and rigidly attached pusher support arms 290 pivot clockwise. This moves pushers 198 down and eventually beneath infeed table surface 22. When linkage 344 is permitted by cam surface 352 to pivot clockwise under the influence of spring 356, slot 340 carries roller 332 to the right, which moves elevator linkage 310 upward. Linkage roller 304 ascends, connecting link 302 and pusher support arm 290 pivot counterclockwise and pushers 198 are spring biased to ascend behind the book, which is then moved forward by traverse means.

In addition to shifting up and down, pushers 198 must traverse a horizontal path in order to move the book to the first cutting station. A horizontal traverse means for driving pushers 198 in the drive and recovery directions is provided.

As was noted above, common support bar 292 (FIGS. 1, 15, 16) for all pushers 198 is secured at one end to drive chain 364 and at the other end to drive chain 366. These chains pass about cooperatingly toothed respective drive sprockets 368, 370 and over respective adjustably positionable idler sprockets 372, 374. Drive sprockets 368, 370 are each affixed to common shaft 382 (FIG. 16). Shaft 382 passes through appropriate respective bearings 381, 383 in side panels 210, 212 of carriage 200, which locates shaft 382.

Upon rotation of shaft 382, clockwise in the direction of arrow 384 in FIG. 15, both of sprockets 368, 370 rotate in the same direction, and chains 364, 366 are moved so that their upper sides or courses move to the right. Pushers 198 are moved in the drive direction to push the book to the first cutting station. When shaft 382 rotates counterclockwise, sprockets 368, 370 correspondingly rotate and the upper courses of chains 364, 366 move to the left. Pushers 198 are moved in the recovery direction back to their start positions.

Pinion gear 386 (FIGS. 15, 16, 18) is affixed to shaft 382. Rotation of this gear rotates shaft 382 and thereby moves pushers 198. Gear 368 cooperatingly meshes with the surface of rack 388, whereby movement of the rack rotates the gear. Rack 388 is secured to crossbar 390, which is constantly biased to the left in FIG. 15 by compression springs 392, 394. Springs 392, 394 at their other ends press against abutment 396, which is immovably secured to side panel 210 of carriage 200. When rack 388 moves to the left, the upper course of chains 364, 366 move to the right with the results described above. Thus, the pushers are spring loaded onto the book. It is significant that the spring loaded pushers always move in the drive direction to the same terminal position, at which the book trailing edge is in position to be trimmed.

For moving rack 388 to the right, which moves the upper course of chains 364, 366 to the left, with the results described above, draw bars 402 are connected to rack crossbar 390 at one end, pass through clearance openings 404 in spring abutment 396 and are fixedly connected to drawing element 406 at their other ends. As illustrated, draw bars 402 pass through and serve as guides for springs 392, 394. When drawing element 406 is shifted to the right, rack 388 moves to the right.

Considering FIGS. 15 and 18, drawing element 406 is moved to the right by clockwise pivoting, in the direction of arrow 408, of pivoting link 410. Link 410 includes a camming roller 412 at its end, which rides in elongated receiving means or cam follower slot 414 in drawing element 406. Slot 414 is elongated because link 410 pivots about a fixed pivot axis 419, whereas drawing element 406 only reciprocates left and right, whereby camming roller 412 will traverse slot 414 during pivoting of link 410. Furthermore, carriage 200, and drawing element 406 which rides therewith, may be raised and lowered to compensate for varying book thicknesses, while link 410 is not similarly adjustable. The elongation of slot 414 permits such relative height adjustment. Also, because slot 414 is vertical and, thus, parallel to the direction along which carriage 200 is height adjusted for different book thicknesses, such adjustments do not affect the extent of movement of rack 388, which would vary the length of the horizontal pathway traversed by pushers 198, and which should only be dependent on book width.

Link 410 has extension arm 416 rigidly connected to it, and also supports the cooperatingly moving extension arm 418. At the junction between link 410 and arm 416 is pin 419, which pivots in a journal fixedly attached to trimmer support 420. Extension arm 418 carries a similar pin 421, which pivots in a journal attached to frame 422 of the trimmer.

A crossbar 424 extends between and is freely rotatably supported in journals at the free ends of extension arms 416, 418. Crossbar 424 passes through and is clamped in section 425 of pusher traverse means drive link 432. As section 425 moves up and down, by means described below, crossbar 424 moves similarly, thereby shifting extension arms 416, 418 and pivoting link 410.

Link 432 has a portion 434, which includes an elongated receiving means, slot 436, for drive link fulcrum pin 438. Fulcrum pin 438 is affixed to above described movable carriage 174 and, therefore, moves through slot 436 as carriage 174 is adjusted for book width.

When link 432 is pivoted clockwise in the direction of arrow 440 in FIG. 15, then crossbar 424 and links 432, 410 are also pivoted in the same direction. This shifts drawing element 406 to the right, which moves rack 388 to the right, causing pushers 198 to move in the recovery direction. When link 432 pivots counterclockwise, then crossbar 424 and links 432, 410 pivot in the same direction, which moves drawing element 406 and rack 388 to the left, and moves the pushers in the drive direction.

Because the arc of pivot of crossbar 424 about pivot 419, 421 is not coaxial with the arc of pivot of link 432 about fulcrum 438, as crossbar 424 pivots, it moves link 432 longitudinally. Such longitudinal movement is taken up by elongated slot 436.

Once the initial position of carriage 174 has been determined for a particular book width, fulcrum pin 438 is stationary with respect to drive link 432. Under the influence of means described below, link 432 pivots between its solid line and its dotted line positions. As it pivots, it carries along crossbar 424 between the solid line and dotted line positions of the latter.

The length of the arc through which crossbar 424 pivots is dependent upon the total distance over which portion 425 of link 432 pivots. The length of the latter arc is dependent upon the location of fulcrum pin 438. Since link 432 pivots about fulcrum pin 438, the closer fulcrum pin 438 is located to portion 425, the shorter will be the length of the arc through which crossbar 424 is pivoted by a predetermined movement of link 432. (The minimum movement of crossbar 424 would occur if fulcrum pin 438 were aligned with crossbar 424.)

The positions of carriage 174 and of fulcrum pin 438 are varied with the width of the book. As the book narrows, carriage 174 is moved to the right in FIG. 15, thereby shortening the distance between fulcrum pin 438 and bar 424. This shortens the horizontal path traveled by pushers 198. Similarly, as the book widens and carriage 174 is moved toward the infeed end of the trimmer, the distance between fulcrum pin 438 and bar 424 increases, and pushers 198 travel through a greater horizontal stroke.

Since fulcrum pin 438 for the horizontal path of pushers 198, pivot shaft 228 for the horizontal pathway for prestrippers 194 and front wall 28 of hopper 26 are all initially positioned by adjustment of carriages 168, 174 (FIG. 13), a single adjustment for book width adjusts all parts of the book feed mechanism that vary in performance for different book widths.

At the end of link 432 is cam follower 442, which engages cam surface 444 of the pusher horizontal traverse means drive cam. The drive cam pivots link 432 clockwise in the direction of arrow 440 in FIG. 15, which moves the pushers in the recovery direction.

For moving the pushers in the drive direction, there are above noted springs 392, 394. Cooperating with them is compression spring 446, which biases link 432 counterclockwise, holds cam follower roller 442 in continuous positive engagement with cam surface 444 and, therefore, cooperates in moving the pushers in the drive direction.

Movement of fulcrum pin 438 through slot 436 in link 432 does not vary the actual displacement of cam follower 442 which is affixed to link 432, since the cam follower is biased to ride over cam surface 444.

As with prestrippers 194, it is desirable to halt the operation of pushers 198 in the event that the level of books in the hopper reduces below a predetermined height. Link 432 (FIG. 15) includes latch shelf 454, which is adapted to be engaged by latching element 456. Element 456 is secured to arm 458, which pivots around fixed pivot 460. Arm 461 is rigid with respect to arm 458. Through link 462, which includes slot 463, and spring 464, arm 461 is connected with plunger 465 of solenoid device 466. As with the prestripper solenoid device 261, the weight of plunger 465 and arm 461 normally moves arm 458, and therefore, latching element 456 clockwise away from latching engagement with shelf 454. Upon energizing of solenoid device 466, which occurs under the same conditions as for solenoid device 261, plunger 465 draws up link 464 and pivots arms 461, 458, counterclockwise, moving latch element 456 into position to be engaged by latch shelf 454 as link 432 pivots clockwise. Then, spring 464 causes latch element 456 to move to block return of link 432, thereby holding this link in its dotted line position of FIG. 15. The pushers are then locked at their start positions and cannot traverse the horizontal pathway. However, neither pusher elevator 308 nor elevator drive linkage 344 are halted from operating. Although the pushers cannot move horizontally, they are bobbing up and down in place.

As with the prestrippers, the time of release of the pushers is controlled. When solenoid device 466 is de-energized, the frictional engagement between latch element 456 and shelf 454, under the influence of spring 446, prevents separation of these elements. It is only when cam surface 444 has moved so that the section thereof, at which the pushers are at their start position, passes cam follower 442 that link 432 is pivoted clockwise sufficiently to separate latch element 456 from shelf 454, and the pushers then begin operating from their start positions.

Release of the pushers and prestrippers is coordinated for proper operations of the trimmer.

As shown in FIG. 7 on the return stroke of the prestrippers from the stack location, the prestripper abutment surfaces 196 must exit from the hopper area, defined by the front and rear walls of the hopper at the same time as the trailing edges of the pushers pushing the book to be trimmed move out of the hopper area. In this manner, the next higher book in the hopper will settle evenly onto table surface 22 to be picked up by the prestrippers, and it will not settle at a tilt with either of its leading or trailing edge being, respectively, held up by the pushers or the prestrippers.

Infeed Carriage

In addition to adjustments for book width and height, it is necessary to adjust for book thickness, i.e. the height of the book to be trimmed above upper surface 22 of the infeed table 20.

Turning to FIGS. 1, 3, and 5-8, infeed table 20 is nonmovably supported on trimmer frame element 470. Table upper surface 22 (FIG. 3) is slotted at 467 to permit prestrippers 194 to pass through surface 22, and is slotted at 468 to permit pushers 198 to pass through surface 22. Both the prestrippers and the pushers must extend through their slots a distance approximately equal to the thickness of the book to be fed.

Turning to FIG. 15, as described above, the height of prestrippers 194 with respect to carriage 200 is invariable because this carriage serves as the horizontal guide for the prestrippers. While the pushers shift vertically with respect to carriage 200, they are carried on chains 364, 366, which are invariable in height with respect to carriage 200, and the height of the upper course 278, 281 of the pathway of pushers 198 with respect to carriage 200 remains constant no matter how the extent of pusher descent is adjusted. The heights of prestripper abutment surfaces 195 and of pusher abutment surfaces 199 along pusher course section 278 are adjusted to be substantially identical. Hence, the pushers move the same thickness of book as the prestrippers.

To adjust the height of prestrippers 194 and pushers 198 with respect to infeed table surface 22, the height of carriage 200, which determines the height of the prestrippers and pushers with respect to surface 22 is adjusted.

Turning to FIGS. 12, 15, 16, and 19, in the vicinity of the infeed end of carriage 200 is crossbar 472, which is secured between carriage panels 210, 212. Nearer the outfeed end of the carriage 200 is similar crossbar 474, which is also secured between panels 210, 212. Raising and lowering of these crossbars correspondingly shift carriage 200.

Crossbars 472, 474 pass through lifting panels 476, 478 (FIGS. 16, 19). These panels are secured near the infeed end of carriage 200 to carriage floor section 480 and near the outfeed end of the carriage to carriage floor section 482. Floor sections 480, 482 must ascend and descend to an identical extent. Section 480 includes two bearings 486, 488 and section 482 includes bearing 490.

Passing through bearing 486 (FIG. 19) is rotatable shaft 491, which rotates in bearing 486 and is held by securing means 492 against shifting axially with respect to the bearing. Shaft 491 includes threaded surface section 493, which passes through opening 494 in cooperatingly threaded sleeve 496. Sleeve 496 in nonmovably secured to underside 497 of infeed table 20. Upon rotation of shaft 491 in one direction, e.g. clockwise, shaft 491 ascends through sleeve 496 and draws up its bearing 486 and thereby table section 480. Rotation of shaft 491 in the other direction causes table section 480 to descend.

Fixedly secured to shaft 491 is sprocket 498, which rotates with shaft 491. Sprocket 498 cooperates, as described shortly, in raising and lowering the other bearings 488, 490, for moving table sections 480, 482 together.

Turning to bearing 488, it surrounds a connecting nut 500, which is internally threaded to cooperate with the externally threaded surface 502 of shaft 503. Shaft 503 is nonrotatably, rigidly carried, in sleeve 505, which is nonmovably secured to underside 497 of table 20. As distinguished from shaft 491, shaft 503 is immobile.

Secured to nut 500 is sprocket 508, rotation of which rotates nut 500. As nut 500 is rotated by the sprocket, it ascends and descends along stationary shaft 503. Through the securement of bearing 488 to nut 500, rotation of sprocket 508 causes elevation and descent of table section 480. Means for rotating sprocket 508 will be described below.

Similarly, bearing 490 is secured to internally threaded nut 510, which rides over the externally threaded surface of immovable shaft 512. Shaft 512 is held by sleeve 514 securely to underside 497 of table 20. As with nut 500, rotation of nut 510 raises and lowers bearing 490 and thereby table section 482. A sprocket 516 is secured on nut 510, for rotating the same by means to be described.

The bottoms of sleeves 505, 514 are spaced away from the tops of nuts 500, 510 and their respective engagements serve as an upper limit stop for carriage 200.

Figure 3:
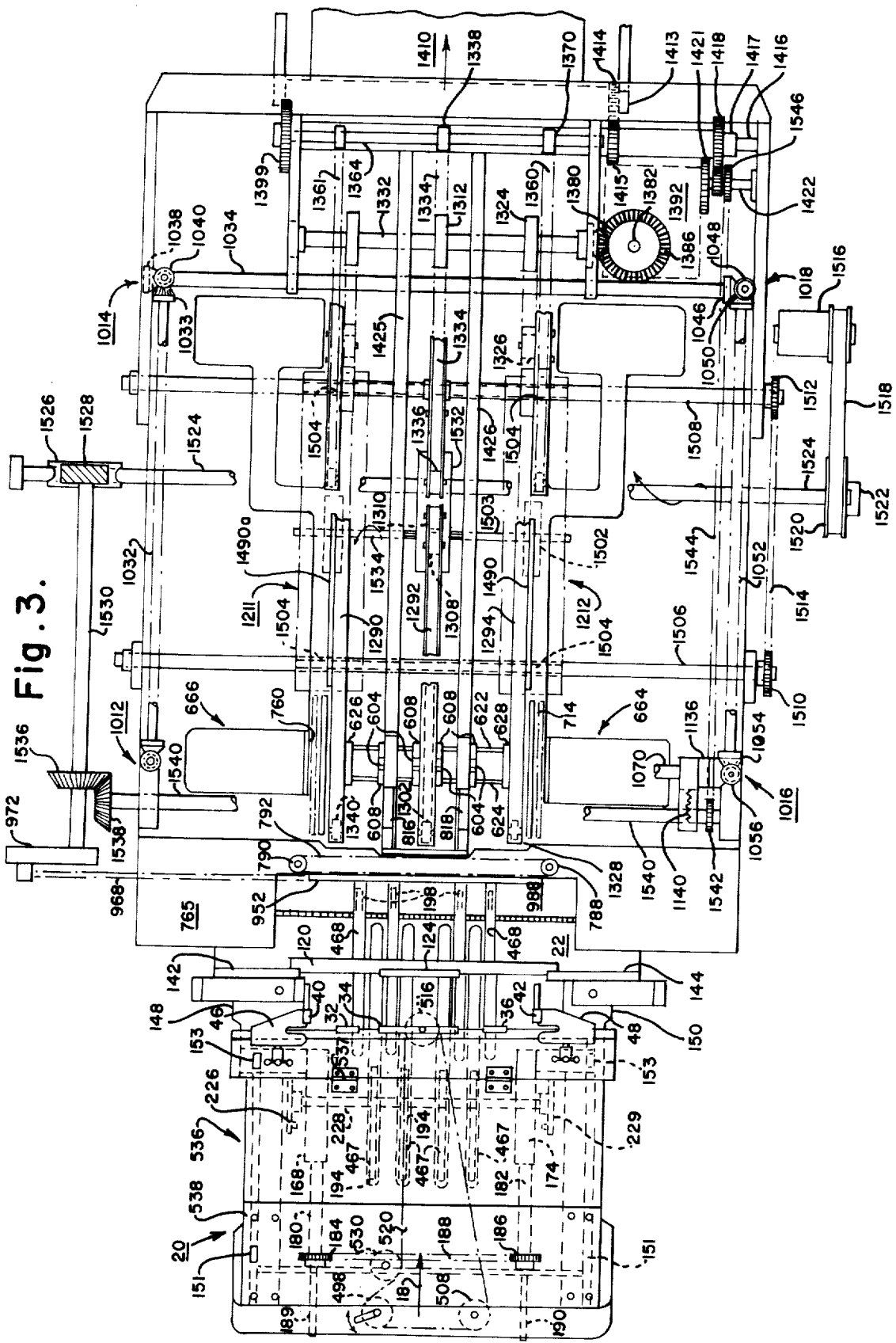
FIG. 3 is a top plan view of the lower portion of the trimmer of FIG. 2 in the direction of arrows 3 and taken along the line of arrows 3, showing many of the significant features of the trimmer of the invention.

Wrapped about all of sprockets 498, 508, 516 is cooperating roller chain 520 (FIGS. 3, 16). Therefore, rotation of shaft 491 rotates sprocket 498, and through chain 520, rotates sprockets 508, 516, thereby rotating respective nuts 500, 510. The pitches of the threads on shafts 491, 503, 512 and the sizes of sprockets 498, 508, 516 are so chosen that an equal degree of rotation thereof will cause an equal distance of ascent and descent of table section 480, 482.

Shaft 491 includes an upper exposed section 522 (FIG. 1, 19), which extends above upper surface 22 of table 20. A manually operable crank 524 (FIG. 1) may be connected to section 522 for rotating shaft 491.

Through corresponding level ascent and descent of table sections 480, 484, the pushers and prestrippers may be adjusted for book thickness and may elevate and descend without tilting with respect to infeed table surface 22.

Idler sprocket 530 (FIGS. 16, 19) rotating about rotation support shaft 532 is adjustable along slot 534 to press against and tighten chain 520.

Protective cover 536 (FIGS. 5, 10) is a plate disposed above table surface 22 and blocks access to the pushers and prestrippers. It is hingedly connected at 537 to hopper wall 28 and rests on cross panel 538.

Stripper Gate

Now, the description turns to the movement of the books to the first cutting station. Returning to FIGS. 9-11, hopper rear wall panel 124 carries in bearings, like 126, 128, pivotable support shaft 130. Along the length of shaft 130 are secured a plurality of book hold down guides 546, which squeeze the pages of the book together as the book moves past guides 546 toward the first cutting station.

Also rigidly secured to shaft 130 are stripper gates 548, which normally extend down. In the event of a choke up or jam up of books, or more than the required thickness of books being stripped from the hopper, the lower edges 550 of gates 548 will be tipped up by the passing book. When gates 548 are tipped up too far, they activate, by means to be described, choke up detector or microswitch 552, which halts the entire trimmer.

For operating switch 552, crank link 554 is affixed to shaft 130. Pivotally connected at 556 to link 554 is crank link 558. Compression spring 560 at one end presses against abutment 562 on link 558 and at the other end presses against abutment 564, which is fixedly connected with hopper rear wall support panel 122. Spring 560 biases hold down guides 546 and stripper gates 548 into their normal positions illustrated in FIG. 9. A conventional stop (not shown) prevents override of guides 546 and gates 548 past their normal positions. Crank link 558 also passes through a positioning bushing 566, which holds the upper end of link 558 at the desired location. Pivotally secured at and freely suspended from pivot 568 at the upper end of link 558 is operating panel 570. Its curved left hand edge 573 in FIG. 9 is pressed by shelf 574 secured at the top of hopper rear wall 122, which causes that panel to be pivoted counterclockwise in FIG. 9 from its freely suspended equilibrium position.

Rounded corner 575 of panel 570 normally contacts smooth, rounded abutment shaft 576, which is rigid with respect to and extends beneath arm 578 for switch 552. Switch 552, shaft 576 and arm 578 are carried by housing 765 for the front knife, which housing is described further below. Shaft 576 must be of sufficient length so that switch operating panel 570 will remain in continuous engagement with vertically stationary shaft 576 through all height adjustments of panel 570 on hopper rear wall panel 122.

Arm 578 is rigid with cooperating switch arm 580 (FIG. 10). Combined arm unit 578, 580 is mounted to pivot about pivot hinge post 582. Post 582 is held by support panel 583, which is carried by housing 765. Switch arm 580 is also connected with operating plunger 584 for switch 552. Compression spring 585 is normally biases plunger 584 out of the housing of switch 552, which normally biases arm unit 580, 578 clockwise in the direction of arrow 586 in FIG. 10. However, panel 570 pressing against hopper wall panel 122 blocks the pivoting of arm unit 578, 580.

When gates 548 tip up from their normal vertical orientation sufficiently to raise panel 570 with respect to shelf 574, curved edge 573 moves up and slides over shelf 574 and panel 570 pivots clockwise in FIG. 9. Arm unit 578, 580 pivots clockwise in FIG. 10, and plunger 584 moves out of the switch housing. Such movement of plunger 584 causes choke up detector or switch 552 to shut down the trimmer.

When the choke up is eventually removed, spring 560 returns gates 548 to the position illustrated. Panel 570 descends, its curved surface 573 slides over the edge of hopper rear wall panel 122 and panel 570 pivots counterclockwise in FIG. 9, thereby pivoting arm unit 578, 580 counterclockwise in FIG. 10 and shifting plunger 584 back into the housing of switch 552, which permits the trimmer to be started again and continue to operate.

FIRST CUTTING STATION

Backstops

As the book passes beneath hold down guides 546, it is also guided (FIG. 10) by surfaces 84, 86 of side guides 80, 82 respectively. As shown in sequential FIGS. 5-8, pushers 198 then push the book over waste gate 986, beneath front knife bar 952 and the upper transport belts and over the lower transport belts, all to be described below, until the leading edge of the book is pushed into engagement with the abutment surfaces 602 of backstop elements 604 (FIGS. 8, 20). The book is now at the first cutting station. The pushers then release the book and return to their start position.

Turning to FIGS. 1-4, 20-22, there are a plurality of identical backstop elements 604. Each backstop element 604 (FIGS. 20 21) is secured in a T-shaped receiving slot 606 of a backstop support carriage 608. Slot 606 is elongated to permit repositioning of backstop 604 for various width books so that each book will stop with its trailing edge in the correct position to be trimmed by front knife 974.

The vertical leg of T-shaped slot 606 (FIG. 21) receives projection 610 extending from the base of element 604. The crossed leg of slot 606 receives locking plate 612. Screw tightening means 614 passes through opening 616 in backstop element 604 and is tightened into cooperatingly threaded opening 618 in locking member 612, which locks element 604 in position.

Four backstop elements 604 are shown in FIG. 3. Through all of carriages 608 pass support crossbars 622, 624 (FIGS. 3, 20). The central carriages 608 are affixed to the crossbars. The outer carriages are sufficiently loosely mounted on crossbars 622, 624 as to be able to be slid along these crossbars to whatever initial positions a particular height book requires, but also engage crossbar 622, 624 securely enough to hold carriages 608 in the positions to which they have been moved. For moving outer carriages 608 in accordance with varying book heights, these carriages may be joined, by means not shown, to below described side knife housings 1211, 1212, which housings are adjusted toward and away from each other in accordance with book height.

Crossbars 622, 624 are affixed in side support frames 626, 628. As shown in FIG. 20, frames 626, 628 are well below slots 606 of carriages 608, whereby they are also below the upper surfaces of the lower transport belts, to be described. Thus, crossbars 622, 624 do not interfere with the feeding of books to the first cutting station.

Backstops 604 should remain in their elevated condition while being contacted by the book and while joggers 664, 666, described below, are aligning the book. The backstops, however, must be removed from the pathway of the book before it is carried downstream by the transport mechanism, described below, to the second cutting station, described below. Backstop support frame 628 is rigidly connected with inclined support posts 630, 632, which pass through respective support bushings 634, 636. The bushings are supported on bushing support plate 638, which is affixed to the trimmer frame. Posts 630, 632 are rigidly secured to cam follower support 642, to which is also fixedly connected the backstop guide posts 644, 646. These posts pass through and slide with respect to respective support bushings 648, 650, 654. Compression spring 656 normally biases cam follower support 642 and backstop 604 to the up, book blocking position.

Rotatably attached to support 642 is cam follower roller 660 (FIGS. 20, 22) which projects out to the sides of support 642 and engages profiled cam surface 662 of backstop control cam. Surface 662 alternately moves support 642 down, which pulls backstop elements 604 beneath the book to be transported, and permits support 642 and backstop element 604 to ascend under the influence of biasing means 656. Thus, the backstops are spring biased to the book.

Because backstop support posts 630, 632 are oblique to the horizontal surface along which the book is being moved and tilt downward to the left in FIG. 20, as posts 630, 632 descend, backstop elements 604 shift both downward and horizontally downstream in the trimmer, thereby moving away from the book they have stopped and not rubbing or shifting the book as they descend.

Joggers

Referring to FIGS. 1, 3, and 22-24, while moving toward backstops 604, the book also passes between joggers 664, 666, one of which taps the top and the other the bottom of the book before the book is clamped at the first station. The joggers ensure that the book is in proper position and orientation for transport to and trimming by the side knives. Jogger 664 is described, it being understood that the other jogger is substantially identical.

Jogger 664 (FIGS. 22-24) includes an exterior housing 668 (FIG. 23), which is immovably secured by means 670 to side knife housing 1212. Movement of this housing for varying book height, as described below, also adjusts the initial position of jogger 664. Fine adjustment for the jogger is through the means described below. Upper wall 672 of housing 668 includes guide slot 674 (FIG. 24) for the moving elements of the jogger. Within housing 668 is positioned jogger drive element 676 (FIGS. 22-24), which is biased by compression spring 678 to move inward toward the other jogger and toward the edge of the book to be trimmed. Spring 678 at one end presses against drive element 676 and at the other end against fixed abutment 680, which is secured in housing 668. The position of abutment 680 is adjustable by means 682 (FIG. 22) to vary the tension on spring 678, thereby varying the force exerted by the jogger against the book. The tension on spring 678 provides the only difference between the two joggers. One of the joggers provides the surface to which the book is jogged by the other jogger. Its respective spring 678 will be tightened under greater tension than the spring of the other jogger.

Jogger drive element 676 includes upraised connecting block 684 (FIG. 24), which has openings 686 for receiving cooperating connecting means. Connecting block 684 passes through elongated slot 674.

Jogger drive plate 688 includes connecting means 690, e.g. studs, which seat in openings 686. Lateral movement of drive element 676 through slot 674 will, by means of cooperating connecting means 690, cause corresponding movement of plate 688.

Connecting plate 692 has opening 694 (FIGS. 22, 24) therethrough, which aligns with elongated slot 696 through jogger drive plate 688 and with elongated slot 674 (FIG. 24). Jogger drive plate 688 is secured to connecting plate 692 by manually tightened securing device 700, which passes through opening 694 and slot 696. Cooperating with securing device 700 is the Teenut 702, which includes upraised portion 704 having threaded openings 706 therethrough for receiving the cooperatingly threaded shaft of securing device 700. Upraised portion 704 passes through elongated slot 674, but contacts the undersurface of jogger drive plate 688 and presses same against connecting plate 692, thereby causing these two plates to move as a single unit. Slot 696 in jogger drive plate 688 is elongated so that the initial position of connecting plate 692 with respect to drive plate 688 may be readjusted for a particular book, thereby readjusting the initial position of jogger plate 714, described below.

Jogger connecting plate 692 (FIGS. 22, 24) includes upstanding portion 710 having openings 712 for receiving securing means. Jogger plate 714 includes connecting portion 716 with threaded openings 718 for receiving cooperatingly threaded connectors 720, which are passed through openings 712 and are tightened in openings 718. By this means, plate 714 is secured to connecting plate 692 and is secured to drive element 676. Plate 714 is rigid and includes an inner contact surface 721 for contacting the edge of the book.

The jogger plates move toward the top and bottom of the book to aid in forming the pocket through which the book passes as it travels to the backstop. When the book is almost at the backstops, the jogger plates move in, between the solid line and phantom line positions in FIG. 22, and press the sides of the book to position it. Once the book is clamped, the jogger plates shift off the book so as not to interfere with its later transport.

Jogger plate 714 is spring biased onto the book through spring 678, drive element 676, drive plate 688 and connecting plate 692.

Drive element 676 includes cam follower roller 722, which cooperates with inclined cam surface 724 of cam post 726. When post 726 ascends axially, surface 724 drives roller 722 to the right, as viewed in FIG. 22. This moves drive element 676 in the same direction, increases the compression of spring 678 and moves jogger plate 714 off the book. When post 726 descends, roller 722 and drive element 676 are permitted, due to the expansion of spring 678, to move jogger plate 714 against the book. Thus, the jogger plate is spring biased onto the book.

To hold plate 714 at the proper orientation during its shifting onto and off the book, guide element 727 (FIG. 24) cooperates with drive element 676. Guide element 727 includes upraised portion 728, which passes through elongated slot 674, and includes openings 729, which are engaged by appropriate cooperating securing means 730, thereby securing guide element 727 to drive plate 688. The direction of movement of drive plate 688 is thereby guided to upraised portions 684 and 728, which pass through and are guided by the side walls defining elongated slot 674.

Post 726 passes through clearance bushing 731 (FIGS. 22, 23) of its support housing 732. Within housing 732 (FIG. 22) is located compression spring 733, which, at lower end 734, is connected to shaft 726 and at upper end 736, presses against bushing 731, whereby post 726 is normally biased downward in FIG. 22.

At the base of post 726 is located roller 738 (FIGS. 22-24), which is pivotally connected to post 726 at 740 and extends beneath the post. Roller 738 is a cam follower and is biased by spring 732 into continuous engagement with the surface of elongated rod 742. Rod 742 is the cam for roller 738 and is rigidly secured in link 744, which link is rigidly connected with link 746 (FIGS. 22, 23). Links 744, 746 pivot about shaft 748, which rides in fixed bearings 750.

At the free end of link 746 is located cam follower roller 754 (FIGS. 22, 23), which rides over profiled cam surface 756. Surface 756 raises and lowers roller 754, thereby pivoting links 746, 744, raising and lowering rod 742 at post 726 and shifting jogger plate 714.

As books heights vary, the joggers must be moved so that they can contact each book. As described below, the side knife housing 1211, 1212 are adjustable toward and away from each other various height books. Jogger housing 668 is connected through aforementioned connecting means 670 (FIG. 23) with its neighboring side knife housing 1212 and is adjustable therewith. Rod 742 remains stationary as housing 668 is moved and roller 738 (FIG. 22) travels along rod 742 as housing 1212 moves. Thus, positive jogger drive continues, through adjustments for book height. Once the initial positions for the joggers are determined by adjustment of the side knife housings, a fine adjustment of jogger plate 714 (FIG. 24) with respect to its respective edge of the book is accomplished through loosening securing means 700, readjusting connecting plate 692 with respect to drive plate 688, and subsequently retightening securing means 700.

FRONT KNIFE ASSEMBLY

Front Clamp

The book is now in a pocket defined by backstop abutment surfaces 602 at the spine of the book, jogger plates 714, 716 at the top and bottom of the book, pushers 198 at the trailing edge of the book and the lower transport belts and table fillers, described below, underneath the book. Only the top surface of the book remains exposed. It is contacted and squeezed by the auxiliary front clamps 816, 818, the main front knife clamp bar clamping surface 706 and the upstream portions of the upper transport belts, all described below.

Although the auxiliary clamps are the first of the just mentioned elements to contact the upper surface of the book, auxiliary clamp operation is controlled by operation of the main front clamp and the latter will be first described.

Figure 4:
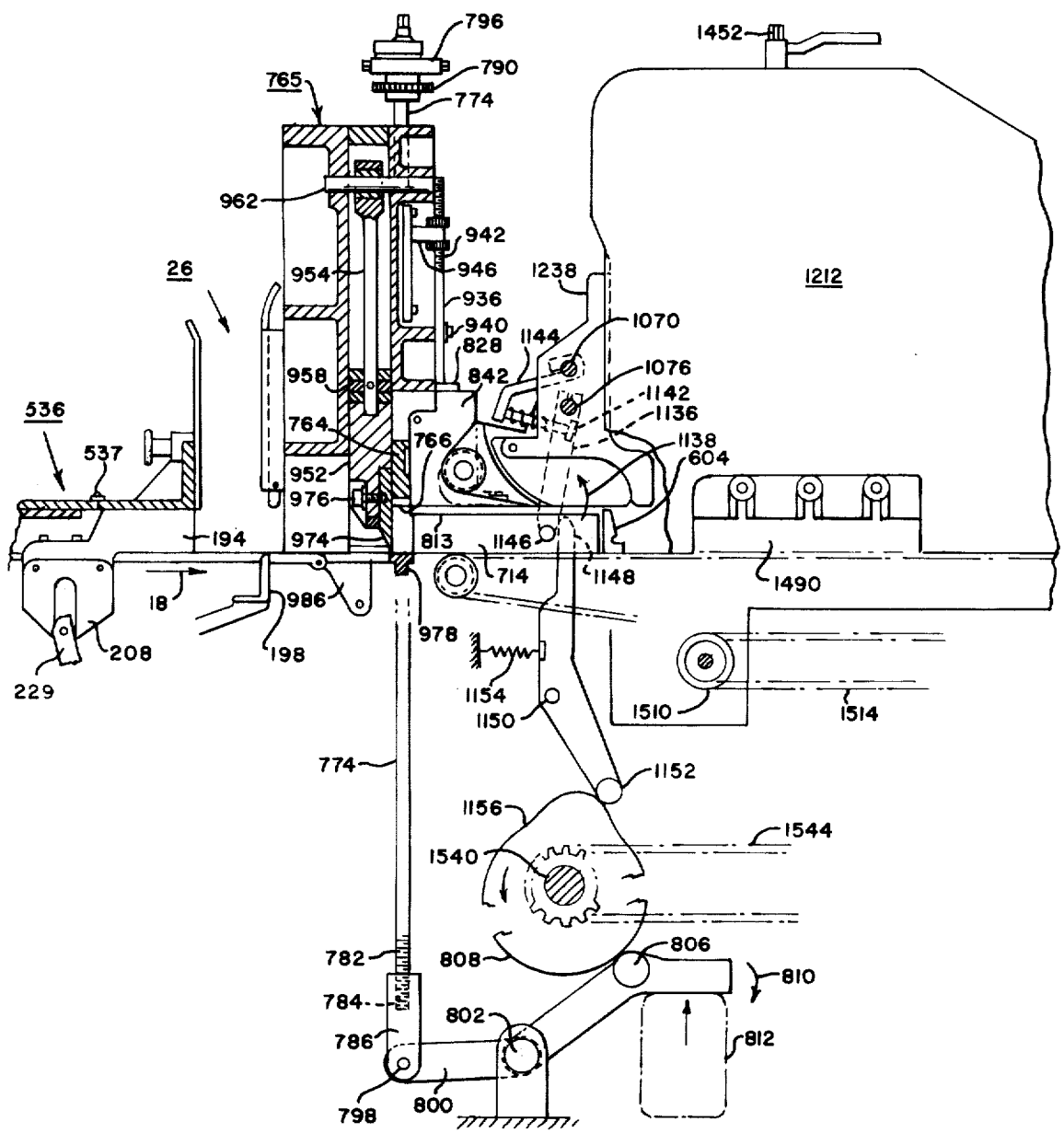
FIG. 4 is a side elevational view of a portion of the trimmer of the invention, partially in cross-section, and showing the features of the first station of the transport mechanism, to which the feed mechanism delivers the object to be transported.

Turning to FIGS. 4, 14 and 25, the main front clamp, the auxiliary front clamps and the front knife are all in front knife assembly housing 765. The main front clamp includes rigid clamp bar 764 having a width sufficient to extend across the tallest book, head to foot, that would be trimmed. Clamp bar 764 also has a thickness, upstream to downstream (FIGS. 4, 14) sufficient to clamp the book over a portion of its surface.

The height of clamp bar 764 above the book should be initially set so that lower clamping surface 766 of the clamp bar is a short distance above the top surface of the book being clamped and so that auxiliary clamps 816, 818, the clamping surfaces of which are beneath main clamping surfaces 766, will be immediately above the book. This minimizes the distance that clamp bar 764 must travel before operatively clamping the book and thereby minimizes the time for a trimming cycle.

Clamp bar 764 has two equal pitch, internally threaded openings 768, 770 (FIG. 25) extending completely therethrough. Through openings 768, 770 pass respective clamp bar drive shafts 772, 774. Secured to the exteriors of shafts 772, 774 are respective sleeves 776, 778, which are cooperatively threaded to and positioned within openings 768, 770. Since the pitch of the threads in openings 768, 770 is identical, rotation of shafts 772, 774 to the same extent will move the shafts with respect to the clamp bar to the same extent.

In FIG. 4, only drive shaft 774 is illustrated, it being understood that the other operates in the same manner. Shaft 774 extends below clamp bar 764 to threaded end 782, which is inserted in correspondingly threaded opening 784 in link 786. Until the trimmer operates and clamp bar 764 moves, link 786 remains stationary. The thread on sleeve 778 (FIG. 25) is pitched oppositely to the thread on shaft end 782 (FIG. 4). Upon rotation of shaft 774 in a first direction, the threads on shaft lower end 782 and on sleeve 778 cause clamp bar 764 to be adjusted upward. Rotation of shaft 774 in the opposite direction causes clamp bar 764 to be adjusted downward. In this manner, adjustments for the starting height of clamp 764 are obtained.

Drive shafts 772, 774 extend out of the top of housing 765. Secured to the shafts re respective, equal sized, toothed sprockets 788, 790 (FIG. 25), which are joined by chain 792. Rotation of one of the shafts, e.g. 772, by its upper end 794 is transmitted to the other shaft. Shafts 772, 774 also pass through rigid bridge 796, which maintains their spacing.

When the initial position of clamp bar 764 is determined, it is ready for operation. Link 786 (FIGS. 4, 14) is pivotally connected at 798 to one side of pivotable drive link 800. Link 800 is pivotally supported on fixed pivot 802. Cam follower 806 is secured to the other side of link 800. Movement of clamp bar 764 upward off the book is caused by the profile of cam surface 808, as cam follower 806 rides over it, pivoting link 800 clockwise in the direction of arrow 810 in FIG. 4.

To cause clamp bar 764 to clamp the book, biasing means 812, comprsing an air bag in to which air is pumped, drives link 800 to pivot counterclockwise in FIG. 4 and draws surface 766 of clamp bar 764 down into secure engagement with the book. Hence, clamp bar 764 is effectively spring biased against the one. Cam surface 808 is so profiled that while air bag spring 812 is causing clamp bar 764 to press against the book, cam follower roller 806 is off cam surface 808 because the book is preventing link 800 from pivoting into contact with surface 808, under the influence of air bag spring 812. The amount of lift off of cam follower roller 806 and the points at which lift off commences and terminates are predetermined so that clamp bar 764 is holding the book immediately prior to commencement of trimming by front knife 974 and until immediately after trimming is completed.

Auxiliary Clamps

Turning to FIGS. 25 and 26, main clamp bar 764 cooperates to move pads 813, 814 of auxiliary clamps 816, 818 into initial engagement with the upper surface of the book to be trimmed. When auxiliary pads 813, 814 contact and clamp the book, the pocket for holding the book is completed. The auxiliary clamp pads initially squeeze the air from between the pages of the book and hold the book still for later engagement by main clamp 764.

Auxiliary clamp 816 will be considered in detail (FIG. 26), it being understood that the other clamp is substantially identical. Pad 813 has opening 822 and threaded opening 824. Friction fixture 826 has stud 828 extending out of its base for insertion into opening 822 and also includes opening 830 for receiving threaded securing means 832, which is received in threaded opening 824. Tightening of securing means 832 secures auxiliary clamp pad 813 to fixture 826. Fixture 826 also includes upstanding arm 834, which has two elongated slot openings 836, 838 for receiving guide rollers 876, 878, to be described.

Fixture 826 is located between identical side plates, one of which, 842, is shown in FIG. 26. These plates are held apart by rear spacer bar 844 and equal with front spacer bar 846. Securing means 848 for rear spacer bar 844 and 850 for front spacer bar 846 secure the plates together and against the spacer bars.

The width of friction fixture arm 834 is less than that of spacer bars 844, 846 so that friction fixture 826 can freely shift with respect to plate 842 and the cooperating other plate. Disposed between and supported in fixed locations by the plates and passing with clearance through elongated slots 836, 838 of fixture 826, are respective, freely rotatable rollers 876, 878. These rollers can rotate in their slots 836, 838 when rubbed by the walls thereof.

Friction fixture 826 and auxiliary clamp pad 813 can freely shift vertically with respect to the plates within the limits defined by rollers 876, 878 and the ends of slots 836, 838. A friction connection between front spacer bar 846 and fixture 826 prohibits free shifting, although shifting under prescribed conditions is permitted. Interposed between surface 888 of spacer bar 846 and friction surface 890 of friction plate 826 are a number of elements, which together provide a friction connection. Adjacent to surface 888 is metal plate 892. This plate receives guide support 896 of first Belleville washer 898 which, as is well known, is domeshaped and flexes under pressure applied to its periphery or dome. Cooperating metal plate 900 receives guide 904, which supports its cooperatingly abutting Belleville washer 906. For proper spacing, there are a number of identical Belleville washer connections. Interposed between plate 900 and friction plate 826 is leather strap layer 908.

Spacer bar 846 includes threaded opening 910 therethrough. Into threaded opening 910 is tightened cooperatively threaded screw 912 until screw surface 914 abuts and then presses on plate 892. This pressure causes frictional engagement between strap 908 and friction surface 890 of plate 826, thereby inhibiting vertical shifting of plate 826. The extent to which securing means 912 is tightened will adjust the level of inhibition of movement of plate 826.

Also attached to rear spacer bar 844 is auxiliary clamp mounting panel 918, which is received in slot 920 in main clamp bar 764. Threaded opening 922 in clamp bar 764 receives the cooperatingly threaded shaft of securing means 924. Means 924 passes through elongated slot 926 (FIG. 25) in mounting panel 918 and secures the auxiliary clamp to clamp bar 764.

Slot 926 is elongated so as to permit the positions of the auxiliary clamps to be adjusted for books having different head to foot heights. In addition, clamp pads 813, 814 are interchangeable, and narrow width pads, shown in solid line in FIG. 25, or wider pads, shown in phantom line, may be used. Similarly, the distance the pad extends away from clamp bar 764 toward the downstream edge or spine of the book is variable. All of these variations are made in accordance with the height and width of the book being trimmed to ensure adequate clamping.

As was noted above, auxiliary clamp pads 813, 814 should contact the upper surface of the book before clamping surface 766 of main clamp bar 764 contacts it. As illustrated in FIG. 25, the lower surfaces of pads 813, 814 are at the same level as the clamping surface 766. Pads 813, 814 are caused to descend below surface 766 when clamp bar 764 is ascending and upper surface 932 of friction plate 826 contacts lower surface 934 of auxiliary clamp indexing plate 936. Although main clamp bar 764 continues to ascend, friction plate 826 of clamp 816 and its corresponding number in clamp 818 are prohibited from further ascent by its abutting engagement with plates 936, 937 (FIGS. 25, 26). Therefore, with respect to clamp bar 764, auxiliary clamp pads 813, 814 descend below the still ascending clamping surface 766, to facilitate the foregoing, clamping fixture 826 (FIG. 26) and its corresponding number of clamp 818 project above their clamp side plates, e.g. 842, so these plates do not interfere with the movement of the friction fixtures.

The heights of indexing plates 936, 937 are adjustable for adjusting the maximum distance between main clamping surface 766 and the clamping surfaces of pads 813, 814 to account for variations in the sponge or thickness or bulk of the book to be clamped, and to adjust the height of indexing surface 934 when the height of main clamp bar 764 is adjusted by shafts 772, 774. Considering plate 936, for example, it includes elongated slot 938 through which guiding stud 940 passes. Stud 940 is secured to housing 765. Stud 940 orients and guides the movement of plate 936. Slot 938 is elongated so that plate 936 may be vertically adjusted with respect to stud 940.

Plate 936 is secured to threaded adjustment shaft 942, which passes through clearance opening 944 in fixed support element 946. By appropriate rotation of cooperatively threaded nuts 948, 950, shaft 942 is adjusted, thereby adjusting the height of indexing surface 934.

The width of indexing surface 934 is greatly in excess of the width of upper surface 932 of friction fixture 826. This permits repositioning of auxiliary pads 813 for height variations in the book to be trimmed, as described above, which adjustments could reposition surface 932 anywhere along cooperating surface 934. The indexing of clamp 818 is accomplished in a similar manner.

When main clamp bar 764 now descends, auxiliary clamp pads 813, 814 extend beneath clamping surface 766 and contact the book before clamping surface 766 reaches it. While clamp bar 764 continues to descend, auxiliary clamp pads 813, 814 halt and the friction mount causes pads 813, 814 to exert pressure. Finally, main clamp bar surface 766 contacts the book and is again at the level of the clamping surfaces of the auxiliary clamp pads. After front knife trimming is completed, clamp bar 764 ascends and the friction connection assures that auxiliary clamps 816, 818 ascend together with clamp bar 764.

Front Knife

Once the book has been clamped by clamp bar 764, its trailing edge can be trimmed by front knife 974. Referring to FIGS. 2, 4, 14, 25 and 26, knife bar 952 is supported by pivoting parallel links 954, 956 (FIG. 25), which are pivotally connected at 958, 960, respectively, to knife bar 952 and by respective pivot connections 962, 964 to housing 765. Because knife bar 952 is supported by a parallel linkage, its descent has a sideways motion, which aids in shearing through the book.

Knife bar 952 is pivotally connected at 966 to drive link 968, which link is pivotally connected at 970, which is eccentric to rotating drive wheel 972. Upon rotation of wheel 972, knife bar 952 ascends and descends. Rotation of wheel 972 and movement of knife bar 952 are coordinated with operation of the remainder of the apparatus, as described below.

Front knife bar 952 supports trimming knife 974 (FIG. 25), which is secured to bar 952 by securing means 976 (FIG. 4). As knife 974 descends, it shears through most of the book, meets bottom knife 978 (FIGS. 4, 14) and then completes its shearing through the book. Bottom knife 978 is securely held on the frame of the trimmer.

Upper surface 979 of the element which includes bottom knife 978 is aligned with the surface of infeed table 20 so as to provide a smooth unbroken pathway for books being passed to the first cutting station.

Waste Gate

After front knife 974 has descended, the trimmings remain and would block the advance of subsequent books to the first cutting station unless disposed of. Turning to FIGS. 3–8, 14, immediately upstream or forward of bottom knife 978 is waste 986, the upper surface 988 (FIGS. 3, 14) of which is aligned with surface 22 of infeed table 20, whereby an unbroken travel surface for books is provided. The gate includes continuations of pusher slots 468 (FIG. 3), because the pushers must push the trailing edge of the book almost to the front knife.

Gate 986 is pivotally connected at 990 (FIG. 14) to fixed trimmer frame element 992. Gate 986 is pivotally connected at 994 to drive link 996 and that link is pivotally connected at 998 to drive arm 1000. Arm 1000 is mounted on fixed pivot 242 and the arm extends to cam follower roller 1002, which rolls over profiled cam follower surface 1004. Surface 1004 pivots arm 1000 clockwise in the direction of arrow 1005 in FIG. 14, thereby drawing gate 986 from its solid line to its phantom line positions. Compression spring 1006 normally biases arm 1000 counterclockwise, which holds roller 1002 in engagement with surface 1004 and returns gate 986 to its solid line position. The waste gate is, therefore, also spring biased toward where it supports the book and cam operated away from it.

To speed the disposal of front knife trimmings, conventional air pressure source 1007 is directed toward upper surface 988 of waste gate 986. When gate 986 pivots open, a blast of air forces the trimmings away from the path of subsequent books.

TRANSPORT MECHANISM

After completion of trimming at the first cutting station, the book is transported to the second cutting station, at which the side knives operate. The transport mechanism includes a first plurality of belts for engaging one side of a book and a second plurality of belts disposed to face toward the first plurality for engaging the opposite side of the book. In the preferred embodiment of the invention illustrated herein, there are a plurality of upper transport belts and a cooperating plurality of lower transport belts. The belts transport books to the second cutting station and, after side knife trimming, beyond the second station to a delivery mechanism.

Upper Transport Belts

The upper transport belt assembly is shown in FIGS. 1, 2, 5–8, and 27–33. While there may be any number of upper belts, three is adequate, viz, belts 1008, 1009, 1010 (FIGS. 1, 28, 33). Each upper transport belt is endless and is formed of flexible, non-stretchable material having a surface with a high coefficient of friction facing toward the book. Each transport belt is a timing, e.g. Gilmer, belt to permit positive and accurately controlled starting and stopping, as described below.

The upper belts are supported by a common support means, which causes the belts to squeeze down against the book. The support means comprises four towers (FIG. 3), viz, 1012 upstream and 1014 downstream along one side of the trimmer and 1016 upstream and 1018 downstream along the other side of the trimmer.

Tower 1012 (FIG. 29), is now described, it being understood that all of the others are substantially identical. Tower 1012 includes threaded shaft 1020, which at one end is fixedly secured in spring housing 1022 and at the other end is threadedly received in cooperatively threaded opening 1024 in interior sleeve 1026. Sleeve 1026 is held freely rotatably in bearings within exterior housing 1027. Atop housing 1027 is collar 1029, which is secured to the frame of the trimmer and thereby positions tower 1012.

At the lower end of sleeve 1026 is bevel gear 1028, which meshes with cooperating bevel gear 1030 secured on drive shaft 1032. Shaft 1032 is perpendicular to sleeve 1026 (FIGS. 28, 29, 33). Rotation, by means to be described, of drive shaft 1032 in a first direction rotates sleeve 1026 and causes the ascent of threaded shaft 1020 and of housing 1022. Rotation of shaft 1032 in the opposite direction causes the descent of housing 1022. In this manner, the height of tower 1012 and housing 1022 is adjusted.

Main tower height adjustment drive shaft 1034 (FIG. 28) enters from the exterior of the trimmer. Its exterior portion 1036 is operated to rotate the shaft. Secured to drive shaft 1034 is bevel gear 1038 (FIG. 28), which meshes with cooperating bevel gear 1040. Gear 1040, in turn, meshes with gear 1033. Above described drive shaft 1032 for tower 1012 runs downstream (FIG. 33) from its tower to gear 1033, which is affixed to the shaft, whereby rotation of main drive shaft 1034 operates tower 1012.

Above mentioned gear 1040 is affixed to height adjustment shaft 1042 of tower 1014, whereby rotation of main drive shaft 1034 also raises and lowers tower 1014.

Main drive shaft 1034 extends across the trimmer to bevel gear 1046 (FIG. 27, 28), which is secured mounted on shaft 1034. Gear 1046 meshes with bevel gear 1048, which is attached to the height adjustment shaft of tower 1018. Therefore, rotation of drive shaft 1034 also raises and lowers tower 1018.

Gear 1048 meshes with bevel gear 1050, which is affixed to shaft 1052. Shaft 1052 (FIG. 27) extends upstream to bevel gear 1054, which is secured thereto. Gear 1054 meshes with bevel gear 1056, which is attached to the height adjustment shaft of tower 1016. Thus, rotation of drive shaft 1034 also raises and lowers tower 1016.

The direction and extent of the pitch on the threads of each of the tower support shafts, like 1020 (FIG. 29), for each of the spring housings, like 1022, and the sizes of the bevel gears are chosen so that all towers ascend and descend in the same direction and to the same extent for any rotation of main drive shaft 1034.

For holding the upstream ends of the upper transport belts, upstream stay support shaft 1070 (FIG. 29) and spline shaft 1076 are carried by respective block 1060 (FIG. 29), 1061 (FIG. 27) of towers 1012, 1016. Block 1060 is secured to shaft 1064. The equivalent shaft in tower 1061 supports block 1061. Rigidly secured to and passing between blocks 1060, 1061 is upper belt stay support shaft 1070 (FIGS. 27, 29). Blocks 1060, 1061 also include respective support bearings 1072, 1074, which receive and permit rotation of spline shaft 1076. This shaft causes displacement of the displaceable belts, i.e. elevation of the elevatable or upper belts at their upstream ends, as described below.

Turning to tower 1012 (FIG. 29) as exemplary, compression spring 1066 in housing 1022 normally biases shaft 1064 downward, because one end of spring 1066 presses against abutment 1068 on shaft 1064 and the other end of the spring presses against surface 1069 within housing 1022. Therefore, once the initial height setting is made for tower 1012, continuous pressure is applied to the surface of the book by all the upper transport belts through spring 1066 and the corresponding springs in the other towers.

At the downstream or outfeed end of the trimmer, towers 1014, 1018 (FIG. 28), which are otherwise the same as tower 1012, include respective upper support blocks 1080, 1082, which support only downstream stay support shaft 1084 (FIG. 27, 28, 30). Shaft 1084 carries the downstream ends of the upper transport belts and also carries part of the means which drives these belts, as described below.

Turning to FIG. 30, central upper belt 1009 is typical of all three upper belts. This belt is supported by and begins its movement from upstream guide element or roller 1086. From this roller, belt 1009 passes beneath movable guide shoe 1090 and stationary guide shoe 1092, both of which hold belt 1009 securely against the book and are described further below. The undersurfaces of shoes 1090, 1092 include a flat, slightly indented raceway, as shown at 1094, for receiving and guiding belt 1009 and out of which the lower surface of belt 1009 extends. The belt raceway is defined by side guides along the exterior sides of the shoes. Shoes 1090, 1092 are held in position by means to be described below.

At location 1096, which corresponds to the start of the operative course of the lower speeder belts, described below, shoe 1092 inclines upward causing belt 1009 to move away from the book. Belt 1009 will, therefore, not interfere with travel of the book under the influence of the continuously moving lower speeder belts.

When belt 1009 passes the downstream end 1098 of shoe 1092, it is free of the book, and the clamping force provided to belt 1009 by shoe 1092 need no longer be applied. Belt 1009 then passes over downstream drive roller 100; idler roller 1102, which shifts in position, as described below; and over upstream roller 1086 to complete its cycle. The two outer upper belts travel through the same cycle as the central belt pass corresponding elements.

In order to properly transport a book, the sets of oppositely disposed, i.e. upper belts 1008, 1009, 1010 and the below described lower belts, clamp the book between them. However, when the belts are in position to clamp, they block the movement of the book into the first cutting station, whereby book trimming would be precluded. To move a book into the first station, it is necessary to displace at least one of the sets of belts, here either of the upper or lower belts, and especially the portions thereof at the first station, away from the other belts. This provides an opening into which the book can be moved. The belts that are displaced or elevated, here the upper belts, are the displaceable, or more particularly, the elevatable belts. How they are elevated will now be described with reference to typical central belt 1009 (FIG. 30).

The upstream end of belt 1009 is raised by raising its upstream guide element, roller 1086 (FIG. 30, 32). This roller is held in and moved by nip 1088 (FIG. 32). The nip includes side plates 1104, 1106 having respective bolt receiving openings 1108, 1110. Disposed between plates 1104, 1106 is nip elevating link 1112, having bolt receiving openings 1114. Bolts 1116 pass through openings 1108, 1114, 1110 to bolt plate 1104, link 1112 and plate 1106 together to move as a unit.

Link 112 includes spline shaft receiving opening 1118, which is toothed to cooperate with spline shaft 1076. Nip 1088 of the central belt is affixed to spline shaft 1076. The nips of the outer belts differ in that they are slidable along spline shaft 1076, by means described below.

Roller 1086 is supported in nip 1088 by means (not shown) that pass through opening 1120 in plate 1104 and a correspondingly positioned opening (not shown) in plate 1106. The nip pivots about shaft 1076. Being away from that shaft, roller 1086 travels through an arc when shaft 1076 pivots. Since upper belt 1009 passes over roller 1086, the front end of that belt is elevated above and returned to the book when shaft 1076 pivots.

Above mentioned movable guide shoe 1090 is fastened at its upstream end by fastening means 1122, which passes through opening 1124 in plate 1104 and opening 1126 in plate 1106, thereby fastening the forward end of shoe 1090 to nip 1088. As nip 1088 pivots up or clockwise in FIG. 30 to the position of FIG. 31, the upstream end of shoe 1090 moves up. As nip 1088 pivots down, the upstream end of attached shoe 1090 clamps belt 1009 against the book at the first station.

The downstream end of shoe 1090 (FIG. 32) includes guide plate 1128, which rides in slot 1130 (FIGS. 30, 31) of fixed belt guide shoe 1092. Plate 1128 and slot 1130 hold down the downstream end of shoe 1090 against the book. Since shoe 1090 pivots up and down with nip 1088, plate 1128 slides through and pivots in slot 1130 as shoe 1090 shifts. (Compare FIGS. 30, 31).

Shoe 1092 is rigidly carried by side panels, one of which, 1132 is illustrated in FIG. 30. At the upstream end of the trimmer, panel 1132 is supported on stay shaft 1070 by support bracket 1134, which is rigidly connected to stay shaft 1070. At the downstream end, panel 1132 is supported by housing 1198 for idler roller 1102, which is described below, which housing is rigidly supported on downstram stay shaft 1084.

Roller 1086 and shoes 1090, 1092 press belt 1009 against the book at the first or front knife cutting station and continue to press the belt on the book as the book moves to the side knife cutting station.

Spline shaft 1076 (FIGS. 4, 30–33), pivots clockwise in FIGS. 30–32 to raise nip 1088, and the means that causes this is a displacement or an elevation means because it raises upper belt 1009. Shaft 1076 also pivots counterclockwise to return nip 1088 to the book, and the means that causes this is a return means because it returns belt 1009 to its book transporting position.

Rigidly secured to spline shaft 1076 is driving link 1136 (FIGS. 4, 30, 31, 33). Link 1136 is pivoted counterclockwise under the influence of compression spring 1140, which presses at one end against abutment 1142 secured to link 1136 and on the other end against stationary abutment 1144. Abutment 1144 is non-rotatably secured on immovable stay shaft 1070. Since counterclockwise pivoting of link 1136 and shaft 1076 forces upper belt 1009 agains the book, the belt is spring biased against the book.

For rotating shaft 1076 clockwise to raise upper belt 1009, also secured to drive link 1136 is cam follower roller 1146, which is engaged by camming link 1148 (FIGS. 4, 30, 31). Link 1148 is pivotable about fixed pivot 1150 (FIG. 4). Link 1148 supports cam follower roller 1152. Compression spring 1154 drives link 1148 clockwise in FIG. 4 and holds roller 1152 against profiled cam surface 1156. Springs 1154 (FIG. 4), 114o (FIG. 30) cooperate to drive both of links 1148, 1136 to return upper belt 1009 against the book. Profiled cam surface 1156 pivots link 1148 counterclokcwise in FIG. 4, which pivots link 1136 and spline shaft 1076 clockwise and raises the upper belts.

The distinctions between the upstream ends of central belt 1009 and of outer belts 1008, 1010 are minor and are considered below.

Turning to the downstream support for central transport belt 1009, the belt passes about drive roller 110 (FIG. 28, 30). This drive roller is also secured on a spline drive shaft, 1160, and for central belt 1009, roller 1100 is fixedly secured in position on spline shaft 1160. As with the upstream ends of the upper belts, the outer upper belt drive rollers, located downstream in the transport mechanism, can shift along spline shaft 1160.

Spline shaft 1160 (FIG. 28), at one end is carried in bearing 1172, which is secured in support panel 1174, and at its other end in bearing 1180 in support panel 1182. Panels 1174, 1182 are affixed on stay shaft 1084. Panel 1174 is on flat connecting panel 1176, which connects with support block 1080 of tower 1014. Panel 1182 is on flat connecting plate 1184, which connects with support block 1082 of tower 1018 and which supports below described gear 1384. On spline shaft 1160 is affixed spline shaft bevel drive gear 1186 (FIGS. 27, 28). The means for driving gear 1186 will be considered further below. Driving of gear 1186 rotates spline shaft 1160. This drives drive roller 1100 (FIGS. 28, 30) and thereby moves central upper transport belt 1009 over its course. The corresponding drive rollers for outer upper belts 1008, 1010 are also mounted on spline shaft 1160 (FIG. 28) and are rotated thereby to move their respective belts. The outer upper belts will be considered below.

When front nip 1088 elevates from its position in FIG. 30 to that in FIG. 31, front guide element roller 1086 pivots upward and outward, away from downstream guide element roller 1100. This increases the total length of the course traveled by belt 1009 and increases the distance traveled by belt 1009 from front roller 1086 to stationary shoe 1092. Idler roller 1102 keeps belt 1009 taut. It does so by creating a deep bend in the return non-operative course of belt 1009. Since belt 1009 does not stretch, when the path of belt 1009 lengthens, roller 1102 is shifted to reduce the extent of the bend that that roller creates in belt 1009.

Roller 1102 is carried on support shaft 1192 (FIG. 30), which passes through and is supported by two idler roller support panels, only one of which, 1194, can be seen. Panel 1194 includes bearing 1196, which receives and permits panel 1194 to freely pivot about stay shaft 1084. Spring housing 1198 is immovably secured to stay shaft 1084. Within a receiving slot in housing 1198 is compression spring 1200, which passes into slot 1202 of interior housing 1204. This housing is secured by means 1206 to panel 1194. Spring 1200 presses against wall 1208 in housing 1204. Spring 1200 continuously biases panel 1194 and idler roller 1102 to move in the counterclockwise direction of arrow 1210 in FIG. 30. When nip 1088 elevates, roller 1102 is drawn clockwise about shaft 1084 and spring 1200 is compressed.

The basic differences between central upper transport belt 1009 just described and outer upper transport belts 1008, 1010 (FIG. 28) arise because the outer belts are, respectively, connected with housings 1211, 1212 for the side trimming knives, which are described below. As housings 1211, 1212 are moved toward and away from each other to adjust for different height books, the outer upper transport belts are correspondingly adjusted, and thereby engage the book near its upper and lower edges.

Outer upper transport belt 1010 (FIG. 27) is exemplary. The upstream portion of the means supporting and operating that belt is identical to that means for central belt 1009, with the following exceptions. Instead of being supported by a bracket like bracket 1134, main housing 1224 for belt 1010 is rigidly secured by means 1226 to support panel 1230. Panel 1230 has clearance openings therethrough for stay shaft 1070 and spline shaft 1076. Nip link 1232 (, which is the equivalent of nip link 1112,) includes an opening through which spline shaft 1076 passes and which is splined to cooperate with and be pivoted by shaft 1076. However, this opening has sufficient clearance to permit nip link 1232 to be slid along shaft 1076 in a manner to be described.

Edges 1238 of panel 1230 faces downstream and rides in narrow width elongated slot 1240 in side knife housing 1212. Slot 1240 has substantially the width of panel 1230, whereby the movement of side knife housing 1212 with respect to housing 1211, by means to be described carries along panel 1230 and the upstream portion of housing 1124 and belt 1010, thereby shifting nip link 1232 along shaft 1076. Slot 1240 is vertically elongated to permit raising and lowering of panel 1230 by raising and lowering of shaft 1070, 1076 in the manner described above.

Similarly, the downstream portion of the means that supports and operates outer belt 1010 is the same as for central belt 1009, with the following exceptions. Belt 1010 passes around downstream drive roller 1246 (FIGS. 27, 30), which is mounted on downstream spline shaft 1160 by means of a cooperatingly splined opening through the roller. Like upstream nip lifting link 1232, downstream drive roller 1246 is so mounted on its spline shaft 1160 as to be able to be slid therealong upon shifting of side knife housing 1212. In place of pivoting side panels, like 1194, there are pivoting panels, like 1248, which are mounted to be both pivotable about and slidable along stay shaft 1084 as side knife housing 1212 shifts with respect to housing 1211. Idler roller 1252 freely rotates about support 1254, which is secured to panel 1248, and functions the same as idler roller 1102. For biasing idler roller 1252 to move counterclockwise in the direction of arrow 1210 in FIG. 27, compression spring 1258 presses on shelf 1260, which is secured to panel 1248, and on abutment collar 1262. Collar 1262 is carried on shaft 1264, which is supported by tower 1266. Upon lifting of nip link 1232, idler roller 1252 and panel 1248 pivot clockwise in FIG. 27, compressing spring 1258. When nip lever 1232 descends, spring 1258 forces roller 1252 to return to its illustrated position.

To tower 1266 and housing 1224 is attached support panel 1270, through which stay shaft 1084 passes with clearance. Panel 1270 is connected with panel 1248 so as to cause that panel and its opposite number (not shown) to move sideways with panel 1270. Panel 1270 includes a downstream extension portion 1274 (FIGS. 27, 28), with an opening therethrough for spline shaft 1160, for acting upon drive roller 1246 to move it sideways.

As with upstream panel 1230, downstream panel 1270 (FIG. 27) has an upstream facing interior edge 1284, which extends into cooperating slot 1286 in side knife housing 1212. Slot 1286 is of substantially the same width as panel 1270 and is vertically elongated so as to permit raising and lowering of drive roller 1246 and belt 1010 in the manner described above.

As panel 1270 is moved sideways by housing 1212, extension 1274, roller 1246, panels 1248, idler roller 1252 and the downstream portions of housing 1224 and belt 1010 are all correspondingly shifted.

Upper belt 1008 (FIGS. 28, 33) and the apparatus which supports and operates both its upstream and downstream ends are identical to those for belt 1010, except that support panels 1030, 1070 are in each case located to the outside of the belts, rather than between neighboring belts.

LOWER TRANSPORT BELTS

Referring to FIGS. 1–3, 4, 27, 28 and 33, for each one of the first set of belts in opposing relation, i.e. the displaceable or elevatable or upper transport belts 1008, 1009, 1010, there is a cooperating one of a second set of belts in opposing relation to the first set, i.e. the nondisplaceable or lower transport belts 1290, 1292, 1294, which engage the bottom surface of the book. Each lower belt is aligned with its respective upper belt so as to effectively clamp the book between them. The lower belts are comprised of the same materials as the upper belts. While the upper belts may be raised and lowered for differing book thicknesses, the lower belts are not so movable, and their operative, upper, book engaging courses remain at a constant height.

Central belt 1292 (FIGS. 3, 33) will be described. Belts 1290, 1294 are designed and function in substantially the same way. The differences will be noted later. Central belt 1292 travels from guide roller 1302 along its upper operative course in the direction of arrow 1304 in FIG. 33 through the grooved raceway in fixed rigid support and guide shoe 1306. Shoe 1306 begins near roller 1302 and ends near redirecting roller 1308. The shoe presses the operative course of belt 1292 against the underside of the book, which is being pressed thereagainst by upper belt 1010. Belt 1292 passes around redirecting roller 1308; idler roller 1310; drive roller 1312; and returns to upstream guide roller 1302. Upstream guide roller 1302, shoe 1306, redirecting roller 1308 and guide roller 1310 are all carried by rigid lower belt housing panels 1314, which are positioned on both sides of the lower central transport belt. Appropriate support bearings permit rotation of the rollers in place. Panels 1314 are supported in place by means (not shown) to the trimmer frame.

Redirecting roller 1308 is located approximately beneath upturn 1096 (FIG. 30) in upper central belt shoe 1092, whereby the positive grip on the book, which is provided by lower belt 1292, ceases at about the same location as upper belt 1009 begins to release the book.

For operating belt 1292, its drive roller 1312 (FIGS. 3, 33) must be rotated. That roller is affixed on spline shaft 1332 and rotates therewith. Roller 1312 does not shift along shaft 1332 as do the drive rollers of outer lower belts 1290, 1294, as described below. The means for rotating spline shaft 1332 is also considered below.

Outer transport belts 1290, 1294 are identical to each other. The ways in which belt 1294 differs from central belt 1292 are now described. Belt 1294 passes over guide support shoe 1320. Shoe 1320 extends downstream slightly past the downstream end of central belt shoe 1306. Past the downstream end of shoe 1320, belt 1294, at 1322, inclines downward away from the lower surface of the book, passes around adjustable idler roller 1326 and toward its drive roller 1324, which is mounted on spline shaft 1332. The belt then returns to guide roller 1328. As with central belt 1292, belt 1294, guide roller 1328, shoe 1320 drive roller 1324 and idler roller 1326 are all enclosed between housing panels 1330, which are connected by means 1331 to neighboring side knife housing 1212 so as to move therewith. Belt 1294 is spaced away from housing 1212 a distance such that it is arranged to cooperate with and be substantially aligned beneath its upper transport belt, which is also secured to housing 1212. Both the upper and lower belts thereby remain aligned. Drive roller 1324 is mounted on spline shaft 1332 so as to be rotated by that shaft and yet be shiftable therealong as housing 1212 moves.

The other outer lower belt 1290 is connected to move with side knife housing 1211.

DELIVERY MECHANISM

Speeder Belts

Referring to FIGS. 1-3, 27, 28 and 33, downstream of lower belts 1290, 1292, 1294 are speeder belts 1361, 1334, 1360 which take the book away from the transport belts. Since the speeder belts carry books away from the transport belts, they are carrying means. All speeder belts have book contacting surfaces, which are comprised of the same materials as the contacting surfaces of the transport belts. The speeder belts need not be timing belts because they only impart velocity to the book and are not subjected to start and stop indexing. By means described further below, the speeder belts all travel at a rate substantially equal to the rate of the transport belts at the time they release a book to the speeder belts, so that there is a smooth transition between the transport and speeder belts. The transport belts move intermittently while the speeder belts move continuously.

Aligned with lower belt 1292 is central speeder belt 1334 (FIGS. 3, 33). Speeder belt 1334 starts from guide roller 1336 (FIG. 33), also moves on its upper course in the direction of arrow 1304, passes about its drive roller 1338; idler roller 1340; anchored guide roller 1342; and returns to guide roller 1336. Central transport belt 1292 drops very sharply around its redirecting roller 1308 to avoid speeder belt 1334, which begins immediately after the transport belt. Drive roller 1338 is secured immovably on speeder belt drive spline shaft 1364 (FIGS. 3, 33), which is rotated by drive means to be described. Roller 1342 holds the speeder belt above and away from the transport belt. Guide roller 1342 is carried on stay shaft 1366, which shaft is secured to the frame of the trimmer.

Aforementioned support housing panels 1314 also support the guide and drive rollers of the central speeder belt.

Side speeder belts 1360, 1361 are identical to each other and to central belt 1334 and operate in the same way as central belt 1334. Speeder belt 1360 (FIGS. 3, 33) will be considered. It receives the book from transport belt 1294. It is positioned next to and outside its corresponding transport belt 1294, instead of being above it. Thus, the beginning, at 1322, of the downward incline of transport belt 1294 can be matched with the beginning of the operative upper course of speeder belt 1360, thereby preventing even a momentary lapse of positive drive for the book. The drive 1370 and guide 1371 rollers of side belt 1360 are mounted to rotate with their respective shafts 1364, 1366, but are movable therealong as side knife housing 1212 shifts.

As with side transport belt 1294, side speeder belt 1360 is provided with its own side paneled housing 1362, which extends past all of its guide rollers and is connected by means 1363 with neighboring side knife housing 1212 and moves with the housing to maintain the same relative position with respect to its transport belt 1294.

The other side speeder belt 1361 (FIGS. 3, 33) is connected to move with side knife housing 1211.

Drive Mechanism for Belts

The upper and lower transport belts should move at the same rate. A common drive for these belts is, therefore, provided. Referring to FIGS. 1—3, 27, 28 and 33, upper transport belt spline drive shaft 1160 (FIGS. 27, 28) has above described drive gear 1186 secured thereto. Lower transport belt spline drive shaft 1332 (FIGS. 3, 27, 28) has bevel drive gear 1380 secured thereto. Gears 1186 and 1380 are of the same size.

Drive shaft 1382 carries and rotates upper transport belt driving gear 1384 (FIGS. 27, 28) and equal size lower transport belt driving gear 1386 (FIGS. 3, 27, 28), which gears mesh, respectively, with bevel gears 1186, 1380. Rotation of shaft 1382 rotates each of the transport belt drive shafts 1160, 1332 to an equal extent, thereby moving the transport belts equally.

Gear 1384 is on hub 1387 (FIGS. 27, 28), which passes through bearing 1388 (FIG. 28) in above described flat plate 1184. Because plate 1184, and, therefore, gear 1384 shift vertically as the height of the towers 1012–1020 is varied, while gear 1386 remains at the same height, upper portion 1389 of drive shaft 1382 is splined, and the connection of gear 1384 with shaft 1382 is cooperating internally splined. This permits vertical shifting of gear 1384, while maintaining positive rotation connection between that gear and shaft 1382.

Shaft 1382 is connected to and operated by shaft extension 1390 (FIGS. 27, 28), which connects to the output shaft of indexing unit 1392. Indexing unit 1392 is a conventional mechanism, like that shown in Catalog No. 408 of the Commercial Cam and Machine Co., Chicago, Illinois, and is driven by the trimmer drive means, described below. The indexing unit includes a cam and gear arrangement, which holds the transport belts stationary for a predetermined period, of about one-half of a cycle of the operation of the trimmer, and permits movement, under the influence of the below described drive means, of the transport belts for the other portion of the cycle. During the movement portion of the cycle, the indexing unit causes the transport belts to follow a controlled acceleration and deceleration displacement (see description of FIG. 38), gradually increasing the speed of the belts after they pick up a book at the first station and gradually decreasing the speed of the belts as the book approaches the second station. The indexing unit gradually stops and starts its motion, thereby avoiding jerking of the book and undesirable displacement of its pages.

The transport belts are at the same time also transporting a book, which was at the second station, to deliver it to the speeder belts. The speed of the speeder belts is chosen to match the speed of the transport belts at the point where the latter belts release the book to the former belts.

During each drive period, the transport belts move the book a fixed distance, e.g. 15 inches, from the front knife station so that the trailing edge of the book, i.e. the edge that has been cut by the front knife, will be at the side knife trimming station and past the upstream end of the side knives, described below. The book dwells at the side trimming station long enough for the below described operation of the side knife clamps, the trimming and recovery strokes of the side knives, and the recovery stroke of the side knife clamps.

After the book has been trimmed by the side knives, the transport belts deliver it to the speeder belts.

Speeder belt drive shaft 1364 (FIGS. 3, 28, 33) is separately driven by drive belt 1398, which passes over drive sheave 1399 fixedly secured to shaft 1364. Belt 1398 is driven by drive sheave 1400 (FIGS. 28, 33) connected with a continuous drive motor 1402 (FIG. 28). The speeder belts, unlike the transport belts, run continuously, but their speed of movement is approximately that of the transport belts at the point of release of the book from the latter belts and once the speeder belts obtain positive contact with the undersurface of the book that has been trimmed, they carry it away.

Delivery Table

Figure 2:
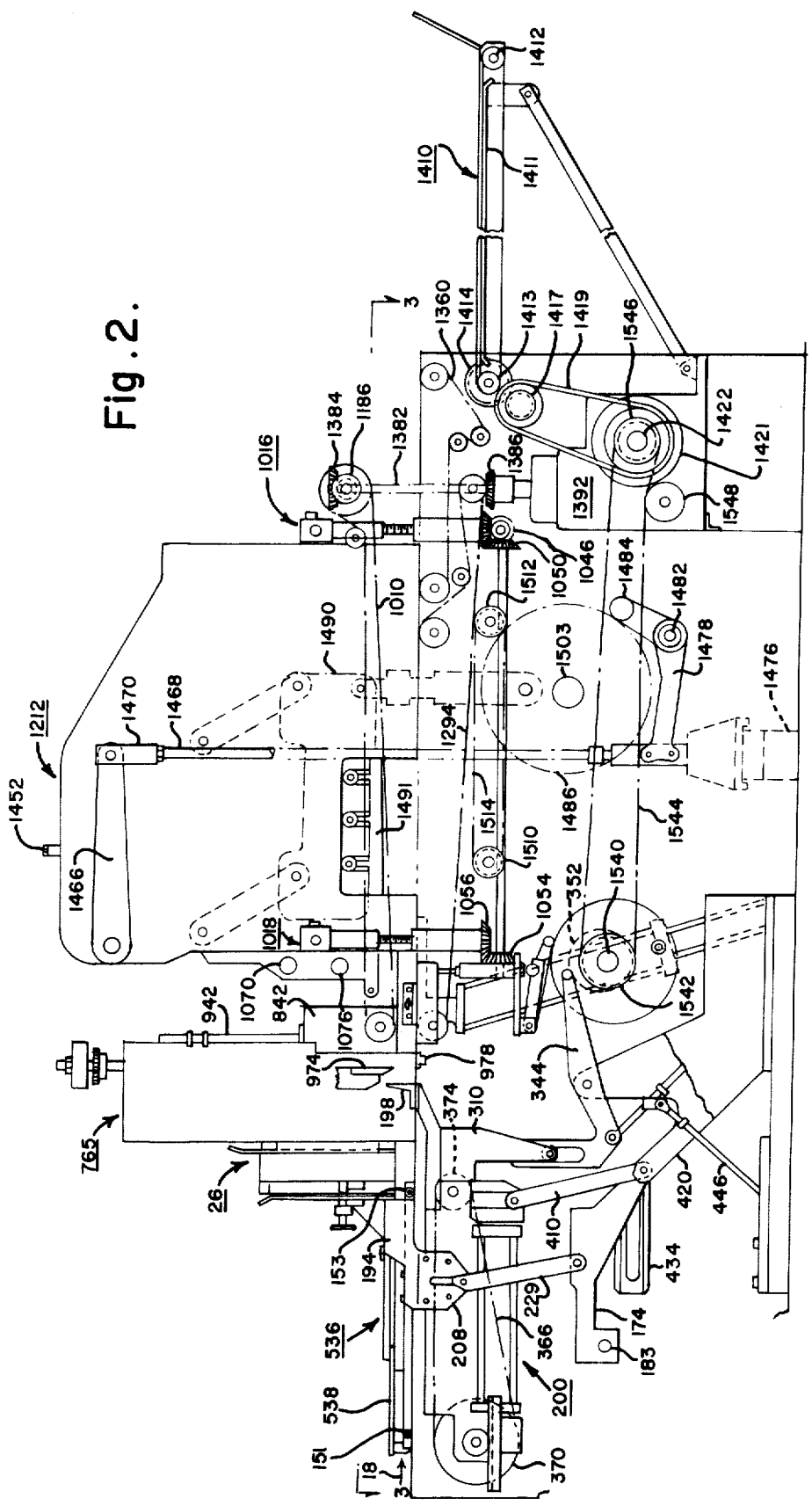
FIG. 2 is a side elevational view in cross-section also showing the trimmer of FIG. 1 and many of the significant elements and subassemblies of that trimmer.

Referring to FIGS. 1–3 and 27, at the end of their operative upper course, the speederr belts fling the trimmed book onto the relatively slow moving delivery table 1410. The delivery table comprises a wide belt (FIGS. 1, 3), which rides over support shoe 1411 (FIG. 2) and wraps around fixedly supported end rollers 1412, 1413 (FIGS. 1, 2). Drive roller 1413 is driven through gear 1414 by gear 1415 (FIGS. 3, 27), which is secured to shaft 1416. Also secured to shaft 1416 are small diameter sprocket 1417 and larger diameter sprocket 1418. Shaft 1416 is driven through roller chain 1419. Small diameter sprocket 1420 (FIG. 27) and large diameter sprocket 1421 are secured on drive shaft 1422 of indexing unit 1392. Chain 1419 is passed over either of sprockets 1417, 1418 and over either of sprockets 1420, 1421. The speed of movement of delivery belt 1410 can be varied by selection among the larger or smaller diameter sprockets for chain 1419.

The speed of delivery table 1410 is slower than that of the speeder belts, whereby as books are delivered to the delivery table, they are shingled or staggered, with each book partially overlaying the preceding book, which facilitates later handling and stacking of the now trimmed books. Selection of the speed of delivery table 1410 varies the distance each book extends out from the book which settles above it.

As sprocket dimensions vary, the distance between shafts 1416, 1422 necessarily also varies in order to maintain chain 1419 taut. Shaft 1416 is mounted in a support (not shown), which is concentric with gear 1414 and which permits shaft 1416 to be moved along curved path 1423 (FIG. 27), until chain 1419 is tightened.

Table Fillers

As shown in FIG. 3, the spaces between neighboring transport and neighboring speeder belts are filled in by table filler strips 1425, 1426, which are rigid, metallic smooth surfaced strips, the upper surfaces of which are at the same height as the operative courses of the lower transport and speeder belts. These strips help support the book, and at the first trimming station. They are beneath the help clamping operation of auxiliary clamps 816, 818.

SECOND CUTTING STATION

In addition to a front knife for trimming the trailing side edge of the book, there are side knives for trimming the top and bottom of the book.

SIDE KNIFE ASSEMBLY

Side Knife Clamps

When a book has been transported to the side knife or second cutting station, the transport belts halt the book and retain it clamped between them. Referring to FIGS. 2 and 34–36, side knife and side clamp housing 1212 and its contents will be described. Housing 1211 and its contents for the other side knife are substantially identical.

Side clamp bar 1430 has lower clamping surface 1432 and descends, by means to be described, and clamps the book between surface 1432 and the lower clamping surface 1434, which is above bottom side knife 1436.

Clamp bar 1430 has a narrowed, upper supporting portion 1440, which is guided by guide ways 1441 secured to housing 1212. Clamp bar initial height adjustment sleeve 1442 is secured by means 1443 to portion 1440. Sleeve 1442 includes internally threaded opening 1446 for receiving cooperatingly threaded clamp bar drive shaft 1448. Shaft 1448 passes through opening 1449 in bearing pin 1450, which bearing pin is connected, as described below, with the linkage for driving clamp bar 1430.

Holding bearing pin 1450 momentarily stationary, upon rotation of drive shaft 1448 by rotation of its exposed hex nut end 1451 in one or the other direction, sleeve 1442 and, hence, clamp bar 1430 are adjusted in height, thereby raising and lowering the initial position of the clamp bar and of its clamping surface 1432 to provide for varying book thicknesses, as was done with the front knife clamp.

Once the height of clamp bar 2430 is determined, it should be locked in position. Internally threaded lock nut 1452 surrounds the upper end of cooperatingly threaded drive shaft 1448. When nut 1452 is tightened by its handle 1453, its lower end is tightened against bearing pin 1450, which causes nut 1452 to draw up on the threads of shaft 1448, thereby locking the shaft against further rotation. This secures clamp bar 1430 at the desired height.

Bearing pin 1450 is journalled in the rotatable in the bifurcated arms of connecting links 1458. Link 1458 is rigidly connected with pivoting shaft 1460. Shaft 1460 rides in bearings 1462 in housing 1212. Connecting link 1466 is rigidly connected to shaft 1460, whereby rotation of shaft 1460 in its bearing raises and lowers side clamp bar 1430.

Clamp bar drive rod 1468 (FIG. 34) depends from connecting link 1470, which is pivotally connected to link 1466, and rod 1468 is connected to connecting link 1472. In the same manner as with the front knife clamp, rod 1468 is threadedly received by link 1470 above and by link 1472 below, with the threads in each link having reverse pitch from one another. By rotation of rod 1468, the pivoting stroke of link 1466 may be adjusted, so that, for example, at midstroke, it would be horizontal. This is an adjustment for the operating mechanism for the clamp, which is separate from the adjustment, described above, of the height of clamping surface 1432 with respect to cooperating clamping surface 1434.

For drawing clamp bar 1430 down, link 1472, through link 1474, is connected with piston 1475 of air pump 1476. Air pressure above piston 1475 drives rod 1468 down. For elevating the rod, rigid drive link 1478 is pivotally connected at 1480 with shaft 1468 and pivots about its own fixed pivot 1482. Link 1478 includes cam follower roller 1484, which rides along the profile of cam surface 1486. The profiled cam surface raises shaft 1468 against the pull exerted by air cylinder 1476.

Side Knives

Referring to FIGS. 2 and 34–36, side knife bar 1490 (FIGS. 34, 35), carries side knife 1491. Knife bar 1490, like front knife bar 952, is supported by pivotally mounted parallel linkage elements 1492, 1494 (FIG. 34). Each of these linkage elements is pivotally connected to knife bar 1490 and at the other end to housing 1212. The knife bar pivots between its lower position and the phantom upper position of FIG. 34. For moving knife bar 1490, connecting link 1498 is pivotally connected at one end to the knife bar and at the other end is connected eccentrically on wheel 1502. Rotation of wheel 1502 causes the knife bar to elevate and descend. Both cam surface 1486 and wheel 1502 are concentric and rotate at the same or at directly related rates. Since the side clamp and the side knife bar must operate in coordination with each other, they could operate off the same drive shaft 1503. Shaft 1503 is splined and the connection thereon of cam surface 1486 and wheel 1502 are cooperatingly splined to permit knife bar 1490 and housing 1212 to be adjusted for the height of a book, as described below.

Upon descending, side knife 1491 meets and cooperates with bottom side knife 1436 to trim the edge of the book. Bottom side knife 1436 is within housing 1212 so as to be adjusted sideways with knife 1490.

As book height varies, the side knife housings 1211, 1212 must be adjusted toward and away from each other. The joggers, upper and lower transport belts and speeder belts are all connected in some way, as described above, with their neighboring side knife housing, and they also are adjusted in and out for different height books.

Referring to FIGS. 1–3, 4 and 27, for accomplishing such adjustments, each side knife housing is provided with openings 1504, which are threaded and receive cooperatingly threaded shafts 1506, 1508. The pitch of the threads on each of the shafts and in the cooperating openings in housings 1211, 1212 are such that upon rotation of the shafts in one direction, the housings separate, and upon rotation in the other direction, the housings move together. The shafts each support respective, equal size sprockets 1510, 1512 which are joined by chain 1514. Uon rotation of either of shafts 1506, 1508, the chain transmits corresponding motion to the other shaft and the two housings shift with respect to each other.

COMMON COORDINATED DRIVE

The same drive that controls the movement of the transport belts should also control the operation of the front and side knives and of all the cam operated mechanisms. As shown in FIG. 3, motor 1516, through belt 1518 drives weight flywheel 1520, which has conventional clutch 1522 associated therewith for disconnecting the flywheel from the apparatus when it is desired to halt further operations of the systems. Flywheel 1520 is secured on drive shaft 1526, is secured on connecting shaft 1530 and causes that shaft to rotate when worm gear 1526 is rotated.

Connecting shaft 1530 rotates front knife drive wheel 972 and causes ascent and descent of that knife.

For operating side knife bars 1490, 1490a, above mentioned drive shaft 1524, through transmission 1532, operates above described spline shafts 1503, 1534 for side knives 1490, 1490a, respectively. Since the side and front knives operate off the same drive, their operations are coordinated.

Connecting shaft 1530 has bevel gear 1536 rigidly secured thereto. This meshes with cooperating bevel gear 1538, which is rigidly secured to main cam shaft 1540. The movement of the trimming knives is coordinated with the movement of all the other elements of the trimmer, which operate off the cam shaft 1540.

All of the transport, speeder and delivery belts are also driven off cam shaft 1540. Roller chain 1544 passes over drive sprocket 1542 and over driven sprocket 1546, which is secured on above described indexing unit and belt drive shaft 1422. Adjustable idler roller 1548 keeps roller chain 1544 taut, so as to ensure positive drive of shaft 1422 from cam shaft 1540.

All elements of the trimmer are thereby driven in coordination.

In FIG. 37, cam shaft 1540 and all the drive cams considered above, which are mounted on that shaft, are illustrated. Where there are duplicating elements on two sides of the trimmer, only one such element was described hereinabove. The duplicating element on the other side of the trimmer is marked with a primed (′) numeral. Through the common, coordinated drive, the entire trimmer mechanism operates in the desired sequence.

TIMING OF OPERATIONS

As was suggested above, the various elements of the trimmer are coordinated to operate in a predetermined sequence and for predetermined periods of time, so that trimming can be properly performed. FIG. 38 is a chart showing the speeds, directions of movement and distance travelled by each of the principal subassemblies of the trimmer. The vertical axis measures distance. The horizontal axis measures time as a function of the location in the cycle. For subassemblies, which shift vertically during their operations, their speed curves turn upward when the subassemblies are ascending and turn downward when the subassemblies are descending. For subassemblies, which shift horizontally, their curves turn upward when the subassemblies are moving against the book and turn downward when the subassemblies are moving away from the book.

Start at the 0°mark at which the front knife is at bottom dead center, having completed its trimming stroke on the first book located at the first station. The knife is ready to begin its recovery stroke. Since the front clamp leads the front knife by a small period of time, and since front knife trimming of the first book was completed shortly before the front knife reached bottom dead center, the front clamp is already lifting off the first book. The upper transport belt nips are fully descended for clamping the first book at the first station. The transport belts are stationary and are about to begin moving the first book. Such movement begins at from 10°-20°after the front clamp lifts. The transport belts are also clamping the preceding, second book at the second trimming station. When the transport belts move, the second book will be transported to the delivery mechanism. The side knives and side knife clamps are in the midst of their respective ascending strokes, recovering from having trimmed the head and foot edges of the second book at the second station. This book, therefore, is ready to be transported. The front knife trimmings gate is open so that the trimmings from the first book can be disposed of. The backstops are below the surface of the infeed table so as not to interfere with the soon to begin transport of the first book. The joggers are away from the first book, having already aligned it, so as not to interfere with the soon to begin transport of that book. The prestrippers are in the midst of their drive stroke, having already begun to strip the next, or third book from beneath the stack in the hopper, but not having yet delivered that book to the stack location where it would be picked up by the pushers. The pusher elevator has caused the pushers to descend to their lowest level beneath the stack of books. The pusher horizontal traverse means is still moving the pushers in the recovery direction to where the pushers can pick up the third book from the prestripper.

The apparatus passes the 60° mark, the situation at which is illustrated in FIG. 6. Returning to FIG. 38, at the 90°mark, the front clamp has ascended sufficiently to be out of the way of the third book, which is to be shortly moved into the front station. The front knife is still ascending, but already is, or will shortly be, above the surface of the third book moving into the first station. The transport means is in the midst of transporting the second book beyond the second station to the delivery mechanism and transporting the first book to the second station, at which the side knives will operate. The transport belt nips were down to help clamp the first book at the first station and to aid in transport of the first book toward the second station. At the 90° mark, the first book has been transported sufficiently by the transport belts so as to be away from the first station, whereby the transport belt nips can elevate to provide the opening required at the first station for reception of the third book. Therefore, even though the transport belts are moving over the nips and continue to move until shortly past the 180°mark, the moving belts do not contact or affect the third book being pushed to the first station. The trimmings gate is now closed so that the third book, which is being pushed to the first station by the pusher, can have a smooth, continuous surface to pass over. The backstops are beneath the surface of the infeed table because the transport belts are still moving the first book past the backstops to the second station. The joggers are out of engagement with the first book, since that book is now moving toward the second station, and are out of engagement with the third book, which is moving into the first station. The side knife clamps have reached the top of their stroke and are ready to descend to clamp the first book, which is being transported to the second station. The side knives are continuing their ascent to their top dead center position, before beginning their descent to trim the top and bottom edges of the third book to the stack location and are in their recovery stroke. The pusher elevator has already raised the pushers above the surface of the infeed table where they are in position to push the third book. The pusher traverse means is causing the pushers to push the third book toward the firsst station. The pushers began pushing the third book toward the first station before the 60° mark, which is shortly after the prestrippers ceased to push the book and began their recovery stroke. Hence, the prestrippers feed the pushers.

The apparatus passes the 140° mark, the situation at which is illustrated in FIG. 7. Returning to FIG. 38, the 180°mark is the midpoint of a cycle. Shortly after this midpoint, at from 190°-200°, the first book is halted by the transport belts at the second station. For the remainder of the cycle, the transport belts are indexed to remain stationary. The first book at the second station and the third book, once it has been pushed to the first station by the pushers, as described below, therefore, remain stationary for the remainder of the cycle. At 180°, the side knife clamps are descending and have almost contacted the first book at the second station. The side knives are descending to trim the first book. The third book, being pushed in the drive direction by the now fully elevated pushers, has almost arrived at the first station. The prestrippers have completed their recovery stroke and are ready to begin stripping the next book from the hopper. The trimmings gate is still closed to provide a smooth pathway for the third book. To halt the third book at the first station, the backstops, shifting above the surface of the table, are at about their maximum height. Similarly, the joggers are beginning their movement inward toward the head and foot of the third book to align it. The front knife is at its top dead center position and is about to begin its descent for trimming the third book. The front knife clamp, preceding the front knife, has just passed through its top position and is beginning its descent. By the time the backstops halt the third book, the front clamp will have descended sufficiently for the auxiliary clamps to begin holding the third book at the first station. The transport belt nips are still in their elevated condition, so that the previous movement of the transport belts could not have affected the third book, which was being moved to the first station by the pushers. The transport belt nips descend later before the trimming of the third book by the front knife.

The apparatus passes the 220° mark, the situation at which is illustrated in FIG. 8. Moving on to the 270° mark in FIG. 38, for the first book now at the second cutting station, the side knife clamps have descended and are holding it. The side knives are descending and will shortly reach their bottom dead center position, completing trimming of the first book. The prestrippers have long since completed their stripping of the third book from the hopper and are already beginning to move in the drive direction toward the stack of books for stripping still another book from the hopper. The pushers have completed pushing the third book to the first station and are retreating horizontally. The pusher elevator has just begun to cause the pushers to descend. The movement of the pushers in the recovery direction begins before the pushers descend because the pushers can the hopper for a distance before they must also dip beneath the hopper so as to avoid contacting the books within the hopper. The backstops are now beginning their descent beneath the table because the third book has been halted at the first station and, therefore, will not be pushed any further by the now retreating pushers. Similarly, the joggers, having completed their aligning, also are off the book. The transport belt nips have descended and are now helping to clamp the third book at the first station. Since the transport belts are halted during this half of the cycle, the third book is not being moved from the first station. The front clamp has descended and, in cooperation with the transport belt nips, securely holds the third book. The front knife is descending and is almost through its trimming stroke. The trimmings gate, which began to open shortly after the 180°mark, is now fully open so as to permit disposal of the front knife trimmings of the third book.

Between the 270°mark and the end of the cycle, (with the situation at 300°being illustrated in FIG. 5), the side knives coomplete the trimming of the first book and both the side knives and the side knife clamps begin their ascent so as to be out of the way of the third book now at the first station, which book is to be moved by the transport belts to the second station. The transport belt nips remain in engagement with the upper surface of the third book, so that when the transport belts begin to move again after the 0° mark, the third book is clamped. The pushers become fully descended and continue back to the stack location to pick up the next book, which is being delivered to that location by the prestrippers. The front knife is continuing to descend, after trimming the third book, to its bottom dead center position. The trimmings gate is still open for disposal of front knife trimmings. The front clamp, leading the front knife, begins its ascent after the front knife has completed trimming the third book, but before that knife reaches bottom dead center below the book. The backstops fully descend to avoid the soon to be transpoirted third book. The joggers also remain off the third book.

Upon completion of one cycle, the trimmer automatically continues into the next.

Two prestripper and pusher pathways are illustrated, the upper pathways being for a narrower book and the lower pathways being for a wider book. Usually, trimmers stroke at a constant rate, regardless of the width of a book being trimmed. With the present invention, the speed of the trimmer can be increased as the width of the book decreases. During a predetermined cycle time, both of the prestrippers and the pushers travel at a greater speed for a wider book than for a narrower book, because both must travel over a greater distance in the same time period for a wider book than for a narrower book. A comparison of the two prestripper paths and of the two pusher paths shows that the pushers and prestrippers travel more rapidly for wider books than for narrower books. The speed of operation of the trimmer when it is feeding narrower books to the transport mechanism can be increased to an extent, such that the narrower books are fed at least at the same rate as the wider books.

With the shorter strokes required for feeding narrower books, smaller driving forces are needed and lesser momentum of the moving parts is developed. Hence, the mechanism for stripping books from the hopper and delivering them to the transport mechanism can operate more rapidly. The speed of the prestrippers and pushers can, therefore, be greatly increased for narrower books. As these elements move faster, all other trimmer elements are operated correspondingly more rapidly.

Prior art trimmers are usually designed to operate at the speed required for the maximum width book being fed to the transport mechanism. The speed of these trimmers is, therefore, unnecessarily limited when narrower books are to be fed. Since the present trimmer shortens its feeding stroke when thinner books are being fed, the trimmer speed can be correspondingly increased. This is especially beneficial in a production line operation, since other machinery which feeds books to or takes them away from the trimmer of the invention vary their operational speeds with the width of the book being operated upon. whereby the trimmer speeds and those of the other apparatus will be coordinated. The above described operating linkages and positioning carriages for both the prestrippers and pushers automatically vary the speeds of these subassemblies for different width books.

FIG. 39 is a chart, which shows the positions of the books moving through the trimmer during one cycle. FIG. 39 is similar to FIG. 38, but is rotated 90°. The above mentioned first book is the central book in FIG. 39. The second book is the one on the right, and the third is on the left.

The first book is moved by the transport belts, for the first half of the cycle, from the first to the second stations, over a distance of about 15''. For the remainder of the cycle, side knife trimming of the first book occurs. The second book is moved by the transport belts, for the first portion of the first half of the cycle, beyond the second station, until the book is carried away by the speeder belts. The third book starts the cycle as already having been stripped from the hopper by the prestrippers and as being almost at the stack location. Through the first portion of the cycle, the third book is fed to the first station. During the latter portion of the cycle, front knife trimming is performed on that book.

The combination of FIGS. 38, 39 and 5–8 teaches the sequence of events that take place in the trimmer.

There has just been described novel mechanisms for feeding transporting and delivering objects and, more particularly, such mechanisms for use in a two-station, three-knife book trimmer.

Although the invention has been described above with respect to its preferred embodiments, it will be understood that many variations and modifications will be obvious to those skilled in the art. It is preferred, therefore, that the scope of the invention be limited not by

I claim:

1. A mechanism for feeding objects to another means comprising, a hopper for holding a stack of the objects; a pusher for pushing an object from a stack location beneath the stack to a first station; said pusher comprising, an abutment surface supported by an arm; said pusher arm being capable of horizontal traversal under the influence of a horizontal traverse means thereto connected, and being movable from said stack location in a direction so as to push an object to said first station, and being movable in a recovery direction;

said pusher arm being pivotally mounted on a pivot mount so as to be pivotal vertically, for raising and lowering said abutment surface; a pusher elevator connected with said pusher arm for pivoting same;

said pusher elevator comprising a link which is mounted to pivot in a plane parallel to the plane in which said pusher arm pivots; said elevator link being connected to said pusher arm to pivot same;

a drive link connected with said elevator link for causing same to pivot; a cam surface in engagement with said elevator link drive link for operating same to drive said elevator link in one direction and a biasing means connected with said elevator link for driving said elevator link in the other direction, alternately raising and lowering said pusher arm;

said elevator link including an elongated receiving means for connecting with said pusher arm; said pusher arm engaging said elevator link through said receiving means; said receiving means being elongated along a path paralleling the horizontal traverse of said pusher arm, whereby said pusher arm can remain in operative engagement with said elevator link over its entire horizontal pathway;

said elevator link being a parallel link so that while it pivots vertically, the entire length of said receiving means moves through the same height location at the same time.

2. The feed mechanism of claim 1, wherein said elevator link drive link is pivotally mounted on a pivot mount;

said elevator link drive link including a second elongated receiving means for a connecting element; said elevator link having a connecting element which is received by said second receiving means; said second receiving means being elongated along a path that extends radially inward toward said drive link pivot mount;

means for adjusting the spacing of both of said pusher arm and said elevator link with respect to said elevator link drive link pivot mount, whereby the total distance pivoted by said elevator link can be varied.

3. The feed mechanism of claim 2, wherein said spacing adjusting means adjusts said pusher arm and said elevator link vertically and said second receiving means is vertically elongated.

4. A mechanism for feeding objects to another means comprising, a hopper for holding a stack of the objects; a pusher for pushing an object from a stack location beneath the stack to a first station; said pusher comprising, an abutment surface supported by an arm; said pusher arm having a horizontal traverse means connected thereto whereby said pusher arm is capable of horizontal traversal under the influence of said horizontal traverse means, and being movable from said stack location in a direction so as to push an object to said first station, and be movable in a recovery direction;

said pusher arm being pivotally mounted on a pivot mount so as to be pivotable vertically, for raising and lowering said abutment surface; a pusher elevator connected with said pusher arm for pivoting same to thereby raise and lower said abutment surface, cam means for actuating said pusher elevator in timed relation with the movement of said abutment surface between said stack location and said first station;

said horizontal traverse means comprising a traverse means pivot link connected to a fixed pivot and connected to said pusher arm;

a traverse means drive link connected with said traverse means pivot link for driving same to pivot; a cam surface in engagement with said traverse means drive link for operating same to pivot said traverse means pivot link in one direction; and a biasing means connected with said traverse means pivot link for operating same in the opposite direction, which moves said pusher alternately in the drive and recovery directions.

5. The feed mechanism of claim 4, wherein said traverse means pivot link includes an arm extending away from said pivot of said pivotable link; said traverse means pivot link arm being secured to said traverse means drive link, whereby said traverse means drive link moves said traverse means pivot link by moving that said link arm;

said traverse means drive link being itself pivotable about its own pivot mount; said traverse means drive link including an elongated receiving means for receiving said traverse means drive link pivot mount;

means for moving said traverse means drive link pivot mount with respect to said traverse means drive link along said traverse means drive link receiving means so as to initially adjust the location of said pivot mount for said traverse means drive link.

6. The feed mechanism of claim 4, further including a latching means for latching said traverse means drive link against driving said pusher horizontally in the event of predetermined conditions.

7. The feed mechanism of claim 6, further including switch means connected with said latching means and mounted on said hopper to sense said predetermined conditions for activating said latching means.

8. The feed mechanism of claim 4, wherein said pusher arm is attached to a chain means; said chain means passes between guide elements which define a horizontal path for said chain means and for said pusher arm which is attached to said chain means;

a rotatable drive sprocket means for said chain means for moving said chain means in the drive and recovery directions;

said traverse means drive link being connected with said sprocket means for causing rotation thereof.

9. The feed mechanism of claim 8, wherein said traverse means pivot link is connected with a rack, so as to move said rack as said traverse means pivot link pivots;

means connected with said sprocket means and engaging said rack so that movement of said rack causes rotation of said sprocket means.

10. The feed mechanism of claim 9, further including biasing means connected with said rack for biasing same so as to rotate said sprocket means to drive said pusher abutment against the object.

11. The feed mechanism of claim 9, wherein said rack includes receiving means which is elongated vertically for receiving said traverse means pivot link;

first vertical spacing means for vertically adjusting the spacing of both said pusher arm and said chain means with respect to said traverse means pivot link, whereby said elongated receiving means takes up the vertical spacing adjustment.

* * * * *

UNITED STATES PATENT OFFICE
CERTIFICATE OF CORRECTION

PATENT NO. : 3,892,319
DATED : July 1, 1975
INVENTOR(S) : Ernest J. Sarring

It is certified that error appears in the above-identified patent and that said Letters Patent are hereby corrected as shown below:

Column 11, Line 51, delete "256" and insert --236--.
Column 19, Line 28, delete "484" and insert --482--.
Column 25, Line 4, delete "re" and insert --are--.
          Line 24, delete "one" and insert --book--.
          Line 62., delete "with" and insert --width--.
Column 27, Line 22, delete "cooperatively" and insert --cooperatingly--.
Column 32, Line 11, delete "114o" and insert --1140--.
          Line 21, delete "110" and insert --1110--.
Column 33, Line 39, delete "1124" and insert --1224--.
Column 37, Line 21, following "knife" insert --trimming--.
          Line 46, delete "speederr" and insert --speeder--.
Column 38, Line 21, delete "the" and insert --and--.
          Line 61, delete "2430" and insert --1430--.
Column 40, Line 9, delete "Uon" and insert --Upon--.
          Line 19, delete "weight" and insert --weighted--.
          Line 23, after shaft insert --1524. Worm gear 1526 is secured on shaft 1524 to rotate therewith. Cooperating Wheel gear 1528 meshes with worm gear--.
Column 42, Line 18, after edges insert --of the first book. The prestrippers have completed their delivery of the--.
Column 43, Line 15, after can insert --move back toward--.

Signed and Sealed this third Day of February 1976

[SEAL]

Attest:

RUTH C. MASON
Attesting Officer

C. MARSHALL DANN
Commissioner of Patents and Trademarks